US011930549B2

(12) United States Patent
Takakura

(10) Patent No.: US 11,930,549 B2
(45) Date of Patent: Mar. 12, 2024

(54) UE AND COMMUNICATION METHOD FOR SAME

(71) Applicant: SHARP KABUSHIKI KAISHA, Sakai (JP)

(72) Inventor: Tsuyoshi Takakura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/254,070

(22) PCT Filed: Jun. 20, 2019

(86) PCT No.: PCT/JP2019/024607
§ 371 (c)(1),
(2) Date: Dec. 18, 2020

(87) PCT Pub. No.: WO2019/245007
PCT Pub. Date: Dec. 26, 2019

(65) Prior Publication Data
US 2021/0267001 A1 Aug. 26, 2021

(30) Foreign Application Priority Data
Jun. 21, 2018 (JP) .................. 2018-117938

(51) Int. Cl.
*H04W 76/18* (2018.01)
*H04W 76/50* (2018.01)

(52) U.S. Cl.
CPC ........... *H04W 76/18* (2018.02); *H04W 76/50* (2018.02)

(58) Field of Classification Search
CPC ..... H04W 76/18; H04W 76/50; H04W 48/16; H04W 88/06; H04M 3/5116; H04M 2207/185; H04M 11/04; H04M 3/00
See application file for complete search history.

(56) References Cited

U.S. PATENT DOCUMENTS

| 2009/0191841 | A1* | 7/2009 | Edge | ................... H04L 65/1016 |
| | | | | 455/404.1 |
| 2010/0041418 | A1* | 2/2010 | Edge | ................... H04W 4/029 |
| | | | | 455/456.2 |

(Continued)

FOREIGN PATENT DOCUMENTS

| CN | 105307173 A | 2/2016 |
| EP | 2723126 A1 | 4/2014 |

(Continued)

OTHER PUBLICATIONS

3GPP 23.501 V15.1.0 (Mar. 2018), 3rd Generation Partnership Project; Technical Specification Group Services and System Aspects; System Architecture for the 5G System; Stage 2 (Release 15).

(Continued)

*Primary Examiner* — Atique Ahmed
(74) *Attorney, Agent, or Firm* — ScienBiziP, P.C.

(57) ABSTRACT

A User Equipment (UE) includes a controller configured to, in a case of a failure of a first emergency call connection attempt using Packet Switched (PS) domain, perform a second emergency call connection attempt using the PS domain, and a transmission and/or reception unit configured to receive a Packet Data Unit (PDU) SESSION ESTABLISHMENT REJECT message as the failure of the first emergency call connection attempt. The UE uses a first access network for the first emergency call connection attempt, and the UE uses a second access network for the second emergency call connection attempt. Thus, for a 5th Generation (5G) mobile communication system corresponding to a next generation mobile communication system, a control method is provided that is performed by a user equipment, an access network apparatus, a core network apparatus, and an IMS apparatus to allow the user equipment (Continued)

to connect to a network suitable for an emergency notification service.

2 Claims, 15 Drawing Sheets

(56) References Cited

U.S. PATENT DOCUMENTS

| | | | | |
|---|---|---|---|---|
| 2011/0032931 | A1* | 2/2011 | Zhu | H04L 65/1016 |
| | | | | 370/357 |
| 2012/0269099 | A1* | 10/2012 | Chin | H04W 76/12 |
| | | | | 370/259 |
| 2013/0137438 | A1* | 5/2013 | Serravalle | H04W 36/22 |
| | | | | 455/437 |
| 2016/0212603 | A1* | 7/2016 | Chen | H04W 4/90 |
| 2017/0208063 | A1 | 7/2017 | Tao et al. | |
| 2018/0352408 | A1* | 12/2018 | Baer | H04W 24/04 |
| 2019/0007922 | A9* | 1/2019 | Edge | H04W 4/20 |
| 2019/0182789 | A1* | 6/2019 | Kim | H04W 8/08 |
| 2019/0313229 | A1* | 10/2019 | Chiang | H04W 4/90 |
| 2019/0342940 | A1* | 11/2019 | Ryu | H04W 76/50 |
| 2020/0015063 | A1* | 1/2020 | Lee | H04M 1/725 |
| 2021/0168901 | A1* | 6/2021 | Kim | H04W 8/08 |

FOREIGN PATENT DOCUMENTS

| | | |
|---|---|---|
| JP | 2016-131308 A | 7/2016 |
| WO | 2016/091328 A1 | 6/2016 |

OTHER PUBLICATIONS

3GPP TS 23.502 V15.1.0 (Mar. 2018), 3rd Generation Partnership Project; Technical Specification Group Services and System Aspects; Procedures for the 5G System; Stage 2 (Release 15).

3GPP TS 24.501 V1.0.0 (Mar. 2018), 3rd Generation Partnership Project; Technical Specification Group Core Network and Terminals; Non-Access-Stratum (NAS) protocol for 5G System (5GS); Stage 3 (Release 15).

3GPP TS 24.502 V0.4.0 (Mar. 2018), 3rd Generation Partnership Project; Technical Specification Group Core Network and Terminals; Access to the 3GPP 5G Core Network (5GCN) via non-3GPP access networks; Stage 3 (Release 15).

3GPP TS 24.301 V15.2.0 (Mar. 2018), 3rd Generation Partnership Project; Technical Specification Group Core Network and Terminals; Non-Access-Stratum (NAS) protocol for Evolved Packet System (EPS); Stage 3 (Release 15).

3GPP TS 23.401 V15.3.0 (Mar. 2018), 3rd Generation Partnership Project; Technical Specification Group Services and System Aspects; General Packet Radio Service (GPRS) enhancements for Evolved Universal Terrestrial Radio Access Network (E-UTRAN) access (Release 15).

3GPP TS 24.229 V15.2.0 (Mar. 2018), 3rd Generation Partnership Project; Technical Specification Group Core Network and Terminals; IP multimedia call control protocol based on Session Initiation Protocol (SIP) and Session Description Protocol (SDP); Stage 3 (Release 15).

3GPP TS 23.228 V15.2.0 (Mar. 2018), 3rd Generation Partnership Project; Technical Specification Group Services and System Aspects; IP Multimedia Subsystem (IMS); Stage 2 (Release 15).

3GPP TS 23.167 V15.2.0 (Jun. 2018), 3rd Generation Partnership Project; Technical Specification Group Services and System Aspects; IP Multimedia Subsystem (IMS) emergency sessions (Release 15).

3GPP TR 24.890 V15.1.0 (Mar. 2018), 3rd Generation Partnership Project; Technical Specification Group Core Network and Terminals; 5G System-Phase 1; CT WG1 Aspects (Release 15).

3GPP TS 23.502 V15.2.0 (Jun. 2018), 3rd Generation Partnership Project; Technical Specification Group Services and System Aspects; Procedures for the 5G System; Stage 2 (Release 15).

* cited by examiner

UE AND COMMUNICATION METHOD FOR SAME

TECHNICAL FIELD

The present application relates to a UE and a communication method for the UE. This application claims priority based on JP 2018-117938 filed on Jun. 21, 2018 in Japan, the contents of which are incorporated herein in its entirety by reference.

BACKGROUND ART

The 3rd Generation Partnership Project (3GPP), which undertakes activities for standardizing recent mobile communication systems, has studied System Architecture Evolution (SAE) which is a system architecture of Long Term Evolution (LTE). The 3GPP is in the process of standardizing Evolved Packet System (EPS) as a communication system for realizing an all-Internet Protocol (IP) architecture. Note that the core network constituting the EPS is referred to as an Evolved Packet Core (EPC), and an access network constituting EPS is referred to as an Evolved Universal Terrestrial Radio Access Network (E-UTRAN).

Additionally, for provision of an emergency notification service on an all IP network, a system called an IP Multimedia Subsystem (IMS) needs to be supported.

Additionally, the 3GPP has recently studied next-generation communication technologies and system architectures for a 5th Generation (5G) mobile communication system, which is a next generation mobile communication system, and in particular, has standardized a 5G System (5GS) as a system for realizing a 5G mobile communication system (see NPL 1 and NPL 2). In the 5GS, technical problems attributable to connection of various terminals to a cellular network are extracted to standardize solutions.

For example, specifications have been studied for optimization and the like of core networks, access networks, and IMS for supporting emergency notification services (see NPL 1, NPL 2, NPL 5, and NPL 9).

CITATION LIST

Non Patent Literature

NPL 1: 3GPP TS 23.501 v15.1.0; 3rd Generation Partnership Project; Technical Specification Group Services and System Aspects; System Architecture for the 5G system; Stage 2 (Release 15)

NPL 2: 3GPP TS 23.502 v15.1.0; 3rd Generation Partnership Project; Technical Specification Group Services and System Aspects; Procedures for the 5G System; Stage 2 (Release 15)

NPL 3: 3GPP TS 24.501 v1.0.0; 3rd Generation Partnership Project; Technical Specification Group Core Network and Terminals; Non-Access-Stratum (NAS) protocol for 5G System (5GS); Stage 3 (Release 15)

NPL 4: 3GPP TS 24.502 v0.4.0; 3rd Generation Partnership Project; Technical Specification Group Core Network and Terminals; Access to the 3GPP 5G Core Network (5GCN) via non-3GPP access networks; Stage 3 (Release 15)

NPL 5: 3GPP TS 24.301 V15.2.0; 3rd Generation Partnership Project; Technical Specification Group Core Network and Terminals; Non-Access-Stratum (NAS) protocol for Evolved Packet System (EPS); Stage 3 (Release 15)

NPL 6: 3GPP TS 23.401 V15.3.0; 3rd Generation Partnership Project; Technical Specification Group Services and System Aspects; General Packet Radio Service (GPRS) enhancements for Evolved Universal Terrestrial Radio Access Network (E-UTRAN) access (Release 15)

NPL 7: 3GPP TS 24.229 v15.2.0; 3rd Generation Partnership Project; Technical Specification Group Core Network and Terminals; IP multimedia call control protocol based on Session Initiation Protocol (SIP) and Session Description Protocol (SDP); Stage 3 (Release 15)

NPL 8: 3GPP TS 23.228 v15.2.0; 3rd Generation Partnership Project; Technical Specification Group Services and System Aspects; IP Multimedia Subsystem (IMS); Stage 2 (Release 15)

NPL 9: 3GPP TS 23.167 v15.2.0; 3rd Generation Partnership Project; Technical Specification Group Services and System Aspects; IP Multimedia Subsystem (IMS); emergency sessions (Release 15)

SUMMARY OF INVENTION

Technical Problem

For 5GS, application of known IMS to 5GS has been under study for support of mobile communication voice call services.

More specifically, formalization of specifications has been under study for provision of a mobile communication emergency call service suitable for terminals (User Equipments (UEs)) or network apparatuses by exchanging various types of capability information in an emergency notification service between a UE and access network and/or core network apparatuses and exchanging various types of capability information in an emergency notification service between the UE and IMS apparatuses.

In response to a registration request from the UE, the network notifies various types of capability information of the network related to the emergency call service. In emergency call origination, the UE connects to the optimal access network and/or core network and realizes emergency notification, based on the capability information. In regard to the emergency call service, the capability information notified to the UE by the network is roughly classified into three types: whether a voice service is supported, whether an emergency call service is supported, and whether the access network supports a function to enable handover and/or redirection to an access network and/or a core network optimum for the emergency call service. The UE selects an access domain optimum for the emergency call, based on the received capability information of the network.

Handover and/or redirection to the access network and/or core network optimum for the emergency call service provided by the network is performed based on a dedicated service request message from the UE. However, this function is supported by some UEs but not by others.

The processing for generating network capability information as described above is generated based on the capability of the network, and thus whether the UE supports the dedicated service request message is not considered. As a result, even with a difference in supported capability between the network and the UE, for example, the network may unilaterally notify handover and/or redirection to the optimum access network and/or core network. In a case that the UE does not support the function, the UE may not perform the emergency call operation expected by the network, possibly leading to degraded quality of the emergency call service. No solution to this problem has been disclosed.

Additionally, no solution has been disclosed that allows execution of a procedure for switching to the optimal access network and/or core network in a case that a dedicated PDU session for an emergency call performed by the UE fails.

In addition, no scheme has been disclosed in which the optimum emergency call access domain is selected based on the network capability information in a case that the UE is dually registered with 4G and 5G.

Furthermore, no scheme has been disclosed that relates to which of the 4G and 5G systems the UE is to select in a case that both systems support the emergency call service.

In light of the foregoing, an object of the present invention is to provide a measure and the like for realizing a connection to a network that is most suited for an emergency notification service, based on exchange of various types of capability information between a variety of access network and/or core network apparatuses in an emergency notification service.

Solution to Problem

A UE according to one embodiment of the present invention includes a controller configured to, in a case of a failure of a first emergency call connection attempt using Packet Switched (PS) domain, perform a second emergency call connection attempt using the PS domain and a transmission and/or reception unit configured to receive a Packet Data Unit (PDU) SESSION ESTABLISHMENT REJECT message as the failure of the first emergency call connection attempt, wherein the UE uses a first access network for the first emergency call connection attempt, and the UE uses a second access network for the second emergency call connection attempt.

Advantageous Effects of Invention

According to the present invention, a terminal can quickly connect to the most suitable network in an emergency notification service. Additionally, 5GS and IMS can control terminal behaviors to allow connection to a network most suitable for emergency notification at the initiative of the network and can provide a more reliable and secure mobile communication service.

DESCRIPTION OF EMBODIMENTS

A preferred embodiment for carrying out the present invention will be described below with reference to the drawings. Note that, as an example, an embodiment of a mobile communication system to which the present invention is applied will be described in the present embodiment.

1. SYSTEM OVERVIEW

An overview of a mobile communication system according to the present embodiment will be described with reference to FIG. 1, FIG. 2, and FIG. 3.

Figure 1:
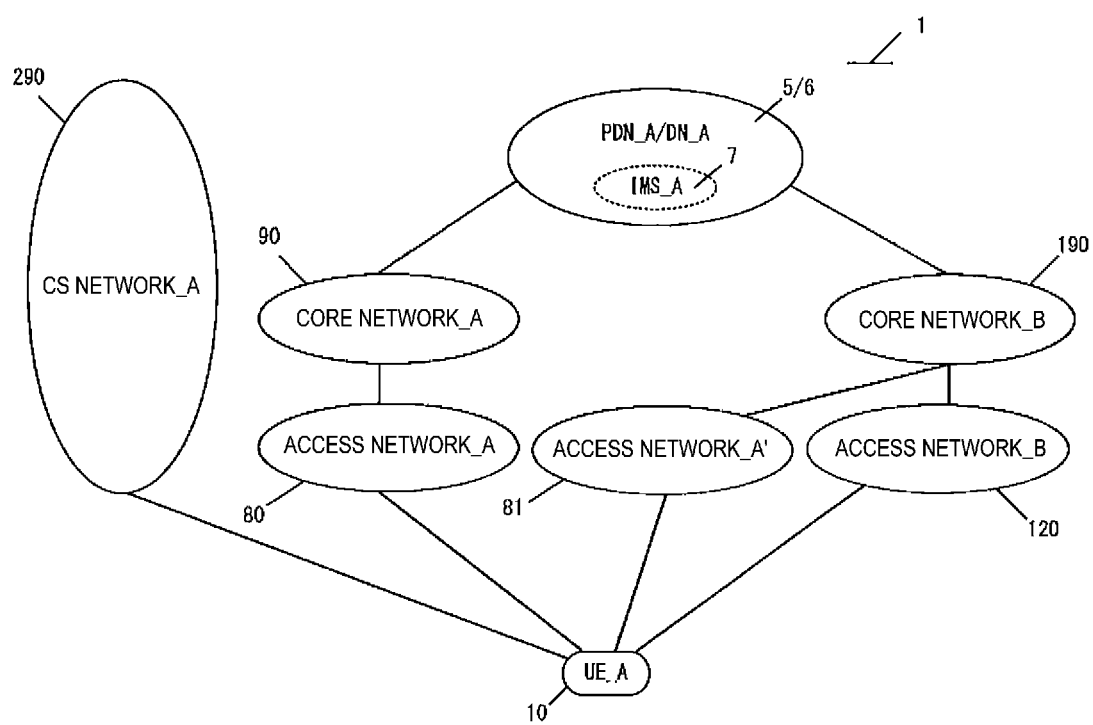
FIG. 1 is a diagram illustrating an overview of a mobile communication system.

FIG. 1 is a diagram schematically illustrating a mobile communication system 1. FIG. 2 is a diagram illustrating an example of a configuration of access networks and core networks in the mobile communication system in FIG. 1. FIG. 3 is a diagram mainly illustrating an example of a connection configuration of an IP Multimedia Subsystem (IMS) and core networks in the mobile communication system of FIG. 1.

As illustrated in FIG. 1, the mobile communication system 1 according to the present embodiment includes a User Equipment (UE)_A 10 (which is also referred to as a terminal apparatus or a mobile terminal apparatus), a Circuit Switched (CN) network_A 290, an Access Network (AN)_A 80, an access network_A' 81, an access network_B 120, a Core Network (CN)_B 190, a core network_A 90, a Data Network (DN)_A 5, a Packet Data Network (PDN)_B 6, and an IMS_A 7. Note that, for the sake of simplicity, the core network_A, and/or the core network_B, and/or the CS network_A or a combination thereof may also be referred to as a core network. The access network_A, and/or the access network_A', and/or the access network B, and/or the CS network_A, or a combination thereof may also be referred to as an access network or a radio access network. The DN_A 5, the PDN_A 6, or a combination thereof may also be referred to as a DN. And in particular, the CS network_A may also be referred to as a circuit switched network or a CS network. Note that the access network_A 80, the access network_A' 81, the access network_B 120, the core network_B 190, the core network_A 90, the data network_A 5, the packet data network_B 6, and the IMS_A 7 may be referred to as a Packet Switched (PS) network or a PS domain.

Additionally, the core network_A, and/or the core network_B, and/or the CS network_A, and/or the one or more apparatuses/functions included in the core networks may be referred to as a core network or core network apparatus.

That is, the core network and/or core network apparatus transmitting and/or receiving a message and/or performing a procedure may mean the core network_A, and/or the core network_B, and/or the CS network_A, and/or one or more apparatuses/functions included in the core networks transmitting and/or receiving the message and/or performing the procedure.

Additionally, an EPS, corresponding to a 4G system, includes the UE, the access network_A, and the core network_A, but may further include a PDN.

Additionally, a 5GS, corresponding to a 5G system, may include the UE, the access network_B, the access network_A', and the core network_B, and may further include a DN. In addition, a base station (eNB and/or ng-eNB) of the access network_A' and a base station (gNB) of the access network_B may be connected to each other by, for example, an Xn interface, but they need not necessarily be connected to each other.

In addition, 3G, corresponding to an old system, includes a Universal Mobile Telecommunications System (UMTS) and includes a UMTS Terrestrial Radio Access Network (UTRAN). Additionally, 2G, corresponding to an old system, includes a global system for mobile communications (GSM (registered trade name)) and includes a GSM (registered trade name) EDGE Radio Access Network (GERAN). Note that wireless access provided by old systems of UMTS and GSM (registered trade name) may be referred to as 2G/3G.

Additionally, the core network_A corresponds to an Evolved Packet Core (EPC). In the EPC, for example, an MME, an SGW, a PGW, a Policy and Charging Rules Function (PCRF), a Home Subscriber Server (HSS), and the like are deployed.

Additionally, the core network_B corresponds to a 5G Core Network (5GC). In the 5GC, for example, an AMF, a UPF, an SMF, a Policy Control Function (PCF), Unified Data Management (UDM), and the like are deployed.

Additionally, the CN network_A 290 is a network of 2G/3G systems and may include a radio access network of 2G/3G systems and/or an apparatus for a voice service described below.

Here, the UE_A 10 may be an apparatus that can connect to a network service via 3GPP access (also referred to as 3GPP access or a 3GPP access network) and/or non-3GPP access (also referred to as non-3GPP access or a non-3GPP access network). In addition, the UE_A 10 may also include a Universal Integrated Circuit Card (UICC) and an embedded UICC (eUICC). Furthermore, the UE_A 10 may be a wirelessly connectable terminal apparatus and may be Mobile Equipment (ME), a Mobile Station (MS), a cellular Internet of Things (CIoT) terminal (CIoT UE), or the like.

In addition, the UE_A 10 can be connected to an access network and/or core network. In addition, the U E_A 10 can be connected to the DN_A 5 and/or the PDN_A 6 via the access network and/or the core network. The UE_A 10 transmits and/or receives (communicates) the user data to and/or from the DN_A 5 and/or the PDN_A 6 by using a Protocol Data Unit or Packet Data Unit (PDU) session and/or a Packet Data Network (PDN) Connection. Furthermore, the communication of the user data is not limited to Internet Protocol (IP) communication, and may be non-IP communication.

Here, IP communication is data communication using IP, and is data communication achieved by transmitting and/or receiving an IP packet including an IP header. Note that a payload section constituting the IP packet may include the user data transmitted and/or received by the UE_A 10. Furthermore, non-IP communication is data communication without using IP, and is data communication achieved by transmitting and/or receiving data without IP header. For example, non-IP communication may be the data communication achieved by transmitting and/or receiving application data without IP header, or may transmit and/or receive the user data, transmitted and/or received by the UE_A 10, that includes another header such as Media Access Control (MAC) header or Ethernet (trade name) frame header.

In addition, a PDU session or a PDN connection is connectivity established between the UE_A 10 and the DN_A 5 and/or the PDN_A 6 to provide a PDU connection service. To be more specific, the PDU session or the PDN connection may be connectivity established between the UE_A 10 and an external gateway. Here, the external gateway may be a User Plane Function (UPF), a Packet Data Network Gateway (PGW), a Service Capability Exposure Function (SCEF), or the like. Furthermore, the PDU session or the PDN connection may be a communication path established to transmit and/or receive the user data between the UE_A 10 and the core network and/or the DN, or a communication path established to transmit and/or receive the PDU. Furthermore, the PDU session or the PDN connection may be a session established between the UE_A 10 and the core network and/or the DN, or may be a logical communication path including a transfer path such as one or more flows or bearers and the like between apparatuses in the mobile communication system 1. To be more specific, the PDU session or the PDN connection may be a connection established between the UE_A 10 and the core network and/or the external gateway, or a connection established between the UE_A 10 and a UPF_A 235 or a PGW_A 30. Note that the PDN connection may be a connection between the UE_A 10 and the PGW_A 30 via the evolved Node B (eNB)_A 45 and/or the Serving Gateway (SGW)_A 35, or connectivity and/or a connection between the UE_A 10 and the SCEF via the eNB_A 45 and/or the Mobility Management Entity (MME)_A 40. Furthermore, the PDU session may be connectivity and/or a connection between the UE_A 10 and the UPF_A 235 via a gNB_A 122 or an eNB_B 145. Furthermore, the PDN connection may be identified by a PDN connection ID, and the PDU session may be identified by a PDU session ID. Furthermore, the PDN connection and the PDU session may be identified by an EPS bearer ID. For simplicity, the PDU session and/or the PDN connection may be referred to as a PDU session.

Note that the UE_A 10 can transmit and/or receive user data to and/or from an apparatus such as an application server that is located in the DN_A 5 and/or the PDN_A 6 by using the PDU session or the PDN connection. In other words, the PDU session or the PDN connection can transfer user data transmitted and/or received between the UE_A 10 and the apparatus such as an application server that is located in the DN_A 5 and/or the PDN_A 6. Furthermore, each apparatus (the UE_A 10, an apparatus in the access network, and/or an apparatus in the core network) may associate one or more pieces of identification information with the PDU session or the PDN connection for management. Note that these pieces of identification information may include at least one of an Access Point Name (APN), a Traffic Flow Template (TFT), a session type, application identification information, identification information of the DN_A 5 and/or the PDN_A 6, Network Slice Instance (NSI) identification information, Dedicated Core Network (DCN) identification information, and access network identification information, or may further include other information. Furthermore, in a case that multiple PDU sessions are established, respective pieces of identification information correlated to the PDU sessions or the PDN connections may have the same contents or different contents. Furthermore, the NSI identification information is information for identifying an NSI, and hereinafter may be an NSI ID or a Slice Instance ID.

In addition, the access network_A, and/or the access network_A', and/or the access network_B may be any of an Evolved Universal Terrestrial Radio Access Network (E-UTRAN)_A 80, a UTRAN_A 20, a GERAN_A 25, a WLAN ANb 75, a WLAN ANa 70, a NG-RAN_A 120, and a WLAN ANc 125. Note that the E-UTRAN_A 80, and/or the NG-RAN_A 120, and/or the UTRAN_A 20, and/or the GERAN_A 25 may be referred to as a 3GPP access network, and the WLAN ANb 75, and/or the WLAN Ana 70, and/or the WLAN ANc 125 may be referred to as a non-3GPP access network. Each radio access network includes an apparatus to which the UE_A 10 is actually connected (e.g., a base station apparatus or an access point), and the like. Note that an apparatus configured with the radio access network is also referred to herein as a radio access system.

For example, the E-UTRAN_A 80 is an access network for Long Term Evolution (LTE) and configured to include one or more eNBs_A 45. The eNB_A 45 is a radio base station to which the UE_A 10 connects through Evolved Universal Terrestrial Radio Access (E-UTRA). Furthermore, in a case that multiple eNBs are present in the E-UTRAN_A 80, the multiple eNBs may be connected to each other.

Additionally, the NG-RAN_A 120 is a 5G access network, and includes one or more NR nodeBs (gNBs)_A 122. The gNB_A 122 is a radio base station to which the UE_A 10 connects for 5G Radio Access. In addition, in a case that multiple gNBs_A 122 are provided in the NG-RAN_A 120, the gNBs_A 122 may be connected to one another. Note that gNB may also be referred to as a New Radio Access Technology node (NR node).

Note that the NG-RAN_A 120 may be an access network including the E-UTRA and/or the 5G Radio Access. In other words, the NG-RAN_A 120 may include the eNB_A 45 and/or the gNB_A 122 and/or the eNB_B 145. In this case, the eNB_A 45 and the gNB_A 122 may be similar apparatuses. Thus, the gNB_A 122 can be replaced with the eNB_A 45 and/or the eNB_B 145.

Note that in the present specification, an eNB connected to the core network_A may also be referred to as an eNB_A, an eNB connected to the core network_B may also be referred to as an eNB_B 145 or Ng-eNB, and a gNB connected to the core network_A may be referred to as an en-gNB. Furthermore, a radio access network including a gNB connected to a 5G network is also referred to as a first radio access system or the access network_A' and a radio access network including an eNB_B connected to a 5G network is also referred to as a second radio access system. Furthermore, the access network_B connected to the core network_B is also referred to as a first access network, the access network_A' connected to the core network_B is also referred to as a second access network, and the access network_A connected to the core network_A is also referred to as a third access network.

Furthermore, access network and core network connection configurations as used herein may, the access network_B connected to the core network_B (New Radio (NR) connected to 5GC), and/or the access network_A' connected to the core network_B (E-UTRA connected to 5GC), and/or the access network_A connected to the core network_A (E-UTRA connected to EPC), and/or a CS network (for simplicity, the access network and the core network are represented as one network).

Additionally, an interface for communication between access network apparatuses may also be provided, and an interface between access network apparatuses connected to the core network_A may be referred to as an X2 interface, an interface between access network apparatuses connected to the core network_B may be referred to as an Xn interface. In other words, for example, an Xn interface may be used for communication between multiple gNBs and/or between multiple Ng-eNBs and/or between multiple gNBs and multiple Ng-eNBs, the gNBs and the Ng-eNBs being connected to the core network_B, and an X2 interface may be used for communication between multiple gNBs and/or between multiple Ng-eNBs and/or between multiple gNBs and multiple Ng-eNBs, the eNBs and the Ng-eNBs being connected to the core network_A. Here, the communication between access network apparatuses may be, but is not limited to, transmission and reception of control information or transfer of user data between the UE_A 10 and the network.

Note that, in the present specification, the expression "the UE_A 10 is connected to each radio access network" is equivalent to "the UE_A 10 is connected to a base station apparatus, an access point, or the like included in each radio access network," and is equivalent to "transmitted and/or received data, signals, and the like are also transferred through the base station apparatus and the access point." Note that control messages transmitted and/or received between the UE_A 10 and the core network_B 190 may be the same control message, regardless of a type of the access network. Accordingly, the expression "the UE_A 10 and the core network_B 190 transmit and/or receive a message to and/or from each other via the gNB_A 122" may be the same as the expression "the UE_A 10 and the core network_B 190 transmit a message to each other via the eNB_A 45 and/or the eNB_B 145."

Furthermore, the access network is a radio network connecting with the UE_A 10 and/or the core network. The access network may be a 3GPP access network, or a non-3GPP access network. Note that the 3GPP access network may be the UTRAN_A 20 and/or the GERAN and/or the E-UTRAN_A 80 and/or the NG-Radio Access Network (RAN)_A 120, and the non-3GPP access network may be the WLAN ANb 75 and/or the W LAN ANa 72 and/or the WLAN ANc 125. Note that the UE_A 10 may connect to the access network or to the core network via the access network in order to connect to the core network.

In addition, the DN_A 5 and/or the PDN_A 6 is a Data Network or a Packet Data Network that provides communication services to the UE_A 10, and may be configured as a packet data service network or may be configured for each service. For example, the DN_A 5 and/or the PDN_A 6 providing an IMS service may be provided, or the DN_A 5 and/or the PDN_A 6 may include an apparatus for providing an IMS service. In other words, the DN_A 5 and/or the PDN_A 6 may be configured as the IMS_A 7, the DN_A 5 and/or the PDN_A 6 may include the IMS_A 7, or the IMS_A 7 may provide the UE_A 10 with a normal call connection service and/or an emergency call connection service for a voice service, and/or a normal call connection service and/or an emergency call connection service for a text message service. Note that only the normal call connection service and/or emergency call connection service for the voice service will be described below, but that the normal call connection service and/or emergency call connection service for the text message service may be performed similarly. Furthermore, the DN_A 5 and/or the PDN_A 6 may include a connected communication terminal. Therefore, connecting to the DN_A 5 and/or the PDN_A 6 may be connecting to a communication terminal or a server apparatus deployed in the DN_A 5 and/or the PDN_A 6. Furthermore, the transmission and/or the reception of the user data to and/or from the DN_A 5 and/or the PDN_A 6 may be the transmission and/or the reception of the user data to and/or from the communication terminal or the server apparatus deployed in the DN_A 5 and/or the PDN_A 6. In addition, although the DN_A 5 and/or the PDN_A 6 is depicted outside the core networks in FIG. 1, they may be within the core networks.

Additionally, the core network_A 90 and/or the core network_B 190 and/or the CS network_A 290 may be configured as one or more core network apparatuses. Here, the core network apparatus may be an apparatus that performs part or all of processing or functions of the apparatuses included in the core network_A 90 and/or the core network_B 190 and/or the CS network_A 290.

Furthermore, the core network is an IP mobile communication network, operated by a Mobile Network Operator (MNO), that connects to the access network and/or the DN. The core network may be a core network for a mobile communication operator that operates and manages the mobile communication system 1, or may be a core network for a virtual mobile communication operator such as a Mobile Virtual Network Operator (MVNO) and a Mobile Virtual Network Enabler (MVNE), or a virtual mobile communication service provider. Note that the core network_A 90 may be an Evolved Packet Core (EPC) constituting an Evolved Packet System (EPS), and the core network_B 190 may be a 5G Core Network (5GC) constituting a 5GS. Conversely, the EPC may be the core network_A 90, and the 5GC may be the core network_B 190. Furthermore, the core network_B 190 may be a core network for a system providing the 5G communication service. Note that the core network_A 90 and/or the core network_B 190 and/or the CS network_A 290 are not limited to those described above, and may be a network for providing a mobile communication service. The 5GS may hereinafter also be referred to as a first network system and the EPS as a second network system. Furthermore, the 5GC may be referred to as a first core network and the EPC as a second core network. Furthermore, the aforementioned first radio access system and/or second radio access system and/or first network system and/or second network system is also collectively simply referred to as a network.

Next, the core networks will be described. In the present embodiment, a configuration example of the core network_A 90 and the core network_B 190 will be described. Note that the core network may be the core network_A 90, the core network_B 190, the CS network_A 290, or a combination thereof.

The core network_A 90 may include at least one of a Home Subscriber Server (HSS)_A 50, an Authentication Authorization Accounting (AAA), a Policy and Charging Rules Function (PCRF), the PGW_A 30, an ePDG, the SGW_A 35, the Mobility Management Entity (MME)_A 40, a Serving GPRS Support Node (SGSN), and an SCEF. Furthermore, these may also be configured as Network Functions (NFs). The NF may be a processing function included in a network. In addition, the core network_A 90 is capable of connecting to multiple radio access networks (the UTRAN_A 20, the GERAN_A 25, the E-UTRAN_A 80, the WLAN ANb 75, and the WLAN ANa 70).

Figure 2:
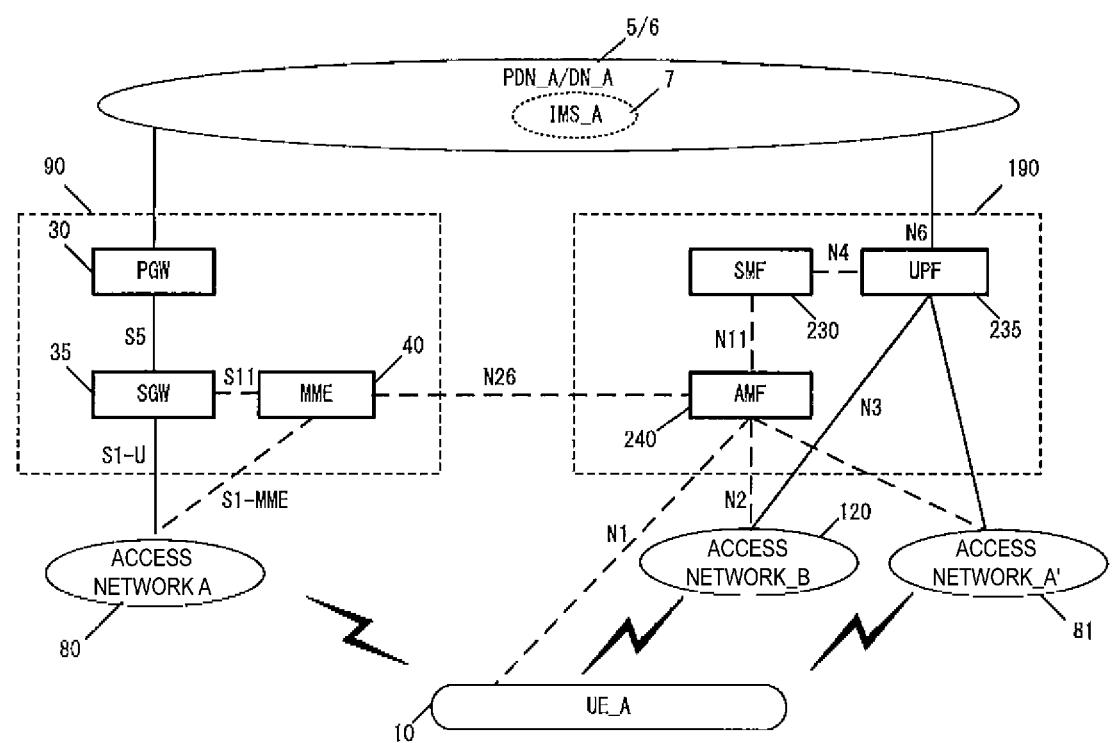
FIG. 2 is a diagram illustrating an example of a configuration and the like of core networks and access networks in the mobile communication system.

Although FIG. 2 illustrates, among the above-described network elements, only the PGW (PGW_A 30), the SGW (SGW_A 35), and the MME (MME_A 40) for simplicity, this does not mean that no other apparatuses and/or NFs are included. Note that the UE_A 10 will also be referred to as UE, the HSS_A 50 as an HSS, the PGW_A 30 as a PGW, the SGW_A 35 as an SGW, the MME_A 40 as an MME, and the DN_A 5 and/or the PDN_A 6 as a DN for simplicity.

Additionally, in FIG. 2, interfaces connecting apparatuses are represented by solid lines or dotted lines. Here, the solid lines indicate interfaces for a U-Plane, and the dotted lines indicate interfaces for a C-Plane.

First, the apparatuses included in the core network_A 90 will be described in brief.

The PGW_A 30 is a relay apparatus that is connected to the DN, the SGW_A 35, the ePDG, the WLAN ANa 70, the PCRF, and the AAA, and transfers the user data as a gateway between the DN (the DN_A 5 and/or the PDN_A 6) and the core network_A 90. Note that the PGW_A 30 may serve as a gateway for the IP communication and/or non-IP communication. Furthermore, the PGW_A 30 may have a function to transfer the IP communication, or may have a function to perform conversion between the non-IP communication and the IP communication. Note that multiple gateways like this may be deployed in the core network_A 90. Furthermore, the multiple gateways deployed may serve as gateways for connecting the core network_A 90 with a single DN.

Note that the User Plane (U-Plane or UP) may be a communication path for transmitting and/or receiving user data, and may include multiple bearers. Furthermore, the Control Plane (C-Plane or CP) may be a communication path for transmitting and/or receiving a control message, and may include multiple bearers.

Furthermore, the PGW_A 30 may be connected to a User Plane Function (UPF) and a Session Management Function (SMF) or may be connected to the UE_A 10 via the U-Plane. Furthermore, the PGW_A 30 may be configured integrally with the UPF_A 235 and/or the SMF_A 230.

The SGW_A 35 is a relay apparatus that is connected to the PGW_A 30, the MME_A 40, the E-UTRAN_A 80, the SGSN, and the UTRAN_A 20, and transfers the user data as a gateway between the core network_A 90 and the 3GPP access networks (the UTRAN_A 20, the GERAN_A 25, and the E-UTRAN_A 80).

The MME_A 40 is a control apparatus that is connected to the SGW_A 35, the access network, the HSS_A 50, and the SCEF, and performs location information management including mobility management of the UE_A 10 via the access network, and access control. Furthermore, the MME_A 40 may include a function as a session management device to manage a session established by the UE_A 10. Multiple control apparatuses like this may be deployed in the core network_A 90, and, for example, a location management apparatus different from the MME_A 40 may be configured. Like the MME_A 40, the location management apparatus different from the MME_A 40 may be connected to the SGW_A 35, the access network, the SCEF, and the HSS_A 50.

Furthermore, in a case that multiple MMEs are included in the core network_A 90, the multiple MMEs may be connected to each other. With this configuration, a context of the UE_A 10 may be transmitted and/or received between the MMEs. In this way, the MME_A 40 is a management apparatus to transmit and/or receive the control information related to the mobility management and the session management to and/or from the UE_A 10. In other words, the MME_A 40 may be a control apparatus for a Control Plane (C-Plane; CP).

The example is described in which the MME_A 40 is configured to be included in the core network_A 90, but the MME_A 40 may be a management apparatus configured in one or multiple core networks, DCNs, or NSIs, or may be a management apparatus connected to one or multiple core networks, DCNs, or NSIs. Here, multiple DCNs or NSIs may be operated by a single network operator, or by different network operators respectively.

The MME_A 40 may be a relay apparatus for transferring the user data as a gateway between the core network_A 90 and the access network. Note that the user data transmitted and/or received by the MME_A 40 serving as a gateway may be small data.

Furthermore, the MME_A 40 may be an NF having a function of the mobility management of the UE_A 10 or the like, or an NF managing one or multiple NSIs. The MME_A 40 may be an NF having one or multiple of these functions. Note that the NF may be one or multiple apparatuses deployed in the core network_A 90, a CP function (hereinafter, also referred to as a Control Plane Function (CPF) or a Control Plane Network Function) for the control information and/or control message, or a common CP function shared between multiple network slices.

Here, the NF is a processing function included in a network. That is, the NF may be a function apparatus such as an MME, an SGW, a PGW, a CPF, an AMF, an SMF, or a UPF, or may be a function such as mobility management (MM) and session management (SM), or capability information. The NF may be a function device to realize a single function, or a function device to realize multiple functions. For example, an NF to realize the MM function and an NF to realize the SM function may be separately present, or an NF to realize both the MM function and the SM function may be present.

The HSS_A 50 is a managing node that is connected to the MME_A 40, the AAA, and the SCEF, and manages subscriber information. The subscriber information of the HSS_A 50 is referred to during the access control performed by the MME_A 40, for example. Furthermore, the HSS_A 50 may be connected to a location management device different from the MME_A 40. For example, the HSS_A 50 may be connected to the CPF_A 140.

Furthermore, the HSS_A 50, a Unified Data Management (UDM)_A 245 may be configured as different apparatuses and/or NFs or the same apparatus and/or NF.

The AAA is connected to the PGW 30, the HSS_A 50, the PCRF, and the WLAN ANa 70 and performs access control for the UE_A 10 connected via the WLAN ANa 70.

The PCRF is connected to the PGW_A 30, the WLAN ANa 75, the AAA, the DN_A 5 and/or the PDN_A 6 and performs QoS management on data delivery. For example, the PCRF manages QoS of a communication path between the UE_A 10, the DN_A 5, and/or the PDN_A 6. Furthermore, the PCRF may be an apparatus to create and/or manage a Policy and Charging Control (PCC) rule and/or a routing rule used by each apparatus for transmitting and/or receiving user data.

In addition, the PCRF may be a PCF to create and/or manage policies. More specifically, the PCRF may be connected to the UPF_A 235.

The ePDG is connected to the PGW 30 and the WLAN ANb 75 and delivers user data as a gateway between the core network_A 90 and the WLAN ANb 75.

The SGSN is a control apparatus, connected to the UTRAN_A 20, the GERAN, and the SGW_A 35, for performing location management between the access network (UTRAN/GERAN) of 3G/2G and the access network (E-UTRAN) of LTE. In addition, the SGSN has functions of selecting the PGW and the SGW, managing a time zone of the UE_A 10, and selecting the MME_A 40 at the time of handover to the E-UTRAN.

The SCEF is a relay apparatus that is connected to the DN_A 5 and/or the PDN_A 6, the MME_A 40, and the HSS_A 50 and transfers the user data as a gateway for connecting the DN_A 5 and/or the PDN_A 6 with the core network_A 90. Note that the SCEF may correspond to a gateway for non-IP communication. Furthermore, the SCEF may have a function to perform conversion between non-IP communication and IP communication. Multiple gateways like this may be deployed in the core network_A 90. Furthermore, multiple gateways connecting the core network_A 90 with a single DN_A 5 and/or PDN_A 6 and/or DN may be also deployed. Note that the SCEF may be configured outside or inside the core network.

Next, the core network_B 190 may include at least one of an Authentication Server Function (AUSF), an Access and Mobility Management Function (AMF)_A 240, a Structured Data Storage network function (SDSF), an Unstructured Data Storage network function (UDSF), a Network Exposure Function (NEF), an NF Repository Function (NRF), a Policy Control Function (PCF), a Session Management Function (SMF)_A 230, a Session Management Function (SMF)_B 232, a Unified Data Management (UDM)_A 245, a User Plane Function (UPF)_A 235, a User Plane Function (UPF)_B 237, an Application Function (AF), and a Non-3GPP InterWorking Function (N3IWF). Furthermore, these may also be configured as Network Functions (NFs). The NF may be a processing function included in a network. In addition, the core network_B 190 is capable of connecting to multiple radio access networks (the E-UTRAN_A 80, the NG-RAN_A 120, and the WLAN). The radio access network may be configured to connect to multiple different access networks or may be connected to any one access network.

Although FIG. 2 illustrates, among the above-described elements, only the AMF_A 240, the SMF_A 230, and the UPF_A 235 for simplicity, this does not mean that no other elements (apparatuses and/or NFs) are included. Note that the UE_A 10 will also be referred to as UE, the AMF_A 240 as an AMF, the SMF_A 230 as an SMF, the UPF_A 235 as a UPF, and the DN_A 5 and/or the PDN_A 6 as a DN for simplicity.

In addition, FIG. 2 illustrates an N1 interface (hereinafter, also referred to as a reference point), an N2 interface, an N3 interface, an N4 interface, an N6 interface, an N11 interface, and an N26 interface. Here, the N1 interface is an interface between the UE and the AMF, the N2 interface is an interface between the (R)AN (access network) and the AMF, and the N3 interface is an interface between the (R)AN (access network) and the UPF, the N4 interface is an interface between the SMF and the UPF, the N6 interface is an interface between the UPF and the DN, the N11 interface is an interface between the AMF and the SMF, and the N26 interface is an interface between the AMF of the core network_B 190 and the MME of the core network_A 90. These interfaces can be used to perform communication between the apparatuses. Furthermore, in FIG. 2, the interfaces between the apparatuses are represented by solid lines or dotted lines. Here, the solid lines indicate interfaces for the U-Plane, and the dotted lines indicate interfaces for the C-Plane.

Now, a brief description of each apparatus included in the core network_B 190 is given.

First, the AMF_A 240 is connected to another AMF, the SMF_A 230, access networks (i.e., the E-UTRAN_A 80, the NG-RAN_A 120, the WLAN ANc 125, the WLAN ANa 70, and the WLAN ANb 75), the UDM_A 245, the AUSF, and the PCF. The AMF_A 240 may play roles of registration management, connection management, reachability management, mobility management of the UE_A 10 or the like, transfer of a Session Management (SM) message between the UE and the SMF, access authentication or access authorization, a Security Anchor Function (SEA), Security Context Management (SCM), support for the N2 interface for the N3IWF, support for transmission and/or reception of NAS signals to and/or from the UE via the N3IWF, authentication of the UE connected via the N3IWF, management of Registration Management (RM) states, management of Connection Management (CM) states, and the like. In addition, one or more AMF_A 240s may be deployed within the core network_B 190. In addition, the AMF_A 240 may be an NF that manages one or more Network Slice Instances (NSI). In addition, the AMF_A 240 may also be a Common Control Plane Network Function (Common CPNF, or CCNF) shared among multiple NSIs.

Additionally, the RM state includes a deregistered state (RM-DEREGISTERED state) and a registered state (RM-REGISTERED state), for example. In the RM-DEREGISTERED state, the UE is not registered in the network, and thus the AMF is not able to reach the UE because the UE context in the AMF does not have valid location information and routing information for the UE. In the RM-REGISTERED state, the UE is registered in the network, and thus the UE can receive services that requires registration with the network.

Additionally, the CM state includes a disconnected state (CM-IDLE state) and a connected state (CM-CONNECTED state), for example. In the CM-IDLE state, the UE is in the RM-REGISTERED state but does not have a NAS signaling connection established between the AMF and the UE via the N1 interface. Also, in the CM-IDLE state, the UE does not have an N2 interface connection (N2 connection) and an N3 interface connection (N3 connection). On the other hand, in the CM-CONNECTED state, the UE has the NAS signaling connection established between the AMF and the UE via the N1 interface. Also, in the CM-CONNECTED state, the UE may have the N2 interface connection (N2 connection) and/or the N3 interface connection (N3 connection).

In addition, the SMF_A 230 is connected to the AMF_A 240, the UPF_A 235, the UDM_A 245, and the PCF. The SMF_A 230 may play roles of Session Management of PDU session, or the like, IP address allocation for the UE, UPF selection and control, UPF configuration for routing traffic to an appropriate destination, a function of reporting arrival of downlink data (Downlink Data Notification), determination of a Session and Service Continuity mode (SSC mode) for a session and an identifier of SM information unique to the AN (for each AN) to be transmitted to the AN via the AMF and the N2 interface, a roaming function, and the like.

In addition, the UPF_A 235 is connected to the DN_A 5, the SMF_A 230, another UPF, and the access networks (i.e. the E-UTRAN_A 80, the NG-RAN_A 120, the WLAN ANc 125, the WLAN ANa 70, and the WLAN ANb 75). The UPF_A 235 may play roles of an anchor to intra-RAT mobility or inter-RAT mobility, packet routing & forwarding, an Uplink Classifier (UL CL) function to support routing of multiple traffic flows for one DN, a Branching point function to support a multi-homed PDU session, QoS processing for a User Plane, verification of uplink traffic, buffering of downlink packets, a function of triggering Downlink Data Notification, and the like. Furthermore, the UPF_A 235 may be a relay apparatus that transfers the user data as a gateway between the DN_A 5 and the core network_B 190. Note that the UPF_A 235 may serve as a gateway for IP communication and/or non-IP communication. Furthermore, the UPF_A 235 may have a function of transferring IP communication or a function to perform conversion between non-IP communication and IP communication. The multiple gateways deployed may serve as gateways for connecting the core network_B 190 with a single DN. Note that the UPF_A 235 may have connectivity with another NF or may be connected to each apparatus via another NF.

Additionally, the AUSF is connected to the UDM_A 245 and the AMF_A 240. The AUSF functions as an authentication server.

The SDSF provides a function for the NEF to save or acquire information as structured data.

The UDSF provides a function for all NFs to store or retrieve information as unstructured data.

The NEF provides a means to securely provide services and capabilities provided by the 3GPP network. The NEF stores information received from another NF as structured data.

In a case that a NF discovery request is received from a NF instance, the NRF provides the NF with information of found NF instances or holds information of available NF instances or services supported by the instances.

The PCF is connected to the SMF_A 230, the AF, and the AMF_A 240. The PCF provides a policy rule and the like.

The UDM_A 245 is connected to the AMF_A 240, the SMF_A 230, the AUSF, and the PCF. The UDM_A 245 includes a UDM FE (application front end) and a User Data Repository (UDR). The UDM FE performs processing of authentication information (credentials), location management, subscriber management (subscription management), and the like. The UDR stores data necessary for the UDM FE for provision and the policy profiles necessary for the PCF.

The AF is connected to the PCF. The AF affects traffic routing or is involved in the policy control.

The N3IWF provides functions of establishing an IPsec tunnel with the UE, relaying NAS (N1) signaling between the UE and the AMF, processing N2 signaling transmitted from the SMF and relayed by the AMF, establishing IPsec Security Association (IPsec SA), relaying User Plane packets between the UE and the UPF, selecting the AMF, and the like.

Next, the IMS_A 7 may include at least one of a Proxy Call Session Control Function (Proxy-CSCF, P-CSCF)_A 300, P-CSCF_B 310, an Interrogation Call Session Control Function (Interrogating-CSCF, I-CSCF), Serving Call Session Control Function (Serving-CSCF, S-CSCF)_A 320; an Emergency Call Session Control Function (Emergency-CSCF, E-CSCF)_A 330. Furthermore, these may also be configured as Network Functions (NFs). The NF may be a processing function included in a network. Here, the Call Session Control Function (CSCF) is a generic name for apparatuses and/or NFs playing the role of a server and/or a proxy, such as P-CSCF and/or S-CSCF and/or E-CSCF and/or I-CSCF, for processing signal packets for a Session Initiation Protocol (SIP) in an IP Multimedia subsystem (IMS).

Figure 3:
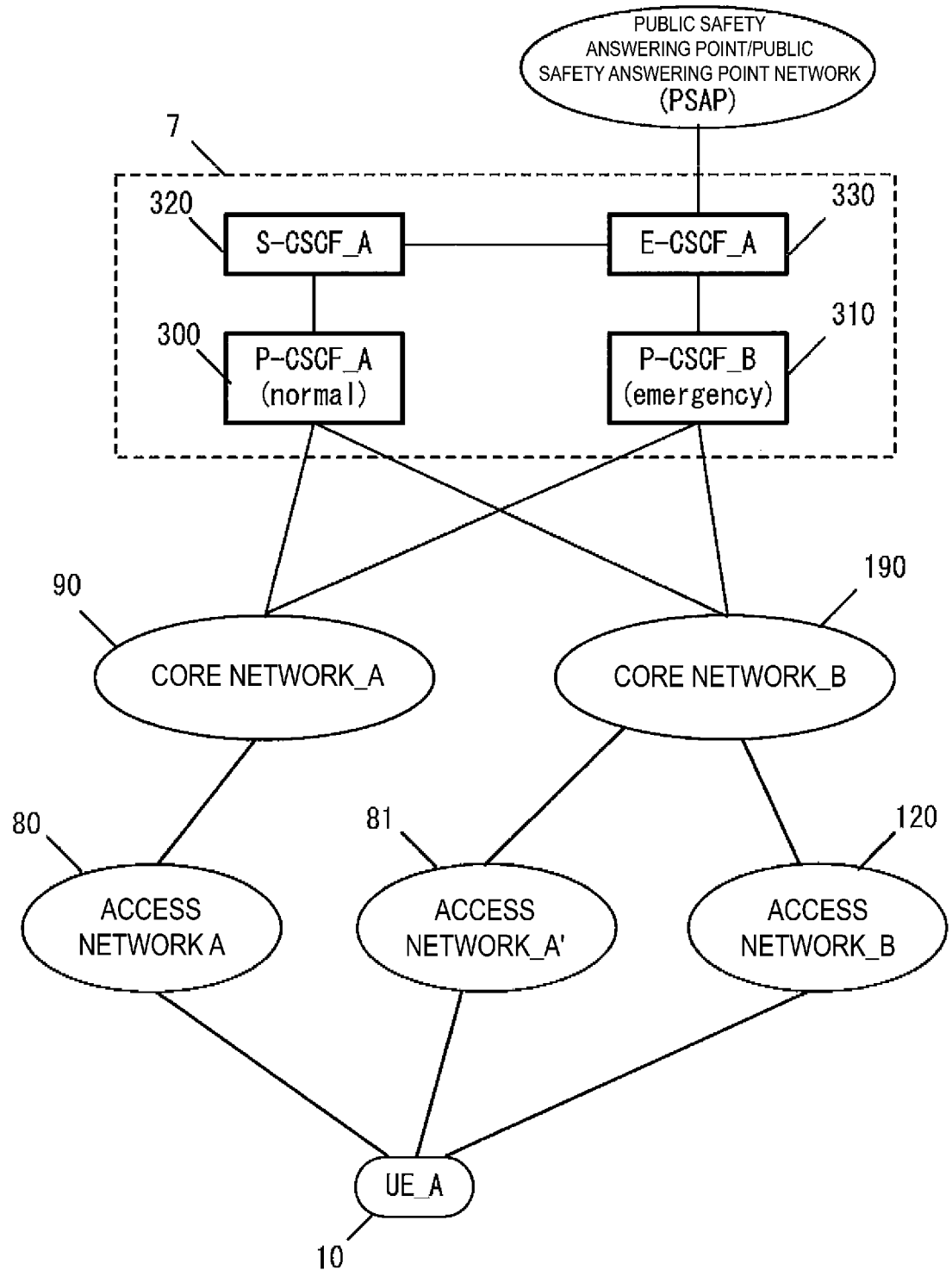
FIG. 3 is a diagram schematically illustrating connections among a public safety answering point, an IMS, and core networks for normal voice call and emergency call connection services.

Although FIG. 3 illustrates only the P-CSCF_A 300, the P-CSCF_B 310, the S-CSCF_A 320, and E-CSCF_A 330 for simplicity, this does not mean that no other elements (apparatuses and/or NFs) are included. Note that for simplicity, the P-CSCF_A 300 and/or the P-CSCF_B 310 are also referred to as the P-CSCF, the S-CSCF_A 320 is also referred to as the S-CSCF, and the E-CSCF_A 330 is also referred to as the E-CSCF.

Additionally, a Public Safety Answering Point (PSAP)/Public Safety Answering Point network illustrated in FIG. 3 may be a connection destination of an emergency call connection requested by the UE_A 10 and/or a connection destination network.

Now, the apparatuses included in the IMS_A 7 will be described in brief.

First, the P-CSCF is connected to the core network_A and/or the core network_B and/or the UPF and/or the PWG and/or the S-CSCF and/or the E-CSCF and/or the like. The P-CSCF is a SIP proxy server used in a case that the UE_A 10 connects to the IMS_A 7. The P-CSCF is an IMS_A 7 apparatus to which the UE_A 10 first connects, and may be assigned to the UE_A 10 in a registration procedure described below, and the UE_A 10 may acquire the destination address of the P-CSCF during the procedure. Furthermore, the P-CSCF may use different apparatuses and/or NFs or the same apparatus and/or NF to perform a normal call connection process and an emergency call connection process requested by the UE_A 10.

Additionally, the S-CSCF is connected to the HSS_A 50 and/or UDM_A 245 and/or P-CSCF and/or I-CSCF and/or E-CSCF and/or the like. The S-CSCF is a SIP server that performs session control and/or user authentication for the IMS related to the UE_A 10.

The E-CSCF is connected to the P-CSCF and/or the S-CSCF and/or the I-CSCF and/or the public safety answering point/public safety answering point network (PSAP), and/or the like. The E-CSCF is a CSCF for processing an emergency call, and may perform e.g., route control of an emergency call request to an appropriate public safety answering point/public safety answering point network (PSAP).

2. CONFIGURATION OF APPARATUSES

The configuration of apparatuses will be described below. Note that some or all of apparatuses to be described below and functions of units of the apparatuses may operate on physical hardware, or logical hardware which is virtually configured on general-purpose hardware.

2.1. Configuration of UE

Figure 5:
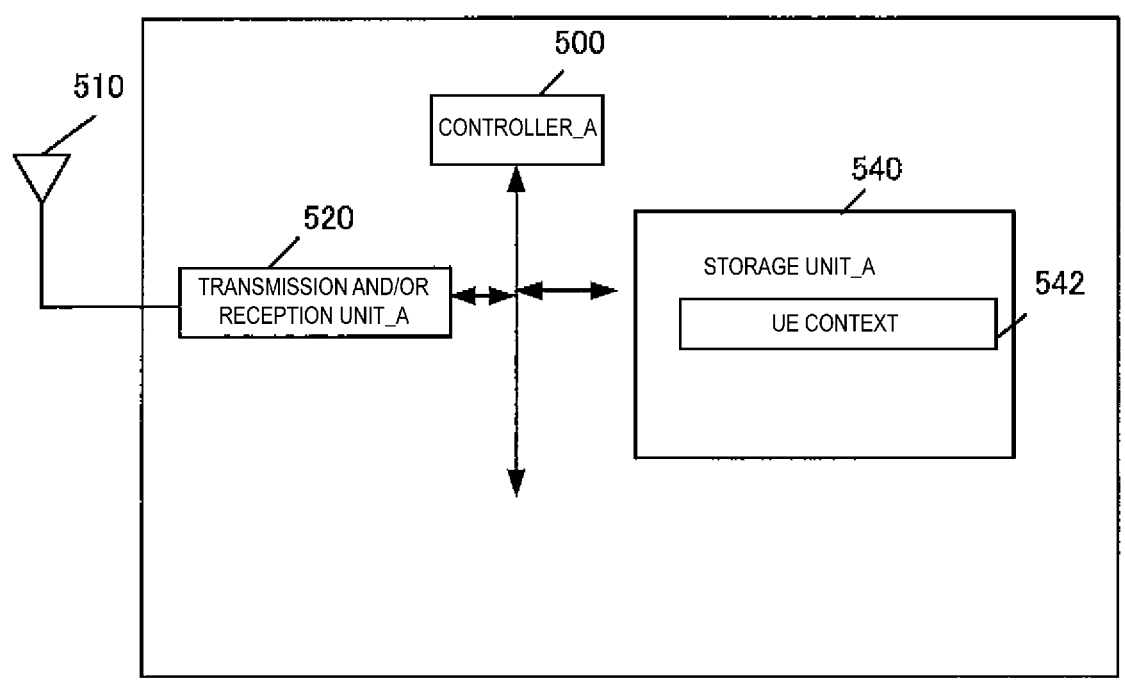
FIG. 5 is a diagram illustrating an apparatus configuration of UE.

First, an example of an apparatus configuration of the UE_A 10 is illustrated in FIG. 5. As illustrated in FIG. 5, the UE_A 10 includes a controller_A 500, a transmission and/or reception unit_A 520, and a storage unit_A 540. The transmission and/or reception unit_A 520 and the storage unit_A 540 are connected to the controller_A 500 via a bus. Additionally, an external antenna 510 is connected to the transmission and/or reception unit_A 520. In addition, the storage unit_A 540 stores a UE context 442.

The controller_A 500 is a function unit for controlling the entire UE_A 10 and implements various processes of the entire UE_A 10 by reading out and performing various types of information and programs stored in the storage unit_A 540.

The transmission and/or reception unit_A 520 is a function unit through which the UE_A 10 connects to the base station (the E-UTRAN_A 80 and the NG-RAN_A 120) and/or the access point (the WLAN ANc 125) in the access network to connect to the access network. In other words, the UE_A 10 can connect to the base station and/or the access point in the access network via the external antenna 510 connected to the transmission and/or reception unit_A 520. To be specific, the UE_A 10 can transmit and/or receive user data and/or control information to and/or from the base station and/or the access point in the access network via the external antenna 510 connected to the transmission and/or reception unit_A 520.

The storage unit_A 540 is a function unit that stores programs, data, and the like necessary for each operation of the UE_A 10, and include, for example, a semiconductor memory, a Hard Disk Drive (HDD), a Solid State Drive (SSD), or the like. The storage unit_A 540 stores identification information, control information, a flag, a parameter, and the like included in a control message which is transmitted and/or received in the communication procedure described below. The UE context stored in the storage unit_A 540 may include, for example, a UE context used in connecting to the access network_B 120 and a UE context used in connecting to the core network_B 190. In addition, examples of the UE context 442 may include a UE context stored for each UE, a UE context stored for each PDU session, and a UE context stored for each bearer. The UE context stored for each UE may include an IMSI, an EMM State, a GUTI, and an ME Identity. Additionally, the UE context stored for each PDU session may include an APN in Use, an Assigned Session Type, an IP Address(es), and a Default Bearer. The UE context stored for each bearer may include an EPS Bearer ID, a TI, and a TFT.

2.2 Configuration of Access Network Apparatus

Figure 6:
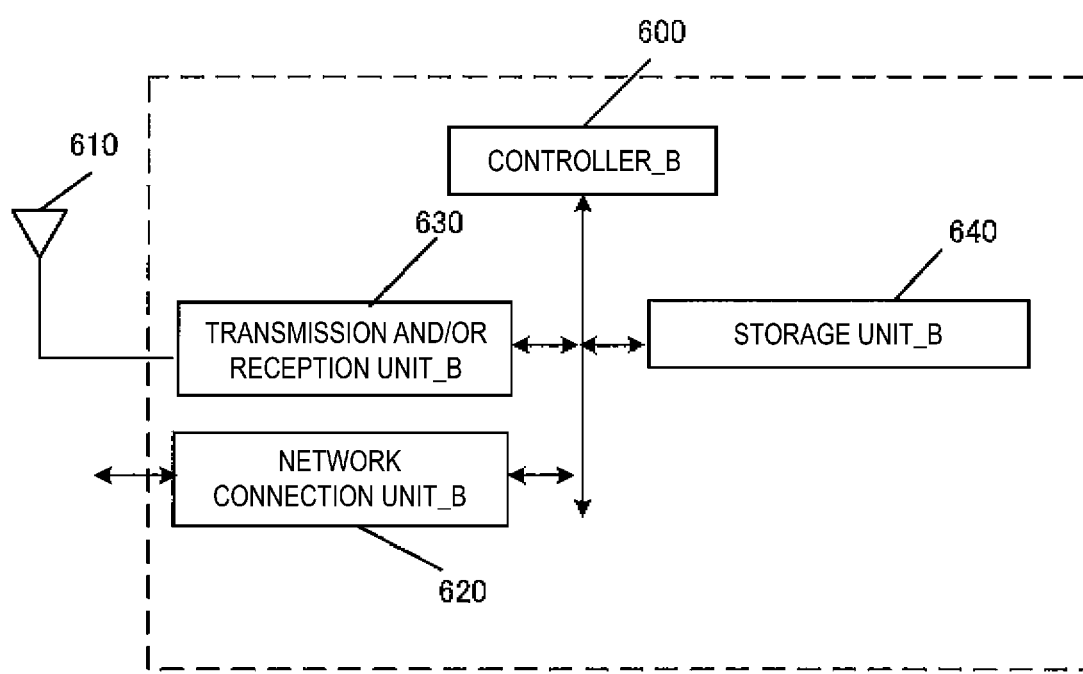
FIG. 6 is a diagram illustrating a configuration of an access network apparatus.

Next, FIG. 6 illustrates an example configuration of an access network apparatus. The access network apparatus may include, for example and without limitation, the eNB_A 45 and/or the eNB_B and/or the gNB_A 122 and/or the WAG_A 126. As illustrated in FIG. 6, the access network apparatus includes a controller_B 600, a network connection unit_B 620, a transmission and/or reception unit_B 630, and a storage unit_B 640. The network connection unit_B 620, the transmission and/or reception unit_B 630, and the storage unit_B 640 are connected to the controller_B 600 via a bus. Furthermore, an external antenna 610 is connected to the transmission and/or reception unit_B 630.

The controller_B 600 is a function unit for controlling all of the access network apparatuses, and implements various processes of all of the eNB_A 45, the gNB_A 122, and the WAG_A 126 by reading out and performing various types of information and programs stored in the storage unit_B 640.

The network connection unit_B 620 is a function unit through which the access network apparatus connects to the AMF_A 240 and the UPF_A 235 in the core network. In other words, the access network apparatus can connect to the AMF_A 240 and the UPF_A 235 in the core network via the network connection unit_B 620. Specifically, the access network apparatus can transmit and/or receive user data and/or control information to and/or from the AMF_A 240 and/or the UPF_A 235 via the network connection unit_B 620.

The transmission and/or reception unit_B 630 is a function unit through which the access network apparatus connects to the UE_A 10. In other words, the access network apparatus can transmit and/or receive user data and/or control information to and/or from the UE_A 10 via the transmission and/or reception unit_B 630.

The storage unit_B 640 is a function unit configured to store programs, data, and the like necessary for each operation of the access network apparatus. The storage unit_B 640 includes, for example, a semiconductor memory, an HDD, an SSD, or the like. The storage unit_B 640 stores identification information, control information, a flag, a parameter, and the like included in a control message which is transmitted and/or received in the communication procedure described below. The storage unit_B 640 may store these pieces of information as the contexts for each UE_A 10.

2.3. Configuration of MME/AMF

Figure 7:
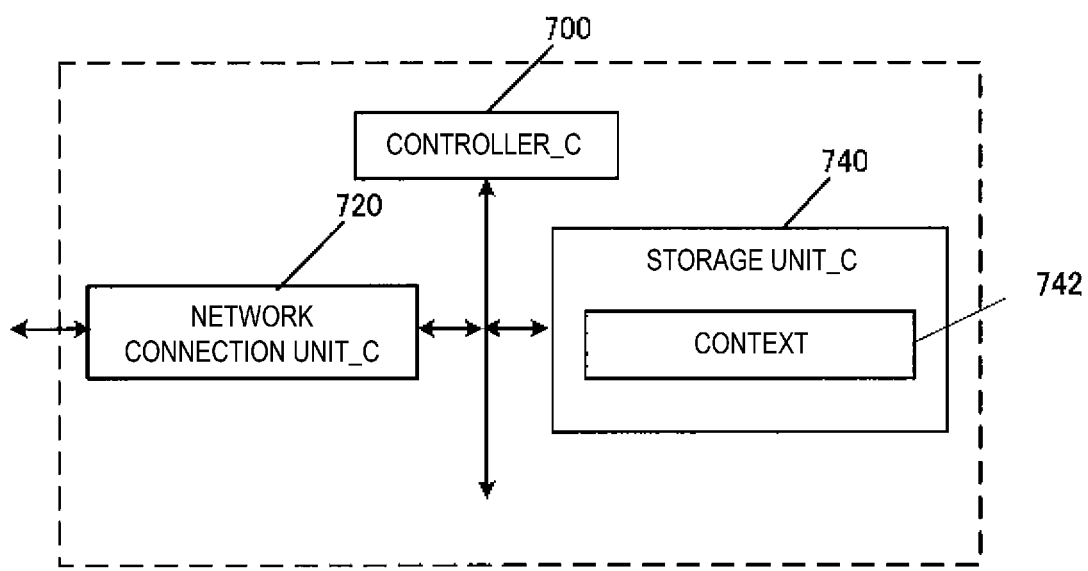
FIG. 7 is a diagram illustrating an apparatus configuration of an MME/AMF.

Next, FIG. 7 illustrates an example of an apparatus configuration of the MME_A 40 and/or the AMF_A 240. As illustrated in FIG. 7, the MME_A 40 and/or the AMF_A 240 includes a controller_C 700, a network connection unit_C 720, and a storage unit_C 740. The network connection unit_C 720 and the storage unit_C 740 are connected to the controller_C 700 via a bus. Furthermore, the storage unit_C 740 stores a context 742.

The controller_C 700 is a function unit for controlling all of the MME_A 40 and/or the AMF_A 240, and implements various processes of all of the MME_A 40 and/or the AMF_A 240 by reading out and performing various types of information and programs stored in the storage unit_C 740.

The network connection unit_C 720 is a function unit through which the MME_A 40 and/or the AMF_A 240 connect to another AMF 240, SMF_A 230, a base station (the E-UTRAN_A 80 and the NG-RAN_A 120) and/or an access point (the WLAN ANc 125), the UDM_A 245, the AUSF, and the PCF in the access network. In other words, the MME_A 40 and/or the AMF_A 240 can transmit and/or receive user data and/or control information to and/or from the base station and/or access point, the UDM_A 245, the AUSF, and the PCF in the access network via the network connection unit_C 720.

The storage unit_C 740 is a function unit for storing programs, data, and the like necessary for each operation of the MME_A 40 and/or the AMF_A 240. The storage unit_C 740 includes, for example, a semiconductor memory, an HDD, an SSD, or the like. The storage unit_C 740 stores identification information, control information, a flag, a parameter, and the like included in a control message which is transmitted and/or received in the communication procedure described below. Examples of the context 742 stored in the storage unit_C 740 may include a context stored for each UE, a context stored for each PDU session, and a context stored for each bearer. The context stored for each UE may include an IMSI, an MSISDN, an MM State, a GUTI, an ME Identity, a UE Radio Access Capability, a UE Network Capability, an MS Network Capability, an Access Restriction, an MME F-TEID, an SGW F-TEID, an eNB address, an MME UE SlAP ID, an eNB UE SlAP ID, a gNB Address, a gNB ID, a WAG Address, and a WAG ID. Furthermore, the context stored for each PDU session may include an APN in Use, an assigned session type, IP address(es), a PGW F-TEID, an SCEF ID, and a default bearer. Additionally, the context stored for each bearer may include an EPS Bearer ID, a TI, a TFT, an SGW F-TEID, a PGW F-TEID, an MME F-TEID, an eNB address, a gNB address, a WAG address, an eNB ID, a gNB ID, and a WAG ID.

2.4. Configuration of SMF

Figure 8:
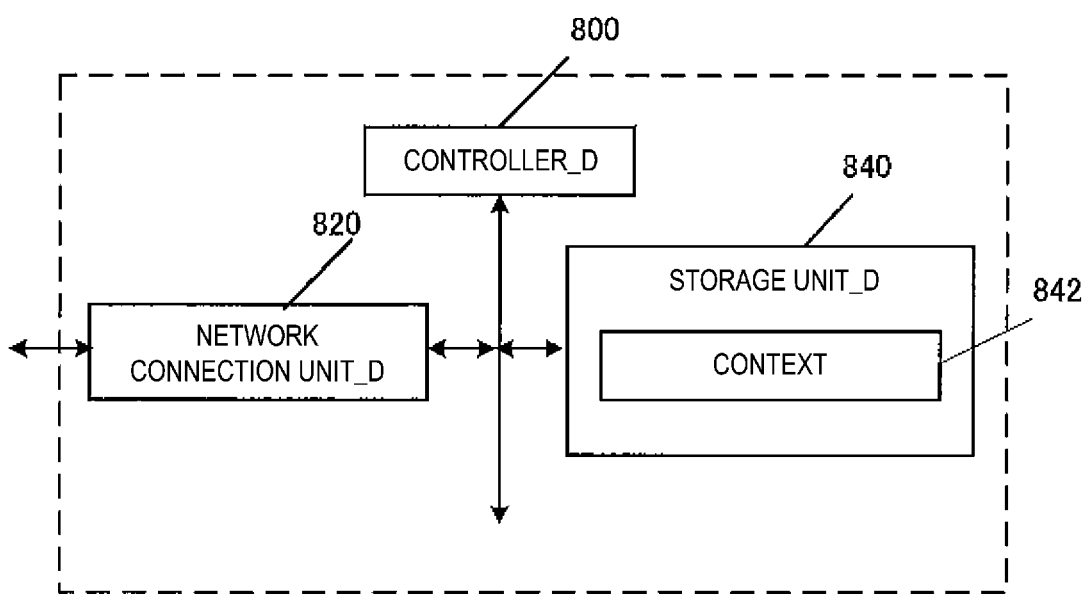
FIG. 8 is a diagram illustrating an apparatus configuration of an SMF/PGW/UPF.

Next, FIG. 8 illustrates an example of an apparatus configuration of the SMF_A 230. As illustrated in FIG. 8, the SMF_A 230 includes a controller_D 800, a network connection unit_D 820, and a storage unit_D 840. The network connection unit_D 820 and the storage unit_D 840 are connected to the controller_D 800 via a bus. In addition, the storage unit_D 840 stores a context 842.

The controller_D 800 of the SMF_A 230 is a function unit for controlling the entire SMF_A 230 and implements various processes of the entire SMF_A 230 by reading out and performing various types of information and programs stored in the storage unit_D 840.

Furthermore, the network connection unit_D 820 of the SMF_A 230 is a function unit through which the SMF_A 230 connects to the AMF_A 240, the UPF_A 235, the UDM_A 245, and the PCF. In other words, the SMF_A 230 can transmit and/or receive user data and/or control information to and/or from the AMF_A 240, the UPF_A 235, the UDM_A 245, and the PCF via the network connection unit_D 820.

Furthermore, the storage unit_D 840 of the SMF_A 230 is a function unit for storing programs, data, and the like necessary for each operation of the SMF_A 230. The storage unit_D 840 of the SMF_A 230 includes, for example, a semiconductor memory, an HDD, an SSD, or the like. The storage unit_D 840 of the SMF_A 230 stores identification information, control information, a flag, a parameter, and the like included in a control message which is transmitted and/or received in the communication procedure described below. In addition, examples of the context 842 stored in the storage unit_D 840 of the SMF_A 230 may include a context stored for each UE, a context stored for each APN, a context stored for each PDU session, and a context stored for each bearer. The context stored for each UE may include an IMSI, an ME Identity, an MSISDN, and a RAT type. The context stored for each APN may include an APN in use. Note that the context stored for each APN may be stored for each data network identifier. The context stored for each PDU session may include Assigned Session Type, IP Address(es), SGW F-TEID, PGW F-TEID, and Default Bearer. The context stored for each bearer may include an EPS bearer ID, a TFT, an SGW F-TEID, and a PGW F-TEID.

2.5. Configuration of PGW/UPF

Next, FIG. 8 illustrates an example of an apparatus configuration of the PGW_A 30 and/or the UPF_A 235. As illustrated in FIG. 8, each of the PGW_A 30 and/or the UPF_A 235 includes a controller_D 800, a network connection unit_D 820, and a storage unit_D 840. The network connection unit_D 820 and the storage unit_D 840 are connected to the controller_D 800 via a bus. In addition, the storage unit_D 840 stores a context 842.

The controller_D 800 of the PGW_A 30 and/or the UPF_A 235 is a function unit for controlling the entire UPF_A 235, and implements various processes of all of the PGW_A 30 and/or the UPF_A 235 by reading out and performing various types of information and programs stored in the storage unit_D 840.

Furthermore, the network connection unit_D 820 of the PGW_A 30 and/or the UPF_A 235 is a function unit through which the PGW_A 30 and/or the UPF_A 235 connects to a DN (i.e., the DN_A 5 and/or the PDN_A 6), the SMF_A 230, another PGW_A 30 and/or the UPF_A 235, and an access network (i.e., the E-UTRAN_A 80, the NG-RAN_A 120, the WLAN ANc 125, the WLAN ANa 70, and the WLAN ANb 75). In other words, the UPF_A 235 can transmit and/or receive user data and/or control information to and/or from the DN (i.e., the DN_A 5 and/or the PDN_A 6), the SMF_A 230, the other UPF_A 235, and the access network (i.e. the E-UTRAN_A 80, the NG-RAN_A 120, the WLAN ANc 125, the WLAN ANa 70, and the WLAN ANb 75) via the network connection unit_D 820.

Furthermore, the storage unit_D 840 of the PGW_A 30 and/or the UPF_A 235 is a function unit for storing programs, data, and the like necessary for each operation of the PGW_A 30 and/or the UPF_A 235. The storage unit_D 840 of the PGW_A 30 and/or the UPF_A 235 includes, for example, a semiconductor memory, an HDD, an SSD, or the like. The storage unit_D 840 of the PGW_A 30 and/or the UPF_A 235 stores identification information, control information, a flag, a parameter, and the like included in a control message which is transmitted and/or received in the communication procedure described below. In addition, examples of the context 842 stored in the storage unit_D 840 of the PGW_A 30 and/or the UPF_A 235 may include a context stored for each UE, a context stored for each APN, a context stored for each PDU session, and a context stored for each bearer. The context stored for each UE may include an IMSI, an ME Identity, an MSISDN, and a RAT type. The context stored for each APN may include an APN in use. Note that the context stored for each APN may be stored for each data network identifier. The context stored for each PDU session may include an Assigned Session Type, an IP Address(es), an SGW F-TEID, a PGW F-TEID, and a Default Bearer. The context stored for each bearer may include an EPS Bearer ID, a TFT, an SGW F-TEID, and a PGW F-TEID.

2.6. Configuration of CSCF

Figure 9:
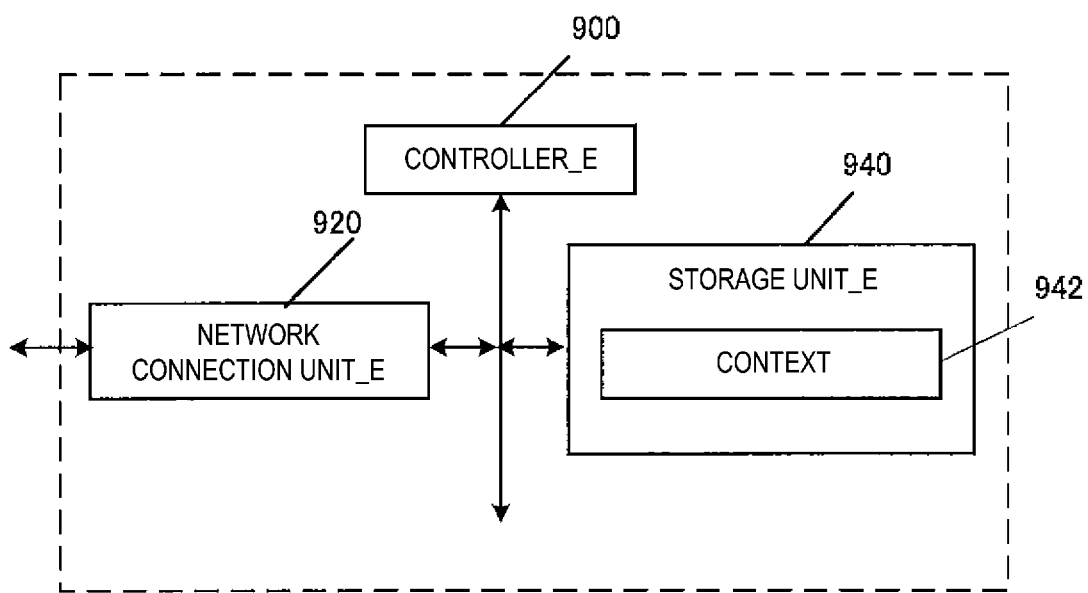
FIG. 9 is a diagram illustrating an apparatus configuration of a CSCF.

Next, FIG. 9 illustrates a configuration example of the CSCF. As illustrated in FIG. 9, the CSCF includes a controller_E 900, a network connection unit_E 920, and a storage unit_E 940. The network connection unit_E 920 and the storage unit_E 940 are connected to the controller_E 900 via a bus. In addition, the storage unit_E 940 stores a context 942.

The controller_E 900 of the CSCF is a function unit for controlling the entire CSCF and implements various processes of the entire CSCF by reading out and performing various types of information and programs stored in the storage unit_E 940.

Additionally, the network connection unit_E 920 of the CSCF is a function unit for the CSCF to connect to the other CSCF, the UPF_A 235, the PGW_A 30, the HSS_A 50, and the UDM_A 245. In other words, the CSCF can transmit and/or receive user data and/or control information to and/or from the other CSCF, the UPF_A 235, the PGW_A 30, the HSS_A 50, and the UDM_A 245 via the network connection unit_E 920.

Additionally, the storage unit_E 940 of the CSCF is a function unit for storing programs, data, and the like necessary for each operation of the CSCF. The storage unit_E 940 includes, for example, a semiconductor memory, an HDD, an SSD, or the like. The storage unit_E 940 stores identification information, control information, a flag, a parameter, and the like included in a control message which is transmitted and/or received in the communication procedure described below. The context 942 stored in the storage unit_E 940 may include a context stored for each UE, and may include the IMSI, the MSISDN, a UE Address, a Public User ID(s), a Private User ID(s), an access network type, and session state information.

2.7. Information Stored in Storage Unit of Each Apparatus

Next, each piece of information stored in the storage unit of each of the above-described apparatuses will be described.

An International Mobile Subscriber Identity (IMSI) and/or a Subscriber Permanent Identifier (SUPI) is permanent identification information of a subscriber (user), and is identification information assigned to a user using the UE. The IMSI and/or SUPI stored by the UE_A 10, the MME_A 40/CPF_A 140/AMF_A 2400, and the SGW_A 35 may be equal to the IMSI and/or SUPI stored by the HSS_A 50 and/or the UDM_A 245. Here, the SUPI may include the IMSI.

The EMM State/MM State indicates a mobility management state of the UE_A 10 or the MME_A 40/CPF_A 140/AMF_A 240. For example, the EMM State/MM State may be an EMM-REGISTERED state (registered state) in which the UE_A 10 is registered in the network, and/or an EMM-DEREGISTERED state (deregistered state) in which the UE_A 10 is not registered in the network. The EMM State/MM State may be an ECM-CONNECTED state in which a connection is maintained between the UE_A 10 and the core network, and/or an ECM-IDLE state in which the connection is released. Note that the EMM State/MM State may be information for distinguishing a state in which the UE_A 10 is registered in the EPC from a state in which the UE_A 10 is registered in the NGC or 5GC.

The Globally Unique Temporary Identity (GUTI) is temporary identification information of the UE_A 10. The GUTI includes identification information (Globally Unique MME Identifier (GUMMEI)) of the MME_A 40/CPF_A 140/AMF_A 240 and identification information (M-Temporary Mobile Subscriber Identity (M-TMSI)) of the UE_A 10 in a specific MME_A 40/CPF_A 140/AMF_A 240. The ME Identity is an ID of the UE_A 10 or the ME, and may be International Mobile Equipment Identity (IMEI) or IMEI Software Version (IMEISV), for example. The MSISDN represents a basic phone number of the UE_A 10. The MSISDN stored by the MME_A 40/CPF_A 140/AMF_A 240 may be information indicated by the storage unit of the HSS_A 50. Note that the GUTI may include information for identifying the CPF_140.

The MME F-TEID is information for identifying the MME_A 40/CPF_A 140/AMF_A 240. The MME F-TEID may include an IP address of the MME_A 40/CPF_A 140/AMF_A 240, a Tunnel Endpoint Identifier (TEID) of the MME_A 40/CPF_A 140/AMF_A 240, or both of them. Furthermore, the IP address of the MME_A 40/CPF_A 140/AMF_A 240 and the TEID of the MME_A 40/CPF_A 140/AMF_A 240 may be stored independently of each other. The MME F-TEID may be identification information for user data, or identification information for control information.

The SGW F-TEID is information for identifying the SGW_A 35. The SGW F-TEID may include an IP address of the SGW_A 35, a TEID of the SGW_A 35, or both of them. The IP address of the SGW_A 35 and the TEID of the SGW_A 35 may be stored independently of each other. The SGW F-TEID may be identification information for user data, or identification information for control information.

The PGW F-TEID is information for identifying the PGW_A 30/UPGW_A 130/SMF_A 230/UPF_A 235. The PGW F-TEID may include an IP address of the PGW_A 30/UPGW_A 130/SMF_A 230/UPF_A 235, a TEID of the PGW_A 30/UPGW_A 130/SMF_A 230/UPF_A 235, or both of them. In addition, the IP address of the PGW_A 30/UPGW_A 130/SMF_A 230/UPF_A 235 and the TEID of the PGW_A 30/UPGW_A 130/SMF_A 230/UPF_A 235 may be stored independently of each other. The PGW F-TEID may be identification information for user data, or identification information for control information.

The eNB F-TEID is information for identifying the eNB_A 45. The eNB F-TEID may include an IP address of the eNB_A 45, a TEID of the eNB_A 45, or both of them. The IP address of the eNB_A 45 and the TEID of the SGW_A 35 may be stored independently of each other. The eNB F-TEID may be identification information for user data, or identification information for control information.

The APN may be identification information for identifying the core network and an external network such as the DN. Furthermore, the APN can also be used as information for selecting a gateway such as the PGW_A 30/UPGW_A 130/UPF_A 235 for connecting the core network_A 90. Note that the APN may be a Data Network Name (DNN). Therefore, the APN may be represented by a DNN, or the DNN may be represented by the APN.

Note that the APN may be identification information for identifying such a gateway, or identification information for identifying an external network such as the DN. Note that, in a case that multiple gateways connecting the core network and the DN are deployed, there may be multiple gateways that can be selected according to the APN. Furthermore, one gateway may be selected among such multiple gateways by another method using identification information other than the APN.

The UE Radio Access Capability is identification information indicating a radio access capability of the UE_A 10. The UE Network Capability includes an algorithm of security supported by the UE_A 10 and a key derivation function. The MS Network Capability is information including, in the UE_A 10 having a function of the GERAN_A 25 and/or the UTRAN_A 20, one or more pieces of information necessary for the SGSN. The Access Restriction is registration information for access restriction. The eNB Address is an IP address of the eNB_A 45. The MME UE S1AP ID is information for identifying the UE_A 10 in the MME_A 40/CPF_A 140/AMF_A 240. The eNB UE S1AP ID is information for identifying the UE_A 10 in the eNB_A 45.

The APN in Use is an APN recently used. The APN in Use may be Data Network Identifier. This APN may include identification information of the network and identification information of a default operator. Furthermore, the APN in Use may be information for identifying a DN with which the PDU session is established.

The Assigned Session Type is information indicating a PDU session type. The Assigned Session Type may be Assigned PDN Type. The PDU session type may be IP, or non-IP. Furthermore, in a case that the PDU session type is IP, information indicating a PDN type assigned by the network may be further included. Note that the Assigned Session Type may be IPv4, IPv6, or IPv4v6.

Unless otherwise specifically described, the IP Address refers to the IP address assigned to the UE. The IP address may be an IPv4 address, an IPv6 address, or an IPv6 prefix. Note that in a case that the Assigned Session Type indicates non-IP, an element of the IP Address may not be included.

The DN ID is identification information for identifying the core network_B 190 and an external network such as the DN. Furthermore, the DN ID can also be used as information for selecting a gateway such as the UPGW_A 130 or the PF_A 235 connecting the core network_B 190.

Note that the DN ID may be identification information for identifying such a gateway, or identification information for identifying an external network such as the DN. Note that, in a case that multiple gateways connecting the core network_B 190 and the DN are deployed, there may be multiple gateways that can be selected according to the DN ID. Furthermore, one gateway may be selected among such multiple gateways by another method using identification information other than the DN ID.

Furthermore, the DN ID may be information equivalent to the APN, or different from the APN. Note that in a case that the DN ID is the information different from the APN, each apparatus may manage information indicating mapping between the DN ID and the APN, perform a procedure to inquire the APN by using the DN ID, or perform a procedure to inquire the DN ID by using the APN.

The SCEF ID is an IP address of the SCEF used in the PDU session. The Default Bearer is information acquired and/or created in a case that a PDU session is established and is EPS bearer identification information for identifying a default bearer associated with the PDU session.

The EPS Bearer ID is identification information of the EPS bearer. Additionally, the EPS Bearer ID may be identification information for identifying Signalling Radio Bearer (SRB) and/or Control-plane Radio Bearer (CRB), or identification information for identifying Data Radio Bearer (DRB). The Transaction Identifier (TI) is identification information for identifying a bidirectional message flow (Transaction). Note that the EPS Bearer ID may be EPS bearer identification information for identifying a dedicated bearer. Therefore, the EPS bearer ID may be identification information for identifying the EPS bearer different from the default bearer. The TFT indicates all packet filters associated with the EPS bearer. The TFT is information for identifying some pieces of user data to be transmitted and/or received, and thus, the UE_A 10 uses the EPS bearer associated with the TFT to transmit and/or receive the user data identified by the TFT. In still other words, the UE_A 10 uses a Radio Bearer (RB) associated with the TFT to transmit and/or receive the user data identified by the TFT. The TFT may associate the user data such as application data to be transmitted and/or received with an appropriate transfer path, and may be identification information for identifying the application data. The UE_A 10 may use the default bearer to transmit and/or receive the user data which cannot be identified by the TFT. The UE_A 10 may store in advance the TFT associated with the default bearer.

The Default Bearer is EPS bearer identification information for identifying a default bearer associated with a PDN connection/PDU session. Note that the EPS bearer may be a logical communication path established between the UE_A 10 and the PGW_A 30/UPGW_A 130/UPF_A 235, or a communication path constituting the PDN connection/PDU session. Furthermore, the EPS bearer may be a default bearer, or a dedicated bearer. Furthermore, the EPS bearer may include an RB established between the UE_A 10 and the base station and/or the access point in the access network. Furthermore, the RB and the EPS bearer may be associated with each other on a one-to-one basis. Therefore, identification information of the RB may be associated with the identification information of the EPS bearer on a one-to-one basis, or may be the same identification information as the identification information of the EPS bearer. Note that the RB may be an SRB and/or a CRB, or a DRB. Furthermore, the Default Bearer may be information that the UE_A 10 and/or the SGW_A 35 and/or the PGW_A 30/UPGW_A 130/SMF_A 230/UPF_A 235 acquire from the core network in a case that the PDU session is established. Note that the default bearer is an EPS bearer first established during the PDN connection/PDU session, and is such an EPS bearer that only one bearer can be established during one PDN connection/PDU session. The default bearer may be an EPS bearer that can be used for communication of user data not associated with the TFT. The dedicated bearer is an EPS bearer established after the default bearer is established during the PDN connection/PDU session, and is such an EPS bearer that multiple bearers can be established during one PDN connection/PDU session. The dedicated bearer is an EPS bearer that can be used for communication of user data not associated with the TFT.

User Identity is information for identifying a subscriber. The User Identity may be an IMSI, or an MSISDN. Furthermore, the User Identity may also be identification information other than the IMSI or the MSISDN. Serving Node Information is information for identifying the MME_A 40/CPF_A 140/AMF_A 240 used in a PDU session, and may be an IP address of the MME_A 40/CPF_A 140/AMF_A 240.

The eNB Address is an IP address of the eNB_A 45. The eNB ID is information for identifying the UE in the eNB_A 45. MME Address is an IP address of the MME_A 40/CPF_A 140/AMF_A 240. MME ID is information for identifying the MME_A 40/CPF_A 140/AMF_A 240. The gNB Address is an IP address of the gNB_A 122. The gNB ID is information for identifying the gNB_A 122. The WAG Address is an IP address of the WAG_A 126. The WAG ID is information for identifying the WAG_A 126.

3. DESCRIPTION OF VARIOUS PROCEDURES AND TERMS AND IDENTIFICATION INFORMATION IN EACH EMBODIMENT

Next, before describing detailed processes of various procedures in the embodiments in the present embodiment, in order to avoid redundant descriptions, terminology specific to the present embodiment and primary identification information used in each procedure will be described beforehand. Hereinafter, various procedures in each embodiment are also referred to as the present procedure.

First, the first state is a state in which the UE_A 10 acquires and/or retains network capability information of the network (the access network and/or the core network).

Here, the network capability information acquired and/or retained by the UE_A 10 may be based on identification information included in messages transmitted as broadcast information from the access network and/or an apparatus constituting the access network, or may be based on identification information included in messages received in an RRC procedure between the UE_A and the access network and/or the apparatus constituting the access network, or may be based on identification information included in messages transmitted and/or received in a procedure for registration with the core network between the UE_A and the core network, or may be based on a combination of any two or more of the above-described methods.

Note that the network capability information notified to the UE_A 10 in the first state from the access network and/or the core network (also referred to hereinafter as a network) and acquired and/or retained by the UE_A 10 may be information indicating whether the network supports a voice service and/or an emergency call service and/or a function to enable handover and/or redirection to a network optimal for the emergency call service or may be other information of a combination of any two or more of these pieces of information.

Furthermore, the first state may be a state in which the UE_A 10 acquires and retains the capability information of the network not performing the registration procedure during the registration procedure. Here, the network not performing the registration procedure may be another network in the same PLMN.

In other words, the first state may be a state in which the UE_A 10 requests, acquires, and retains the capability information of the core network_B 190 in the procedure for registration with the core network_A 90 or a state in which the UE_A 10 requests, acquires, and retains the capability information of the core network_A in the procedure for registration with the core network_B 190. Here, the capability information of the network may include information related to support of a voice call service function and/or bearer support dedicated to emergency calls.

Additionally, an S1 mode is a UE mode capable of transmitting and receiving messages using the S1 interface. Note that the S1 interface may include an X2 interface connecting an S1-MME interface, an S1-U interface, and a wireless base station.

The UE in the S1 mode can access the EPC via an eNB providing an E-UTRA function and access the EPC via an en-gNB providing an NR function, for example.

Note that the access to the EPC via the eNB providing the E-UTRA function and the access to the EPC via the en-gNB providing the NR function correspond to the S1 mode but may be configured as separate, different modes.

Additionally, an N1 mode is a UE mode in which the UE can access the 5GC via the 5G access network. The N1 mode may be a UE mode in which messages can be transmitted and/or received using the N1 interface. Note that the N1 interface may include an Xn interface connecting the N1 interface and the wireless base station.

The UE in the N1 mode can, for example, access the 5GC via an ng-eNB providing the E-UTRA function and access the 5GC via a gNB providing the NR function.

Note that the access to the 5GC via the ng-eNB providing the E-UTRA function and the access to the 5GC via the gNB providing the NR function correspond to the N1 mode but may each be configured as separate, different modes. Additionally, a single registration mode is a UE mode indicating an operational state of mobility management registered with the core network of one of the 4G system and the 5G system by the UE. Additionally, a dual registration mode is a UE mode indicating an operational state of mobility management registered with the core networks of the 4G system and/or the 5G system by the UE. In addition, the UE may simultaneously and independently manage the state of mobility management in the S1 mode and the state of mobility management in the N1 mode.

Note that the UE mode may include the S1 mode and the N1 mode.

Now, identification information in the present embodiment will be described.

First, first identification information in the present embodiment may be information inquiring whether or not a voice service and/or an emergency call service (including support of an emergency call bearer or a PDU session function) provided via the core network_B 190 with which the UE_A 10 attempts to register is supported.

In addition, the first identification information may be information indicating a preference (Preference; Prf) in which the core network_B 190 with which the UE_A 10 attempts to register prioritizes support of the voice service function and/or emergency call service (including support of the emergency call bearer or the PDU session function support).

Furthermore, the core network_B 190 receiving a request message including the first identification information from the UE_A 10 may inquire of another core network in the same PLMN about the network capability information including the support of the voice service and/or the emergency call service, or the network capability information may be retained or configured in advance in the AMF_A 240 in the core network_B 190.

Note that, in a case that the first identification information is transmitted in the Registration Procedure, the first identification information is preferably included in a Registration Request for transmission but that the first identification information may be transmitted by any control message other than the Registration Request (e.g., a NAS message). In addition, in a case that the first identification information is transmitted in a PDU Session Establishment Procedure, the first identification information is preferably included in a PDU Session Establishment Request for transmission, but may be transmitted by any control message (e.g., a NAS message) other than the PDU Session Establishment Request. Additionally, even after the registration procedure and/or the PDU session establishment procedure is completed, the first identification information may be transmitted by any control message (e.g., a NAS message; a (Periodic) Registration Update) at any timing.

Next, second identification information in the present embodiment may indicate the availability of support of an emergency call fallback function to switch to an access network and/or a core network other than the access network and/or core network to/by which the UE_A 10 is connected/served in an emergency call connection.

Here, the support of the emergency call fallback may be information indicating whether the UE has a function to perform a dedicated service request (SERVICE REQUEST) for the UE to invoke a handover and/or redirection procedure performed by the network.

Next, 10th identification information in the present embodiment is capability information indicating whether or not the access network B and/or the core network_B 190 supports the voice call service.

Alternatively, the 10th identification information may be information indicating whether or not an access network and/or a core network different from the connected/serving access network and core network supports the voice call service.

For example, the 10th identification information may indicate the availability of support of a voice call service via the access network A' connected to the core network_B 190, or may indicate the availability of support of a voice call service via the core network A in the same PLMN as the core network_B 190.

Alternatively, the 10th identification information may be information indicating whether or not, in a case that the connected/serving access network and core network do not support the voice call service, the access network supports a function to perform handover and/or redirection via another access network in the same PLMN.

For example, the 10th identification information may be information indicating whether or not, in a case that the connected/serving access network B and core network_B 190 do not support the voice call service, the access network B supports a function to perform handover and/or redirection via the access network A' or the access network A supporting the voice call service, based on the PDU session establishment request by the UE_A 10.

The UE_A 10 may perform the subsequent processing for an emergency call connection, based on the reception of 11th identification information.

Note that the 10th identification information may be, for example, information related to the support of IMS voice (an IMS voice over PS session indicator (IMS VoPS)) in a 5GS network feature support IE included in a registration acceptance (REGISTRATION ACCEPT) message in a registration procedure for registration with the network.

Next, the 11th identification information in the present embodiment is capability information indicating whether or not the access network B and/or the core network_B 190 supports the emergency call service. In other words, the 11th identification information is information indicating the availability of support of an emergency call service for each emergency call connection via the core network B or the emergency call service for each access network.

For example, the 11 identification information may be information indicating the availability of support of an emergency call service via the access network B and the core network_B 190, information indicating the availability of support of an emergency call service via the access A' and the core network_B 190, information indicating the availability of support of the emergency call service in both the access network B and the access network A' connecting to the core network_B 190, or information indicating the availability of support of an emergency call service via the core network_B 190 regardless of the access network.

In other words, the 11th identification information may be configured for each access network and/or for each core network.

Additionally, the 11th identification information may be information indicating whether or not, in a case that the connected/serving access network and core network do not support the emergency call service, the access network supports a function to hand over and/or redirect the emergency call connection request from the UE_A 10 via another access network in the same PLMN.

For example, the 11th information may be information indicating whether or not, in a case that the connected/serving access network B and core network_B 190 do not support the emergency call service, the access network B supports a function to hand over and/or redirect the emergency call connection request from the UE_A 10 via the access network A'.

The UE_A 10 may perform the subsequent processing for an emergency call connection, based on the reception of 11th identification information.

Note that the 11th identification information may be, for example, information related to an Emergency service support indicator (EMC) in the 5GS network feature support IE included in the registration acceptance (REGISTRATION ACCEPT) message in the registration procedure for registration with the network.

Next, 12th identification information in this embodiment may be information indicating, in a case that the connected/serving access network and core network do not support the voice service and/or the emergency call service, the availability of support of a voice service and/or an emergency call service via another core network in the same PLMN as that which includes the connected core network, or information indicating the availability of support of a voice service and/or an emergency call service via another access network connected to the core network B.

For example, the 12th information may be information indicating the availability of support of a voice service and/or an emergency call service via the core network_A 90, corresponding to another core network in the same PLMN as that which includes the connected core network_B 190, or information indicating the availability of support of a voice service and/or an emergency call service via the access network A', corresponding to another access network connected to the core network_B 190.

The UE_A 10 may perform the subsequent processing for an emergency call connection, based on the reception of the 12th identification information.

In other words, in a case that the emergency call service can be provided via the core network connected in the 1th identification information, the UE_A 10 need not perform processing based on the 12th identification information in the subsequent emergency call connection process.

In addition, the 12th identification information may be information indicating a detailed emergency call procedure method performed by the UE_A 10 by combining with the 11th identification information. In this case, even in a case that the emergency call service can be provided via the core network connected in the 11th identification information, the UE_A 10 may perform the following emergency call connection processing, based on the 12th identification information.

Specifically, the support indicated by the 12th identification information here may be information indicating that the access network and/or the core network supports a handover and/or redirection function invoked by the core network based on a service request (SERVICE REQUEST) including 30th identification information or information indicating that the redirection function is supported, or may be information used by the core network to indicate to the UE_A 10 that the SERVICE REQUEST including the 30th identification information is to be complied with. Alternatively, non-support indicated by the 12th identification information here may be information indicating that the access network and/or the core network does not support the SERVICE REQUEST made by the UE_A 10 and including the 30th identification information.

In other words, the 12th identification information may be configured for each access network and/or for each core network. For example, in a case that the UE_A is served by the access network B connected to the core network B 190 and that the access network B connected to the core network B 190 includes a function for the handover and/or redirection procedure for the emergency call service, the access network B connected to the core network B 190 may indicate that the access network B connected to the core network B 190 includes the function for the handover and/or redirection procedure for the emergency call service. Additionally, in a case that the access network B connected to the core network B 190 does not include the function for the handover and/or redirection procedure for the emergency call service and that the access network A' connected to the core network B 190 includes the function for the handover and/or redirection procedure for the emergency call service, the 12th identification information may indicate that the access network A' connected to the core network B 190 has the function for the handover and/or redirection procedure for the emergency call service. In this case, the UE_A 10 may determine, in a first condition determination for selecting an access domain appropriate for an emergency call connection, that the access network A' connected to the core network B 190 indicated by the 12th identification information does not support the function for the handover and/or redirection procedure for the emergency call service.

Note that the 11th identification information may be, for example, information related to the Emergency service fallback indicator (EMF) in the 5GS network feature support IE included in the registration acceptance (REGISTRATION ACCEPT) message in the registration procedure for registration with the network, and may indicate the availability of support of the emergency call fallback.

Next, the 30th identification information in the present embodiment may be information indicating, in an emergency call connection, a request for handover and/or redirection to an access network and/or a core network other than the connected/serving access network and/or core network.

Next, 40th identification information in the present embodiment may be information indicating, in an emergency call connection, rejection of the 30th identification information indicating a request for handover and/or redirection to an access network and/or a core network other than the connected/serving access network and/or core network, or a cause value indicating the rejection.

Furthermore, the 40th identification information may be information indicating, in addition to the above, an access domain and/or a domain to which the UE_A 10 can make emergency call reconnection after the reception of the rejection.

For example, the 30th identification information received via the access network B and the core network_B 190 may be rejected. In this case, the 40th identification information may indicate, in addition to the rejection, the availability of support of an emergency call service via the access network A' or the core network A connected to the core network_B 190.

More specifically, the 40th identification information may be information indicating a CS domain, information indicating the core network A and/or the access network A in the same PLMN as that which includes the core network_B 190, information indicating the core network_B 190 and/or the access network A', or information indicating the core network_B 190 and/or the access network B.

Now, various procedures according to the present embodiment will be described with reference to FIG. 10. Hereinafter, various procedures in the embodiments are also referred to as the present procedure, and the present procedure includes reception of broadcast information (S1000) and/or an RRC procedure (S1010), and a Registration procedure for registration with the core network (S1020), and determination to provide an emergency call connection (S1040) and a service request procedure for an emergency call (S1050) and a first procedure (S1060) performed by the UE, and/or selection of an access network (S1065) and a second procedure (S1070) and an IMS procedure for an emergency call (S1080) performed by the UE.

Here, a procedure of (A) during the present procedure may include a procedure of (B) during the present procedure and/or a procedure of (C) during the present procedure. The procedure of (B) during the present procedure is the reception of broadcast information, and the procedure of (C) during the present procedure may be the RRC procedure. Additionally, a procedure (D) during the present procedure includes a procedure of (E) during the present procedure, and/or a procedure of (F) during the present procedure. The procedure of (E) during the present procedure may include a service request procedure for an emergency call and/or a first procedure, and the procedure of (F) during the present procedure may include selection of an access network by the UE.

Additionally, the first procedure may include a handover procedure and/or a handover procedure or a redirection procedure. For example, the first procedure may be the handover procedure for handover to the access network_A' connected to the core network_B, or may be a handover procedure between the 5GS system and the EPS system or an RRC Redirection procedure for redirection to the EPS.

Additionally, in the second procedure, the UE may perform any one or a combination of a registration procedure for registration with a network (access network, core network, CS network, PDN, or DN), and/or a session establishment procedure, and/or a bearer establishment procedure. Here, for example, the registration procedure for registration with the network may be a Registration Procedure for registration with the 5GC, an Attach Procedure for an emergency call to the EPC, or location registration with a CS network. Additionally, the session establishment may be a PDU Session establishment procedure for an emergency call to the core network_B or a PDN Connectivity Procedure for an Emergency Bearer to the EPC.

In addition, the IMS procedure for an emergency call may also include an IMS Registration for an emergency call and/or an IMS emergency call connection procedure.

Additionally, the following will be described later in detail: broadcast information, the RRC procedure, the registration procedure for registration with the core network, the service request procedure (for an emergency call), the PDU session establishment procedure (for an emergency call), the IMS registration procedure (for an emergency call), and the IMS emergency call connection procedure.

Specifically, during the present procedure, first, the UE_A 10 and the apparatuses perform the procedure of (A) during the present procedure, and the UE_A 10 acquires the capability information of the core network and/or the access network. Here, the UE_A 10 may acquire and store one or multiple pieces of the capability information of the radio access system and/or the core network in the procedure of (B) during the present procedure and/or in the procedure of (C) during the present procedure.

Then, the registration procedure for registration with the core network is performed (S1020). Based on the completion of the registration procedure for registration with the core network by the UE_A 10, the apparatuses transition to the first state (S1030). Here, the UE_A 10 and the apparatuses may perform the registration procedure for registration with the core network to transition to a state in which the UE_A 10 is registered with the network (RM-REGISTERED state).

Then, the UE_A 10 in the first state determines to provide an emergency call connection (S1040). The determination to provide an emergency call connection by the UE may be based on an operation by a user of the UE or on software processing within the UE, or the like. Furthermore, the subsequent behaviors may be performed based on information acquired by the UE from the network (access network and/or core network) in the procedure of (A) during the present procedure and/or during the registration procedure for registration with the core network.

Then, the UE_A 10, having determined to provide an emergency call connection (S1040), may perform a first condition determination during the present procedure. The first condition determination is intended to determine whether the network (core network and/or access network) with which the UE has been registered supports an emergency call connection, and is intended to select the appropriate access domain for an emergency call connection. Here, the first condition determination may be based on various types of information acquired by the UE_A 10 in the previous procedures. In a case that the first condition determination is true, the UE_A 10 performs the subsequent procedures (the second procedure and the IMS procedure for an emergency call) without performing the procedure of (D) during the present procedure. In addition, in a case that the first condition determination is false, the procedure of (D) during the present procedure is performed.

Then, in a case that the first condition determination is false, the UE_A 10 performs a second condition determination during the present procedure. The UE_A 10 may initiate the procedure of (E) or the procedure of (F) during the present procedure, based on the second condition determination. The UE_A 10 performs a Service Request procedure for an emergency call in the procedure of (E) during the procedure (S1050), and may or need not necessarily perform the first procedure based on the performance and/or the completion of the service request procedure. The UE_A 10 may perform the procedure of (F) during the procedure, and may select an appropriate network (access network and/or core network) for an emergency call connection. Details of the procedure of (D) during the present procedure will be described later. The UE_A 10 may complete the procedure of (D) during the present procedure based on the procedure of (F) during the present procedure and/or the completion of (F) during the present procedure.

Then, the UE_A 10 performs the second procedure during the present procedure. As the second procedure during the procedure, one of the following procedures performed by the UE or a combination of any of the procedures may be performed as described above: the registration procedure for registration with the network (access network, core network, CS network, PDN, or DN), and/or the session establishment procedure, and/or the bearer establishment procedure. Note that the UE_A 10 may perform the second procedure, based on information hitherto acquired and/or stored during the present procedure. Furthermore, the UE is not limited to these pieces of information, and the second procedure may be performed based on network policies, UE policies, and the like. Details of the second procedure will be described below.

Then, the UE_A 10 performs the IMS procedure (S1080) for an emergency call. As described above, the UE_A 10 may perform the IMS Registration and/or IMS emergency call connection procedure for an emergency call. The UE_A 10 performs the IMS procedure for an emergency call via the network (the access network and/or the core network) connected in the second procedure described above, to register the UE_A 10 with the IMS_A 7 that provides the IMS service over the core network, and to establish the IMS emergency call connection. Here, the IMS registration may be an IMS registration for an emergency call connection.

The present procedure is completed as described above.

Note that the apparatuses may exchange and/or acquire various pieces of capability information and/or request information of each apparatus in the broadcast information and/or the RRC procedure and/or the registration procedure for registration with the core network and/or the service request procedure for an emergency call.

Furthermore, each apparatus involved in the present procedure may transmit and/or receive each control message described in the present procedure to transmit and/or receive one or more pieces of identification information included in each control message and store each piece of identification information transmitted and/or received as a context.

Note that, for simplicity, the service request procedure and/or the PDU session establishment procedure and/or the IMS registration procedure and/or the IMS emergency call connection procedure may be collectively referred to as emergency call connection processing.

3.1. Overview of Broadcast Information

First, the broadcast information will be described in brief. Note that the broadcast information corresponds to broadcast information (S1000) described in FIG. 10 above.

The broadcast information may be included in messages and/or signals and/or beacon frames transmitted to the UE_A 10 from the AN and/or any of the apparatuses of the radio access system constituting the AN. Furthermore, the broadcast information may include the 10th and/or the 11th identification information.

Here, for example, the UE_A 10 may recognize whether or not the radio access system the UE_A 10 is attempting to connect supports establishment of a wireless connection for an emergency call service, based on the inclusion of the 10th and/or the 11th identification information in the broadcast information. Furthermore, the UE_A 10 may store these pieces of information in a context retained. Furthermore, the UE_A 10 may store these pieces of information in the context retained.

Furthermore, the UE_A 10 may transition to the state 1, based on the reception of the broadcast information/and or the completion of the RRC procedure described below and the registration procedure for registration with the core network described below.

3.2. Overview of RRC Procedure

Then, the RRC procedure will be described. The RRC procedure is hereinafter also referred to as the present procedure. Note that the present procedure corresponds to the RRC procedure (S1010) illustrated in FIG. 10 described above.

The RRC procedure may include the UE_A 10 performing transmission of a message and/or a signal for a request to establish a wireless connection for an emergency call connection to the AN and/or an apparatus of the radio access system constituting the AN, and the apparatus of the radio access system performing transmission of a message and/or a signal as a response to the message and/or signal from the UE_A 10. Furthermore, the message and/or the signal transmitted by the UE_A 10 to the apparatus of the radio access system in the RRC procedure may include information indicating that the UE_A 10 requests the establishment of a wireless connection for an emergency call connection. Furthermore, in the RRC procedure, the message and/or the signal received by the UE_A 10 from the apparatus of the radio access system may include the 10th and/or the 11th identification information.

Here, for example, the UE_A 10 may transmit information indicating that the UE_A 10 requests to establish a wireless connection for an emergency call connection, to request establishment of a wireless connection for an emergency call connection, and may recognize that the request has been accepted by receiving the 10th and/or the 11th identification information.

Additionally, for example, the UE_A 10 may recognize whether the radio access system supports a wireless connection for an emergency call connection, based on the inclusion of the 10th and/or the 11th identification information in the message and/or the signal from the apparatus of the radio access system. Furthermore, the UE_A 10 may store these pieces of information in the context retained and/or stored.

3.3. Overview of Registration Procedure for Registration with Core Network

First, the registration procedure will be described in brief. The registration establishment procedure is also referred to as a present procedure below.

The present procedure is a procedure initiated by the UE_A 10 to register with a network (the access network and/or the core network_B 190 and/or the DN (DN_A 5 and/or PDN_A 6)). In a state in which the UE_A 10 is not registered in the network, the UE_A 10 can perform the present procedure at any timing such as the timing of turning on power. In other words, the UE_A 10 may initiate the present procedure at any timing in a non-registered state (RM-DEREGISTERED state). In addition, each apparatus may transition to a registered state (RM-REGISTERED state), based on the completion of the registration procedure.

Furthermore, the present procedure may be a procedure for updating location registration information of the UE_A 10 in the network, for regularly notifying a state of the UE_A 10 from the UE_A 10 to the network, and/or for updating particular parameters related to the UE_A 10 in the network.

A Tracking Area (also referred to as a TA) in the present embodiment is a range that can be represented by location information of the UE_A 10 managed by the core network, and may include one or more cells, for example. Furthermore, the TA may be a range in which a control message such as a paging message is broadcast, or a range in which the UE_A 10 can move without performing a handover procedure.

A TA list in the present embodiment is a list including one or more TAs allocated to the UE_A 10 by the network. Note that, while the UE_A 10 is moving within the one or more TAs included in the TA list, the UE_A 10 can move without performing the registration procedure. In other words, the TA list may be an information group indicating an area in which the UE_A 10 can move without performing the registration procedure.

The UE_A 10 may initiate the present procedure in a case that the UE_A 10 applies mobility across tracking areas (TAs). In other words, the UE_A 10 may initiate the present procedure in a case that the UE_A 10 moves to a TA different from a TA indicated in a TA list that the UE_A 10 holds. Furthermore, the UE_A 10 may initiate the present procedure in a case that a running timer expires. Furthermore, the UE_A 10 may initiate the present procedure in a case that a context of each apparatus needs to be updated due to disconnection or deactivation of a PDU session. Furthermore, the UE_A 10 may initiate the present procedure in a case that a change occurs in capability information and/or preference concerning PDU session establishment of the UE_A 10. Furthermore, the UE_A 10 may initiate the present procedure regularly. Note that, besides the above, the UE_A 10 can perform the present procedure at any timing as long as a PDU session is established.

Note that the registration procedure for registration with the core network described above may be a registration procedure for an emergency call service, and for identification information requesting registration for an emergency call service, the UE_A 10 may configure, for example, Emergency Registration as a Registration type in a Registration Request message in the present procedure.

Figure 10:
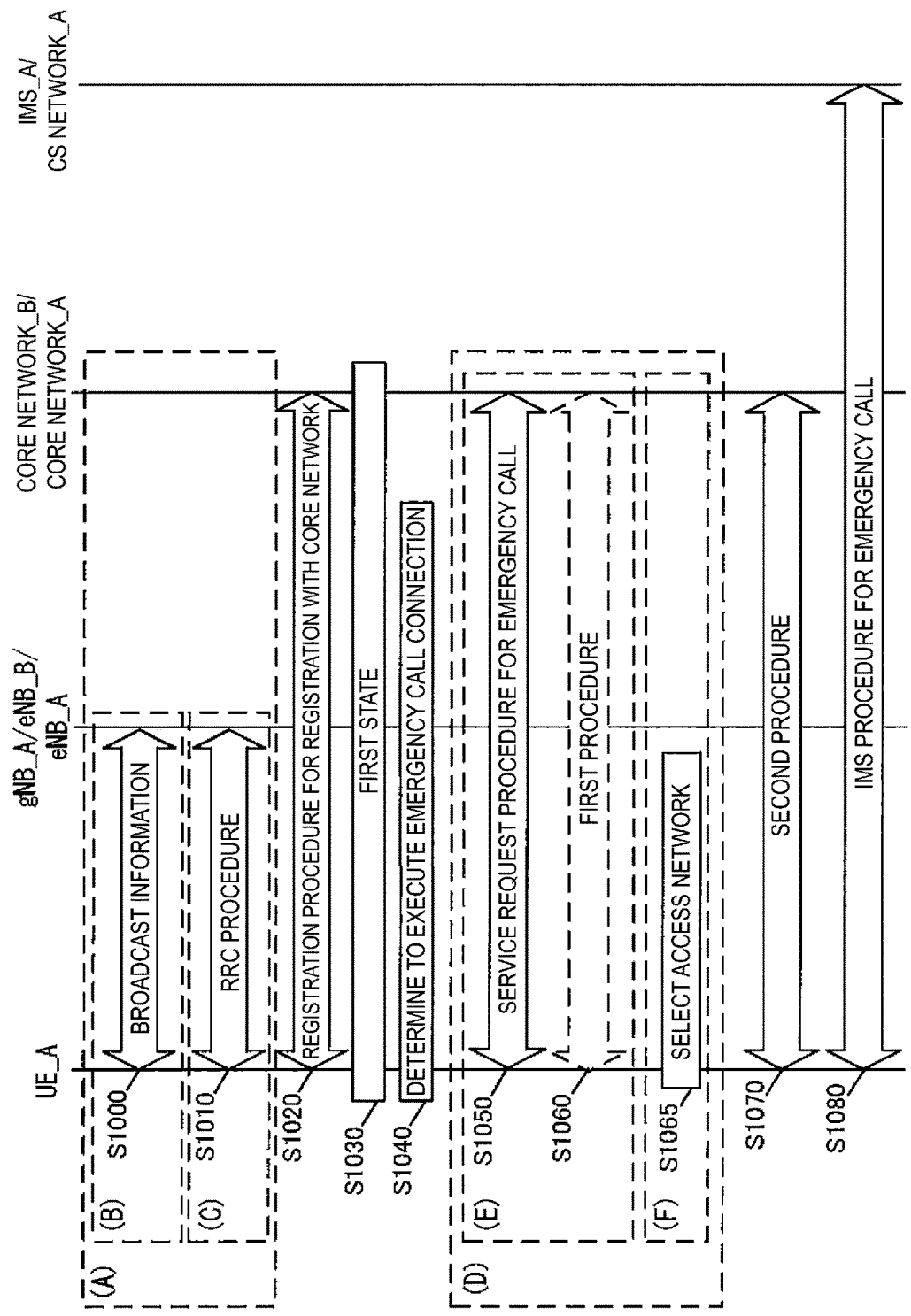
FIG. 10 is a diagram illustrating various procedures for different embodiments.

Furthermore, after the completion of the registration procedure for registration with the core network, the apparatuses may transition to the first state, and the apparatuses in the first state may perform the subsequent processing and procedure illustrated in FIG. 10 described above.

3.3.1. Example of Registration Procedure for Registration with Core Network

Figure 11:
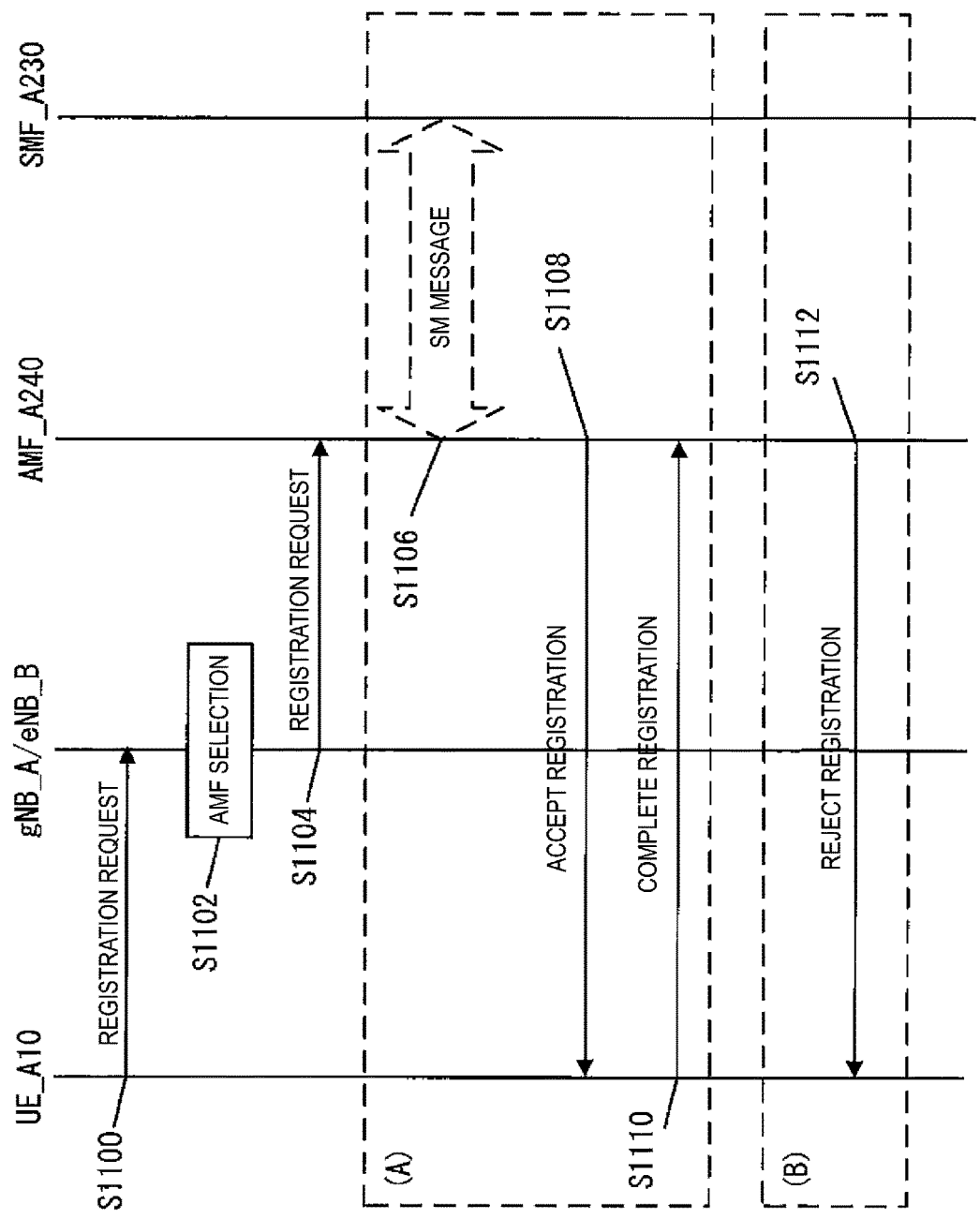
FIG. 11 is a diagram illustrating a registration procedure.

An example of a procedure for performing a registration procedure for registration with the core network will be described with reference to FIG. 11. The present procedure hereinafter refers to the registration procedure for registration with the core network. Note that the present procedure corresponds to the registration procedure for registration with the core network (S1020) illustrated in FIG. 10 described above.

Each step of the present procedure will be described below.

First, the UE_A 10 transmits the Registration Request message to the AMF_A 240 via the gNB_A 122 or the eNB_B 145 (S1100) (S1102) (S1104) to initiate the registration procedure. In addition, the UE_A 10 may transmit a Session Management (SM) message (e.g., a PDU session establishment request message) included in the registration request message, or may transmit the SM message (e.g., the PDU session establishment request message) along with the registration request message to initiate a procedure for SM, such as a PDU session establishment procedure, during the registration procedure.

Specifically, the UE_A 10 transmits an RRC message including the registration request message to the gNB_A 122 or the eNB_B 145 (S1100). The gNB_A 122 or the eNB_B 145 receives the RRC message including the registration request message, and then selects the AMF_A 240 as a NF or a common CP function to which the registration request message is routed (S1102). The gNB_A 122 or the eNB_B 145 retrieves the registration request message from the received RRC message and transmits or transfers the registration request message to the selected AMF_A 240 (S1104). Here, the gNB_A 122 or the eNB_B 145 may select the AMF_A 240, based on information included in the RRC message. Furthermore, the registration request message may be a Non-Access-Stratum (NAS) message transmitted and/or received on the N1 interface. In addition, the RRC message may be a control message transmitted and/or received between the UE_A 10 and the gNB_A 122 or the eNB_B 145. Furthermore, the NAS message may be processed in an NAS layer, the RRC message may be processed in an RRC layer, and the NAS layer may be a higher layer than the RRC layer.

In addition, in a case that there are multiple NSIs requesting registration, the UE_A 10 may transmit a registration request message for each of the NSIs, or may transmit multiple registration request messages included in one or more RRC messages. Furthermore, the above-described multiple registration request messages included in one or more RRC messages may be transmitted as one registration request message.

The UE_A 10 may include the first identification information in the registration request message, and the identification information being included in the request information may allow for a request for information related to support of the voice service and/or the emergency call service by the network to which the UE_A 10 attempts to connect.

The AMF_A 240 receives the registration request message and/or the control message different from the registration request message and performs first condition determination. The first condition determination is intended to determine whether the network accepts a request from the UE_A 10. The AMF_A 240 initiates the procedure of (A) during the present procedure in a case that the first condition determination is true, and initiates the procedure of (B) during the present procedure in a case that the first condition determination is false.

Each step of the procedure of (A) during the present procedure will be described below. The AMF_A 240 performs a fourth condition determination, and initiates the procedure of (A) in the present procedure. The fourth condition determination is to determine whether the AMF_A 240 transmits and/or receives the SM message to/from the SMF_A 230. In a case that the fourth condition determination is true, the AMF_A 240 selects the SMF_A 230 and transmits and/or receive the SM message to and/or from the selected SMF_A 230. In a case that the fourth condition determination is false, the AMF_A 240 skips such processes (S1106).

Furthermore, the AMF_A 240 transmits the Registration Accept message to the UE_A 10 via the gNB_A 122 or the eNB_B 145, based on the reception of the registration request message from the UE_A 10 and/or the completion of the transmission and/or the reception of the SM message to/from the SMF_A 230 (S1108). Here, the registration accept message may be included in the N2 interface control message and the RRC message for transmission and/or reception. Furthermore, the registration accept message may be an NAS message to be transmitted and/or received on the N1 interface. In addition, the registration accept message may be a response message to the registration request message.

Note that in a case that the AMF_A 240 receives an SM message indicating rejection from the SMF_A 230, the AMF_A 240 may terminate the procedure of (A) in the present procedure, and may initiate the procedure of (B) in the present procedure.

Furthermore, in a case that the fourth condition determination is true, the AMF_A 240 may transmit the SM message such as a PDU session establishment accept message (e.g., a PDU session establishment accept message) included in the registration accept message, or transmit the SM message such as a PDU session establishment accept message (e.g., a PDU session establishment accept message) along with the registration accept message. In addition, this transmission method may be performed in a case that the SM message (e.g., the PDU session establishment request message) is included in the registration request message and the fourth condition determination is true. Furthermore, the transmission method may be performed in a case that the registration request message and the SM message (e.g., the PDU session establishment request message) are included and the fourth condition determination is true. The AMF_A 240 may indicate that the procedure for SM has been accepted by performing such a transmission method.

Additionally, the AMF_A 240 may include the 10th and/or the 11th and/or the 12th identification information in the registration accept message, and the inclusion of the identification information may allow acceptance of the request from the UE_A 10 and indication of capability information indicating whether or not the radio access system and/or the core network supports the PDU session function for the voice service and/or the emergency call service, or indication of capability information indicating whether or not the same network or another network (access network and/or core network) within the same PLMN support the voice service and/or the emergency call service.

Note that the AMF_A 240 may determine whether or not the 10th and/or the 11th and/or the 12th identification information is included in the registration accept message, based on the received identification information, and/or the capability information of the network, and/or the operator policies, and/or the state of the network, and/or user registration information (user subscription), and/or the like.

The UE_A 10 receives the registration accept message via the gNB_A 122 or the eNB_B 145 (S1108). The UE_A 10 receives the registration accept message and recognizes the contents of various types of identification information included in the registration accept message.

Furthermore, based on the 10th and/or the 11th and/or the 12th identification information being included in the registration accept message, the UE_A 10 may recognize whether or not the radio access system and/or the core network with which the UE_A 10 is attempting to register according to the present procedure supports the PDU session function for the voice service and/or the emergency call service and whether or not the same network or the network (access network and/or core network) within the same PLMN supports the voice service and/or the emergency call service. Furthermore, the UE_A 10 may store these pieces of information in the context retained.

Here, for example, the UE_A 10 may perform (E) and/or (F) in the procedure of (D) in the procedure illustrated in FIG. 10 after the completion of the present procedure, based on the reception of the 10th and/or the 11th and/or the 12th identification information indicating that the radio access system and/or the core network does not support the PDU session function for the emergency call service in the registration procedure for registration with the core network. In contrast, for example, the UE_A 10 may perform the second procedure (S1070) and/or the IMS procedure for an emergency call (S1080) during the procedure illustrated in FIG. 10 in a case that an emergency call connection is determined to be performed after the completion of the present procedure (S1040), based on the reception of the 10th and/or the 11th and/or the 12th identification information indicating that the radio access system and/or the core network supports the PDU session function for the voice service or the emergency call service in the registration procedure for registration with the core network.

The UE_A 10 may further transmit a registration completion (Registration Complete) message to the AMF_A 240 (S1110). Note that, in a case that the UE_A 10 has received an SM message such as a PDU session establishment accept message, the UE_A 10 may transmit the SM message such as the PDU session establishment complete message included in the registration complete message, or may include the SM message therein to indicate that the procedure for SM is completed. Here, the registration complete message may be a NAS message transmitted and/or received on the N1 interface. In addition, the registration complete message may be a response message to the registration accept message. Furthermore, the registration complete message may be included in the RRC message and the N2 interface control message for transmission and/or reception.

The AMF_A 240 receives the registration complete message (S1110). In addition, each apparatus completes the procedure of (A) in the present procedure based on the transmission and/or reception of the registration accept message and/or the registration complete message.

Now, each step of the procedure of (B) during the present procedure will be described. The AMF_A 240 transmits a Registration Reject message to the UE_A 10 via the gNB_A 122 or the eNB_B 145 (S1112) to initiate the procedure of (B) during the present procedure. Furthermore, the UE_A 10 recognizes that a request of the UE_A 10 has been rejected by receiving the registration reject message or not receiving the registration accept message. Each apparatus completes the procedure of (B) in the present procedure based on the transmission and/or reception of the registration reject message.

Note that, in a case that the fourth condition determination is true, the AMF_A 240 may transmit an SM message such as a PDU session establishment reject message indicating rejection in the registration reject message, or may include the SM message indicating rejection therein to indicate that the procedure for SM has been rejected. In that case, the UE_A 10 may further receive the SM message, such as the PDU session establishment reject message, that indicates rejection, or may recognize that the procedure for SM has been rejected.

Furthermore, the registration reject message may be a NAS message transmitted/received on the N1 interface. In addition, the registration reject message may be a response message to the registration request message. Further, the registration reject message transmitted by the AMF_A 240 is not limited thereto as long as it is a message for rejecting the request of the UE_A 10. Furthermore, the registration reject message may be included in the N2 interface control message and the RRC message for transmission and/or reception.

The UE_A 10 recognizes the contents of various types of identification information included in the registration reject message by receiving the registration reject message.

Furthermore, the first condition determination may be performed based on the identification information, and/or subscriber information, and/or operator policies included in the registration request message. For example, the first condition determination may be true in a case that the network allows a request of the UE_A 10. In addition, the first condition determination may be false in a case that the network does not allow a request of the UE_A 10. Furthermore, the first condition determination may be true in a case that the network of a destination of registration of the UE_A 10 and/or an apparatus in the network supports a function requested by the UE_A 10, and may be false in a case that the network and/or the apparatus does not support the function. Note that conditions for determining whether the first condition determination is true or false may not be limited to the above-described conditions.

The fourth condition determination may also be performed based on whether AMF_A 240 has received an SM and may be performed based on whether a SM message is included in the registration request message. For example, the fourth condition determination may be true in a case that the AMF_A 240 has received the SM and/or the SM message is included in the registration request message, and may be false in a case that the AMF_A 240 has not received the SM and/or the SM message is not included in the registration request message. Note that conditions for determining whether the fourth condition determination is true or false may not be limited to the above-described conditions.

3.4. Overview of Service Request Procedure

Now, the service request procedure will be described in brief. The service request procedure is hereinafter also referred to as the present procedure. Note that the service request procedure includes a procedure initiated by the network and a procedure initiated by the UE, but in the present embodiment is directed to the service request procedure initiated by the UE.

The present procedure is a procedure initiated by the UE in a non-connection state (CM-IDLE state) to request establishment of a connection via the N1 interface with the AMF in the core network_B, and performance of the present procedure may be followed by transition to the connection state (CM-CONNECTED state). Additionally, the present procedure is a procedure for the UE in the non-connection state or the connection state to activate a U-Plane connection of an already established PDU session.

Additionally, the present procedure may also be performed as a part of a procedure for an emergency service fallback. Furthermore, the UE_A 10 may perform the present procedure in a case of receiving the registration accept message during the registration procedure described above, from the AMF in the core network_B via the access network_B, the registration accept message including the 10th and/or the 11th and/or the 12th identification information including another access network in the same PLMN supporting the emergency call service. Such a service request procedure is also referred to as a service request procedure for an emergency call.

The UE may perform the first procedure (S1060) and/or access network selection (S1065) illustrated in FIG. 10, based on the reception of a service accept message or a service reject message received in the service request procedure for an emergency call or the RRC message including these messages.

3.4.1. Example of Service Request Procedure for Emergency Call

Figure 4:
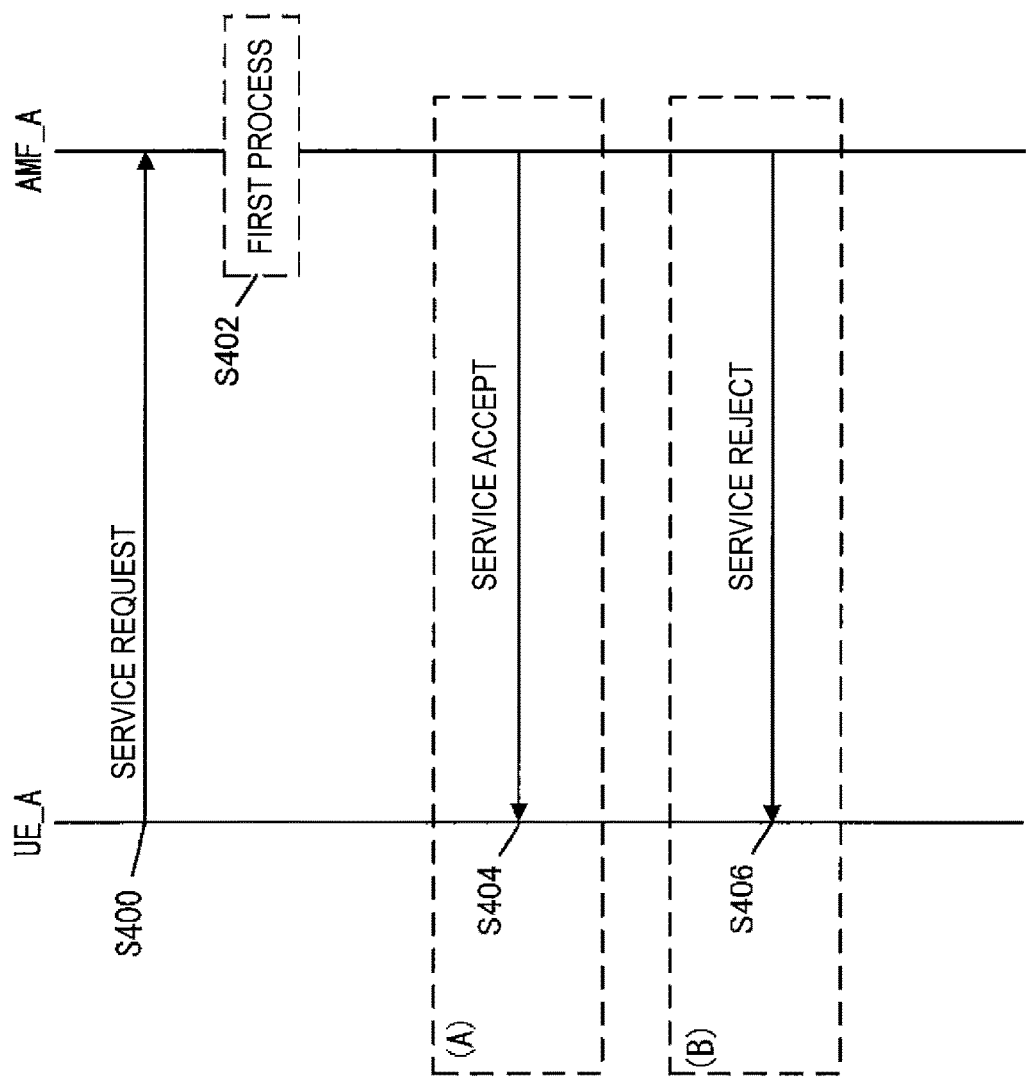
FIG. 4 is a diagram illustrating a service request procedure for an emergency call.

The service request procedure for an emergency call will be described using FIG. 4. The present procedure hereinafter refers to the service request procedure for an emergency call. Note that the present procedure corresponds to the service request procedure for an emergency call (S1050) illustrated in FIG. 10 described above. Furthermore, the example of the present procedure relates to a service request procedure for an emergency call via the access network_B and the core network_B.

Each step of the present procedure will be described below.

First, the UE_A 10 transmits a service request message for an emergency call to the AMF_A 240 via the access network_B (S400). Here, the UE_A 10 may include, in the service request message for an emergency call, the 30th identification information requesting handover and/or redirection to a network different from the connected network (access network and/or core network). In other words, the UE_A may indicate that the service request message is a service request for an emergency call by including the 30th identification information in the service request message.

Then, the AMF_A may perform the first condition determination, based on the service request message for an emergency call received from the UE_A via the access network. The first condition determination may be performed based on the identification information included in the service request message received by the AMF_A from the UE_A and/or the capability information of the network (access network and/or core network) and/or the network policies and/or the user subscription information and/or combinations thereof.

Here, the first process during the present procedure performed by the AMF_A may include, for example, transmission and the reception of the SM message to the SMF_A, or may include transmission of the N2 request message to the access network for emergency fallback.

Furthermore, the AMF_A may perform the first process in a case that the first condition determination is true, or may perform the subsequent steps without the first process in a case that the first condition determination is false. In other words, the AMF_A may perform (A) or (B) during the present procedure, based on the completion of the first process or after the reception of the service request message in a case that the first process is not performed.

Then, the AMF_A may perform the second condition determination, based on the identification information included in the service request message for an emergency call from the UE_A and/or the completion of the first process and/or the result of the first process. The second condition determination is intended to determine whether the network accepts the request from the UE_A. The AMF_A 240 initiates the procedure of (A) during the present procedure in a case that the first condition determination is true, and initiates the procedure of (B) during the present procedure in a case that the first condition determination is false.

Furthermore, in the procedure of (A) during the present procedure, the AMF_A may transmit the service accept message to the UE_A via the access network (S404). Furthermore, the UE_A may recognize that the request from the UE_A has been accepted by the network by receiving, via the access network, the service accept message or the RRC message including or implying the service accept message.

Additionally, in the procedure of (B) during the present procedure, the AMF_A transmits the service reject message to the UE_A via the access network (S406). Here, the AMF_A may transmit, to the UE_A 10, the service reject message including the rejection of the service request for an emergency call and/or the 40th identification information in which the UE_A indicates the access domain for emergency call reconnection. Furthermore, by receiving, via the access network, the service reject message or the RRC message including or implying the service reject message, the UE_A may recognize that the request from the UE_A has been rejected by the network, or may perform emergency call reconnection after the completion of the present procedure, based on the identification information included in the service reject message.

Additionally, the present procedure may be completed based on the completion of the procedure of (A) or (B) during the present procedure.

3.5. Overview of PDU Session Establishment Procedure

Now, the PDU session establishment procedure performed to establish a PDU session with the DN will be described in brief. The PDU session establishment procedure is also referred to as a present procedure below. Note that the present procedure is an example of the procedure performed in the second procedure (S1070) illustrated in FIG. 10 described above.

The present procedure is a procedure for each apparatus to establish the PDU session. Note that the PDU session established in the procedure may be a procedure for establishing a PDU session for an emergency call service, and the UE_A 10 may transmit, in the present procedure, a registration signal including information explicitly indicating the establishment of a dedicated PDU session for an emergency call. Here, the UE_A 10 and/or the apparatuses in the network may perform the procedure, based on the completion of the procedure up to the second procedure in FIG. 10 described above. Additionally, the apparatuses may establish the PDU session, based on the completion of the present procedure. Furthermore, each apparatus may perform the present procedure multiple times to establish multiple PDU sessions.

Furthermore, the UE_A 10 may perform the present procedure in a case that the UE_A 10 receives the identification information indicating that the radio access system and the core network support the PUD session function for an emergency call, in the registration procedure for registration with the core network described above.

Furthermore, the UE_A 10 may acquire the address of the P-CSCF during the present procedure or based on the completion of the present procedure. Furthermore, here, the address of the P-CSCF acquired by the UE_A 10 may be the address of the P-CSCF_B, which can handle the PDU session for an emergency call. Specifically, in a case of receiving, from the UE_A 10, information explicitly indicating the establishment of the above-described dedicated PDU session for an emergency call, the core network may select an external gateway that can handle the dedicated PDU session for an emergency call, and the gateway in the core network that can handle the dedicated PDU session for an emergency call may select the P-CSCF_B 310, which can handle the dedicated PDU session for an emergency call, and the gateway may include, in a response to the request for the establishment of the dedicated PDU session for an emergency call, the address of the P-CSCF_B 310, which can handle the dedicated PDU session for an emergency call, and transmit the response to the UE_A 10.

3.6. Overview of IMS Registration Procedure

Now, the IMS registration procedure will be described in brief. The present procedure hereinafter indicates the IMS registration procedure. The IMS registration procedure is a procedure initialized by the UE_A 10 to register with the IMS.

The initiation of the present procedure may be performed by the UE_A 10, based on the completion of the second procedure (S1070) during the procedure illustrated in FIG. 10. Note that, based on the completion of the second procedure, the UE may have completed registration with the network (access network, core network, CS network, PDN, DN), and/or session establishment, and/or bearer establishment, and/or a combination thereof.

Specifically, for example, the initiation of the present procedure may be any timing after the PDU session has been established for the UE_A 10 and/or the apparatuses in the network. Here, the established PDU session may be based on the PDU session establishment procedure for an emergency call performed as the second procedure (S1080) of the procedure illustrated in FIG. 10 described above. Note that the PDU session establishment procedure may be the PDU session establishment procedure for an emergency call. Furthermore, the UE_A 10, having completed the PDU session establishment procedure, may initiate the present procedure at any timing as long as IMS registration has not been performed, that is, the IP address of the UE_A 10 has not been linked with the Public User Identity assigned by the network. Additionally, based on the completion of the IMS registration, the UE_A 10 and IMS apparatuses may recognize a registration state, that is, may recognize that the IP address of the UE_A 10 has been linked with the Public User Identity assigned by the network.

Furthermore, the present procedure determines the path of the Session Initiation Protocol (SIP) message in the IMS procedure after the IMS registration procedure.

3.6.1. Example of IMS Registration Procedure

Figure 12:
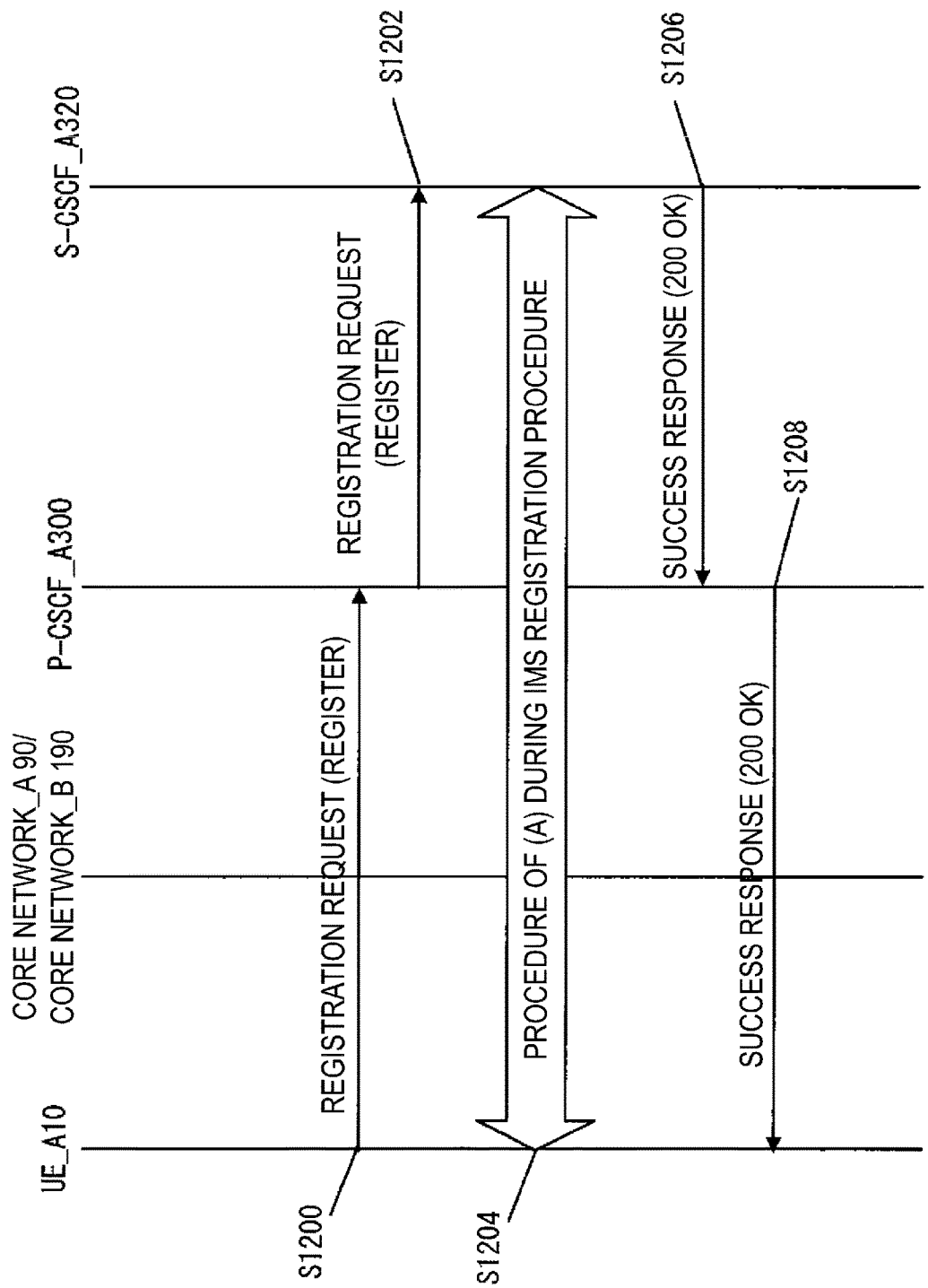
FIG. 12 is a diagram illustrating an IMS registration procedure.

An example of a process for performing the IMS registration procedure will be described using FIG. 12. The present procedure hereinafter refers to the IMS registration procedure. Note that the present procedure may be a procedure included in the IMS registration procedure for an emergency call (S1080). Additionally, the present procedure may be performed during an emergency call connection via the core network_A and/or the core network_B. Each step of the present procedure will be described below.

First, the UE_A 10 transmits a REGISTER signal (S1200) requesting the IMS registration for an emergency call to the P-CSCF_B 310, dedicated to an emergency call and indicated by the network in the second procedure (S1070) described above. Note that the second procedure may be the PDU session establishment procedure for an emergency call, for example.

Then, the P-CSCF_B 310 receiving the REGISTER signal for the emergency call transfers the REGISTER signal for an emergency call to the E-CSCF_A 330 via the I-CSCF, the ATCF, or the IBCF based on serving cell information of the UE_A 10 and the operator policies related to the signal path (S1202). Specifically, the UE_A 10 transmits, to the P-CSCF_B 310, dedicated to an emergency call, the REGISTER signal (S1204) including, in a Contact header, information explicitly indicating the IMS registration for an emergency call connection.

Then, the P-CSCF_B 310 receives the REGISTER signal and then transfers the REGISTER signal to the E-CSCF via the I-CSCF, the ATCF, or the IBCF, based on the serving cell information of the UE_A 10 and the operator policies related to the signal path.

Next, the E-CSCF_A 330 receiving the REGISTER signal for the emergency call detects, based on information explicitly indicating IMS registration for an emergency call connection included in the Contact header, the IMS registration for an emergency call connection, and associates a contact address in the Contact header, the information explicitly indicating the IMS registration for an emergency call connection, and a public user identity to be registered, to create and retain IMS registration information.

Furthermore, the S-CSCF creates IMS registration information for an emergency call, and transmits, to the UE_A 10, as a response to the IMS registration request, "200 OK" along with information indicating that IMS registration for an emergency call connection has been completed (S1206) (S1208). The present procedure is thus complete.

3.7. Overview of IMS Emergency Call Connection Procedure

Now, the IMS emergency call connection procedure will be described in brief. The IMS emergency call connection procedure is hereinafter also referred to as the present procedure. The present procedure may include an IMS emergency call connection procedure using a dedicated PDU session for an emergency call, and/or an IMS emergency call connection procedure using a normal PDU session and/or a Circuit Switching (CS) emergency call connection procedure. Details of each procedure will be described below. Note that the present procedure is a procedure during the IMS procedure for an emergency call (S1080) illustrated in FIG. 10, and may be initiated based on the completion of the performance of the second procedure (S1070) and/or the IMS registration procedure for an emergency call during the IMS procedure for an emergency call.

Figure 13:
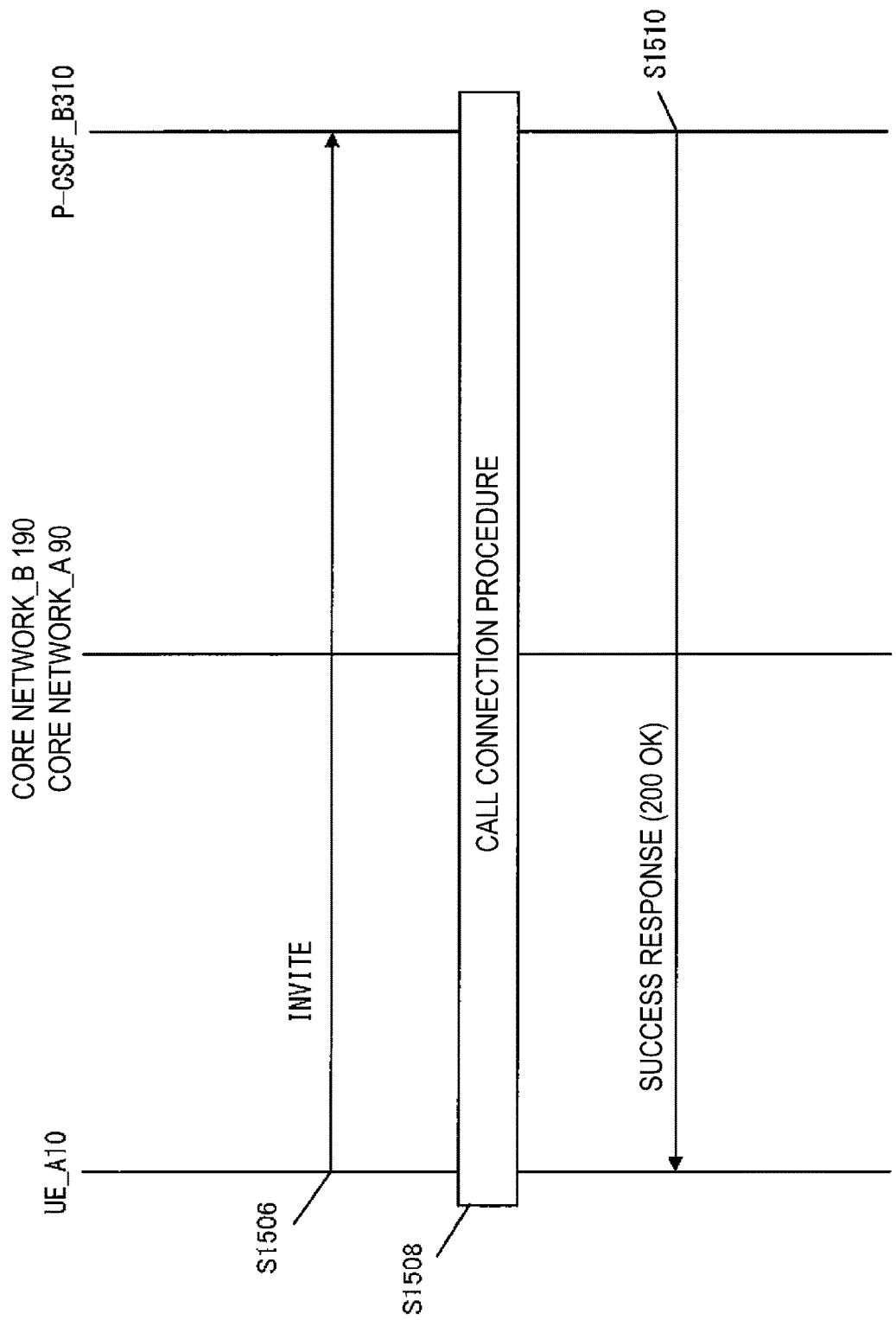
FIG. 13 is a diagram illustrating a connection procedure for an IMS emergency call.

3.7.1. Example of IMS Emergency Call Connection Procedure Using Dedicated PDU Session for Emergency Call The IMS emergency call connection procedure using the dedicated PDU session for an emergency call will be described using FIG. 13. The present procedure hereinafter refers to the IMS emergency call connection procedure. Note that the present procedure may be a procedure included in the IMS registration procedure for an emergency call (S1080). Additionally, the present procedure may be performed during the emergency call connection via the core network_A and/or the core network_B. For example, the UE_A 10 may transmit an IMS emergency call connection signal using an established dedicated PDU session for an emergency call. Each step of the present procedure will be described below.

After completing the IMS registration for an emergency call connection described above, the UE_A 10 transmits, to the P-CSCF_B 310, an INVITE is transmitted including information indicating a dedicated signal for an emergency call (S1506), and makes a SIP dialog formation request dedicated to an emergency call.

Specifically, the UE_A 10 configures routing of the SIP signal, based on the path information received in the IMS registration for an emergency call connection, and transmits, to the P-CSCF_B 310, which is dedicated to an emergency call and for which routing has been configured, an INVITE signal with emergency service URN indicating an emergency call connection being configured in a request URI and a To header (S1506). The P-CSCF_B 310 receives the INVITE, then creates a dedicated connection path for an emergency call, and transfers the INVITE signal to the public safety answering point via the dedicated CSCF for an emergency call (E-CSCF) or the like to request formation of a dedicated dialog for an emergency call. The P-CSCF_B 310 is notified of successful dialog formation, and transmits, to the UE_A 10, "200 OK" indicating successful formation of a dedicated dialog for an emergency call (S1510).

3.7.2. Example of CS Emergency Call Connection Procedure

Now, the CS emergency call connection procedure (hereinafter also referred to as the present procedure) will be described. Note that the present procedure may be a procedure included in the IMS registration procedure for an emergency call (S1080). The present procedure may also be performed for an emergency call connection via a CS network.

The present procedure is a procedure for an emergency call connection via a CS network, and the UE_A 10 may perform the emergency call connection procedure via the CS network, based on the above-described procedures and/or the various pieces of information received in the above-described procedures and/or the network policies and/or the UE policies. Furthermore, the UE_A 10 may perform the present procedure after performing location registration for an emergency call to the CS network as the second procedure described above.

In a case of receiving a reject or redirect message from the IMS_A 7, the UE_A 10 detects whether or not the connected core network supports the dedicated PDU session function for an emergency call. Then, in a case that the dedicated PDU session function for an emergency call is unsupported and that another core network in the same PLMN supports no voice service function or that another core network in the same PLMN supports the voice service function but does not support the dedicated PDU session function for an emergency call, the UE_A 10 may provide a Circuit Switching (CS) emergency call connection.

Specifically, the UE_A 10 detects, due to the registration procedure or broadcast information, that the core network to which the UE_A 10 is attempting to connect or is connected does not support the dedicated PDU session function for an emergency call, and in a case that another core network in the same PLMN supports no voice service function, based on the network function information or network capability information of the another core network in the same PLMN acquired in the above-described registration procedure, the UE_A 10 may provide a Circuit Switching (CS) emergency call connection via the CS network.

In a case that another core network in the same PLMN supports the voice service function but does not support the dedicated PDU session function for an emergency call, based on the network function information of another core network in the same PLMN acquired in the registration procedure, the UE_A 10 checks a serving location. At this time, in a case that the UE_A 10 is served by another network, the UE_A 10 may provide a CS emergency call connection.

In addition, in a case that the redirect message does not include information urging another core network in the same PLMN supporting the voice service function and the dedicated PDU session function for an emergency call to perform an IMS emergency call connection, the UE_A 10 checks the serving location. At this time, the present procedure may be performed in a case that the UE_A 10 is served by another network.

3.8. Overview of UE Function Request Procedure

Now, a UE function request procedure will be described. The UE function request procedure is hereinafter also referred to as the present procedure. Note that the present procedure may be performed during the registration procedure for registration with the core network (S1020) described in FIG. 10 described above, or may be performed at any timing, not limited to the time during the registration procedure for registration with the core network (S1020).

Each step of the present procedure will be described below.

First, in a case of determining, in connection with the process for determining the 12th identification information included in the registration accept message described above, the need to acquire UE function information including information related to the availability of support of an emergency call fallback function for falling back to an access network and/or a core network other than the access network and/or the core network to/by which the AMF_A 240 is connected/served, the AMF_A 240 transmits an N2: UE Capability Match Request message to the access network_B 120 and/or the access network_A' 81 (S1400).

In a case that the access network_B 120 and/or the access network_A' 81, having received the N2: UE Capability Match Request message, retains no UE function information including information related to the availability of support of the emergency call fallback function for falling back to an access network and/or a core network other than the connected/serving access network and/or core network, the access network_B 120 and/or the access network_A' 81 transmits an RRC: UE Capability Enquiry message to the UE_A 10 to request UE function information including information related to the availability of support of the emergency call fallback function for falling back to an access network and/or a core network other than the connected/serving access network and/or core network (S1402).

In a case of receiving the RRC: UE Capability Enquiry message, the UE_A 10 transmits the RRC: UE Capability Information message to the access network_B 120 and/or the access network_A' 81 (S1404) to notify the access network_B 120 and/or the access network_A' 81 of UE function information including information related to the availability of support of the emergency call fallback function for falling back to an access network and/or a core network other than the connected/serving access network and/or core network.

In a case of receiving the RRC: UE Capability Information message, the access network_B 120 and/or the access network_A' 81 determines functional compatibility between the network and the UE related to the emergency call service, based on the UE function information including information related to the availability of support of the emergency call fallback function for falling back to the access network and/or the core network and the availability of support of the emergency call fallback function by the access network and/or the core network.

The access network_B 120 and/or the access network_A' 81 transmits an N2: UE Capability Match Indication and/or an N2: UE Capability Info Response to the AMF_A 240 (S1406) (S1408) to notify the AMF_A 240 of the above-described determination results.

Additionally, at this time, the access network_B 120 and/or the access network_A' 81 may place, on the N2: UE Capability Match Indication and/or the N2: UE Capability Info Response, the UE function information including information related to the availability of support of the emergency call fallback function for falling back to the access network and/or the core network, and transmits the resultant signals to the AMF_A 240 (S1406) (S1408).

3.9. Attach Procedure

First, an attach procedure will be described using FIG. 15. The attach procedure is a procedure in the EPS. The present procedure hereinafter refers to the attach procedure. The present procedure is a procedure for the UE to be registered with the core network_A. Each step of the present procedure will be described below.

First, the UE initiates the attach procedure by transmitting an Attach Request message to the MME via the eNB (S1502). The UE may include a PDN connection request message in the attach request message for transmission, or may request to perform a PDN connection procedure during the attach procedure by including the PDN connection request message.

Based on the reception of the attach request message and/or a session generation response message and/or the completion of a PDN connection, the MME transmits an Attach Accept message to the UE via the eNB (S1504).

Here, the MME may include, in the attach accept message, information related to support of the emergency call service via the core network A 90, and transmit the attach accept message.

In a case of receiving the attach accept message, the UE transmits an attach complete message to the MME via the eNB (S1506).

3.10. Tracking Area Update Procedure

Now, the tracking area update procedure will be described in brief. The present procedure hereinafter refers to the tracking area update procedure. The present procedure may be a procedure for updating location registration information of the UE in the network (access network and/or core network_A), and/or regularly notifying the state of the UE from the UE to the network, and/or updating particular parameters related to the UE in the network. The U E can perform the present procedure at any timing as long as a PDN connection is established.

Note that the process of the tracking area update procedure may be similar to the process of the attach procedure.

In the process of the tracking area update procedure, control messages transmitted and received in the attach procedure can be replaced with control messages for the tracking area update procedure. For example, the attach request message transmitted and/or received in the attach procedure may be replaced with a Tracking Area Update request message, and the attach accept message may be replaced with a Tracking Area Update accept message. Furthermore, the attach complete message may be replaced with a Tracking Area Update complete message.

Furthermore, the identification information included in the control message and transmitted and/or received in the control message during the attach procedure may be included in the control message during the tracking area update procedure and transmitted and/or received in the control message. Moreover, the behavior of each apparatus performed based on the reception of the control message during the attach procedure and/or the reception of the identification information included in the control message during the attach procedure may be performed based on the reception of the control message during the tracking area update procedure and/or the reception of identification information included in the control message during the tracking area update procedure. Furthermore, the behavior of each apparatus performed based on the completion of the attach procedure may be performed based on the completion of the tracking area update procedure.

4. EMBODIMENTS

Embodiments of the present invention will each be described below.

4.1. First Embodiment

A first embodiment of the present invention will be described using FIG. 10 and FIG. 11. The first embodiment is also referred to as the present embodiment below.

The present embodiment mainly relates to the behavior of the procedure for registration with the core network illustrated in FIG. 10 (S1020; hereinafter also referred to simply as the "registration procedure") and the procedure of (D) in the procedure illustrated in FIG. 10, based on the completion of the registration procedure. Furthermore, the present embodiment relates to a case where, in the registration procedure for registration with the core network (S1020), the registration accept message (S1108) received by the UE_A from the core network_B includes the 11th and/or 12th identification information.

First, the UE_A operates in the Single registration mode, operates in the N1 mode, and is served by the access network_B connected to the core network_B. That is, the location of the UE is registered with the AMF.

In this case, according to the contents of the 11th and/or 12th identification information included in the registration accept message received by the UE_A, the UE_A and/or the apparatuses complete the registration procedure for registration with the core network (S1020) and then determine to provide an emergency call connection (S1040). Then, the UE_A and/or the apparatuses may perform an emergency call connection process described below.

More specifically, the UE_A and/or the apparatuses may perform a first procedure example described below.

The registration procedure for registration with the core network illustrated in FIG. 10 (S1020; hereinafter also simply referred to as the "registration procedure") may be a procedure in which the 11th identification information included in the registration accept message (S1108) received by the UE_A from the core network_B indicates non-support of the emergency call service via the core network B 190. This may also mean that the emergency call service via the access network A' and the access network B connected to the core network B 190 is unsupported.

Furthermore, in a case that the UE_A has a function to perform a dedicated service request (SERVICE REQUEST) for invoking a handover and/or redirection procedure performed by the network and that the 12th identification information indicating the emergency call connection scheme and included in the registration accept message received by the UE_A indicates support, then in performance of the emergency call connection process, the UE_A 10 selects, as an emergency call connection scheme, a service request (SERVICE REQUEST) (S1050) including the 30th identification information and allows the network to initiate and perform the process of redirection and/or handover to the core network A 90 (S1060).

Note that the UE_A and/or the apparatuses may perform a second procedure example described below, which is different from the first procedure example.

The registration procedure (S1020; hereinafter also simply referred to as the "registration procedure") in the core network illustrated in FIG. 10 may be a procedure in which the 11th identification information included in the registration accept message (S1108) received by the UE_A from the core network_B indicates non-support of the emergency call service via the core network B 190. This may also mean that the emergency call service via the access network A' and the access network B connected to the core network B 190 is unsupported.

Furthermore, in a case that the UE_A has the function to perform the dedicated service request (SERVICE REQUEST) for invoking the handover and/or redirection procedure performed by the network and that the 12th identification information indicating the emergency call connection scheme and included in the registration accept message received by the UE_A indicates non-support, then in performance of the emergency call connection process, the UE_A 10 may stop the N1 mode, select the access network A, and provide an emergency call connection via the core network A 90, or in a case that the 12th identification information indicates support of fallback to the emergency call service via the access network A', the UE_A may select the access network A' and allow the network to initiate and perform the process of redirection and/or handover to the core network A 90 (S1060).

Note that the UE_A and/or the apparatuses may perform a third procedure example described below, which is different from the first procedure example and the second procedure example.

The registration procedure for registration with the core network illustrated in FIG. 10 (S1020; hereinafter also simply referred to as the "registration procedure") may be a procedure in which the 11th identification information included in the registration accept message (S1108) received by the UE_A from the core network_B indicates non-support of the emergency call service via the core network B 190. This may also mean that the emergency call service via the access network A' and the access network B connected to the core network B 190 is unsupported.

Furthermore, in a case that the UE_A does not have the function to perform the dedicated service request (SERVICE REQUEST) for invoking the handover and/or redirection procedure performed by the network, then regardless of the 12th identification information indicating the emergency call connection scheme and included in the registration accept message received by the UE_A, in performance of the emergency call connection process, the UE_A 10 stops the N1 mode, selects the access network A, and provides an emergency call connection via the core network A 90.

Note that the UE_A and/or the apparatuses may perform a fourth procedure example described below, which is different from the first to third procedure examples.

The registration procedure for registration with the core network illustrated in FIG. 10 (S1020; hereinafter also referred to simply as the "registration procedure") may be a procedure for which the 11th identification information included in the registration accept message (S1108) received by the UE_A from the core network_B indicates support of an emergency call service via the access network A' connected to the core network B 190.

Furthermore, in a case that the UE_A has a function to perform a dedicated service request (SERVICE REQUEST) for invoking a handover and/or redirection procedure performed by the network and that the 12th identification information indicating the emergency call connection scheme and included in the registration accept message received by the UE_A indicates support, then in performance of the emergency call connection process, the UE_A 10 selects, as an emergency call connection scheme, a service request (SERVICE REQUEST) (S1050) including the 30th identification information and allows the network to initiate and perform the process of redirection and/or handover to the core network A 90 (S1060).

Note that the UE_A and/or the apparatuses may perform a fifth procedure example described below, which is different from the first to fourth procedure examples.

The registration procedure for registration with the core network illustrated in FIG. 10 (S1020; hereinafter also referred to simply as the "registration procedure") may be a procedure for which the 11th identification information included in the registration accept message (S1108) received by the UE_A from the core network_B indicates support of an emergency call service via the access network A' connected to the core network B 190.

Furthermore, in a case that the UE_A has the function to perform the dedicated service request (SERVICE REQUEST) for invoking the handover and/or redirection procedure performed by the network and that the 12th identification information indicating the emergency call connection scheme and included in the registration accept message received by the UE_A indicates non-support, then in performance of the emergency call connection process, the UE_A 10 may stop the N1 mode, select the access network A, and provide an emergency call connection via the core network A 90, or select the access network A' and provide an emergency call connection via the access network A' connected to the core network B 190, or in a case that the 12th identification information indicates support of fallback to the emergency call service via the access network A', the UE_A may select the access network A' and allow the network to initiate and perform the process of redirection and/or handover to the core network A 90 (S1060).

Furthermore, in the case that the UE_A does not have the function to perform the dedicated service request (SERVICE REQUEST) for invoking the handover and/or redirection procedure performed by the network, then in performance of the emergency call connection process, the UE_A 10 may stop the N1 mode, select the access network A, and provide an emergency call connection via the core network A 90, or select the access network A' and provide an emergency call connection via the access network A' connected to the core network B 190.

Note that the UE_A and/or the apparatuses may perform a sixth procedure example described below, which is different from the first to fifth procedure examples.

The registration procedure for registration with the core network illustrated in FIG. 10 (S1020; hereinafter also referred to simply as the "registration procedure") may be a procedure for which the 11th identification information included in the registration accept message (S1108) received by the UE_A from the core network_B indicates support of an emergency call service via the access network B connected to the core network B 190 or via the access network A' and the access network B connected to the core network B 190.

In this case, an emergency call connection via the access network B connected to the core network B 190 is provided regardless of whether or not the UE_A has the function to perform the dedicated service request (SERVICE REQUEST) for invoking the handover and/or redirection procedure performed by the network and regardless of the 12th identification information indicating the emergency call connection scheme and included in the registration accept message received by the UE_A.

4.2. Second Embodiment

A second embodiment of the present invention will be described using FIG. 10 and FIG. 11 below. The second embodiment is also referred to as the present embodiment.

The present embodiment mainly relates to the behavior of the procedure for registration with the core network illustrated in FIG. 10 (S1020; hereinafter also referred to simply as the "registration procedure") and the procedure of (D) in the procedure illustrated in FIG. 10, based on the completion of the registration procedure. Furthermore, the present embodiment relates to a case where, in the registration procedure for registration with the core network (S1020), the registration accept message (S1108) received by the UE_A from the core network_B includes the 11th and/or 12th identification information.

First, the UE_A operates in the Single registration mode, operates in the N1 mode, and is served by the access network_A' connected to the core network_B. That is, the location of the UE is registered with the AMF.

In this case, according to the contents of the 11th and/or 12th identification information included in the registration accept message received by the UE_A, the UE_A and/or the apparatuses complete the registration procedure for registration with the core network (S1020) and then determine to provide an emergency call connection (S1040). Then, the UE_A and/or the apparatuses may perform an emergency call connection process described below.

More specifically, the UE_A and/or the apparatuses may perform a seventh procedure example described below, which is different from the first to sixth procedure examples.

The registration procedure for registration with the core network illustrated in FIG. 10 (S1020; hereinafter also simply referred to as the "registration procedure") may be a procedure in which the 11th identification information included in the registration accept message (S1108) received by the UE_A from the core network_B indicates non-support of the emergency call service via the core network B 190. This may also mean that the emergency call service via the access network A' and the access network B connected to the core network B 190 is unsupported.

Furthermore, in a case that the UE_A has a function to perform a dedicated service request (SERVICE REQUEST) for invoking a handover and/or redirection procedure performed by the network and that the 12th identification information indicating the emergency call connection scheme and included in the registration accept message received by the UE_A indicates support, then in performance of the emergency call connection process, the UE_A 10 selects, as an emergency call connection scheme, a service request (SERVICE REQUEST) (S1050) including the 30th identification information and allows the network to initiate and perform the process of redirection and/or handover to the core network A 90 (S1060).

Note that the UE_A and/or the apparatuses may perform an eighth procedure example described below, which is different from the first to seventh procedure examples.

The registration procedure (S1020; hereinafter also simply referred to as the "registration procedure") in the core network illustrated in FIG. 10 may be a procedure in which the 11th identification information included in the registration accept message (S1108) received by the UE_A from the core network_B indicates non-support of the emergency call service via the core network B 190. This may also mean that the emergency call service via the access network A' and the access network B connected to the core network B 190 is unsupported.

Furthermore, in a case that the UE_A has the function to perform the dedicated service request (SERVICE REQUEST) for invoking the handover and/or redirection procedure performed by the network and that the 12th identification information indicating the emergency call connection scheme and included in the registration accept message received by the UE_A indicates non-support, then in performance of the emergency call connection process, the UE_A 10 may stop the N1 mode, select the access network A, and provide an emergency call connection via the core network A 90, or in a case that the 12th identification information indicates support of fallback to the emergency call service via the access network B, the UE_A may select the access network B and allow the network to initiate and perform the process of redirection and/or handover to the core network A 90 (S1060).

Note that the UE_A and/or the apparatuses may perform a ninth procedure example described below, which is different from the first to eighth procedure examples.

The registration procedure (S1020; hereinafter also simply referred to as the "registration procedure") in the core network illustrated in FIG. 10 may be a procedure in which the 11th identification information included in the registration accept message (S1108) received by the UE_A from the core network_B indicates non-support of the emergency call service via the core network B 190. This may also mean that the emergency call service via the access network A' and the access network B connected to the core network B 190 is unsupported.

Furthermore, in a case that the UE_A does not have the function to perform the dedicated service request (SERVICE REQUEST) for invoking the handover and/or redirection procedure performed by the network, then regardless of the 12th identification information indicating the emergency call connection scheme and included in the registration accept message received by the UE_A, in performance of the emergency call connection process, the UE_A 10 stops the N1 mode, selects the access network A, and provides an emergency call connection via the core network A 90.

Note that the UE_A and/or the apparatuses may perform a 10th procedure example described below, which is different from the first to ninth procedure examples.

The registration procedure for registration with the core network illustrated in FIG. 10 (S1020; hereinafter also referred to simply as the "registration procedure") may be a procedure in which the 11th identification information included in the registration accept message (S1108) received by the UE_A from the core network_B indicates support of the emergency call service via the access network B connected to the core network B 190.

Furthermore, in a case that the UE_A has a function to perform a dedicated service request (SERVICE REQUEST) for invoking a handover and/or redirection procedure performed by the network and that the 12th identification information indicating the emergency call connection scheme and included in the registration accept message received by the UE_A indicates support, then in performance of the emergency call connection process, the UE_A 10 selects, as an emergency call connection scheme, a service request (SERVICE REQUEST) (S1050) including the 30th identification information and allows the network to initiate and perform the process of redirection and/or handover to the core network A 90 (S1060).

Note that the UE_A and/or the apparatuses may perform an 11th procedure example described below, which is different from the first to 10th procedure examples.

The registration procedure for registration with the core network illustrated in FIG. 10 (S1020; hereinafter also referred to simply as the "registration procedure") may be a procedure in which the 11th identification information included in the registration accept message (S1108) received by the UE_A from the core network_B indicates support of the emergency call service via the access network B connected to the core network B 190.

Furthermore, in a case that the UE_A has the function to perform the dedicated service request (SERVICE REQUEST) for invoking the handover and/or redirection procedure performed by the network and that the 12th identification information indicating the emergency call connection scheme and included in the registration accept message received by the UE_A indicates non-support, then in performance of the emergency call connection process, the UE_A 10 may stop the N1 mode function, select the access network A, and provide an emergency call connection via the core network A 90, or select the access network B and provide an emergency call connection via the access network B connected to the core network B 190, or in a case that the 12th identification information indicates support of fallback to the emergency call service via the access network B, the UE_A may select the access network B and allow the network to initiate and perform the process of redirection and/or handover to the core network A 90 (S1060).

Furthermore, in the case that the UE_A does not have the function to perform the dedicated service request (SERVICE REQUEST) for invoking the handover and/or redirection procedure performed by the network, then in performance of the emergency call connection process, the UE_A 10 may stop the N1 mode function, select the access network A, and provide an emergency call connection via the core network A 90, or select the access network B and provide an emergency call connection via the access network B connected to the core network B 190.

Note that the UE_A and/or the apparatuses may perform a 12th procedure example described below, which is different from the first to 11th procedure examples.

The registration procedure for registration with the core network illustrated in FIG. 10 (S1020; hereinafter also referred to simply as the "registration procedure") may be a procedure in which the 11th identification information included in the registration accept message (S1108) received by the UE_A from the core network_B indicates support of the emergency call service via the access network A' connected to the core network B 190 or via the access network A' and the access network B connected to the core network B 190.

In this case, an emergency call connection via the access network A' connected to the core network B 190 is provided regardless of whether or not the UE_A has the function to perform the dedicated service request (SERVICE REQUEST) for invoking the handover and/or redirection procedure performed by the network and regardless of the 12th identification information indicating the emergency call connection scheme and included in the registration accept message received by the UE_A.

Furthermore, the behavior performed after the registration accept message including the 11th and/or 12th identification information is transmitted and received may not be limited to the behaviors described above.

4.3. Third Embodiment

A third embodiment of the present invention will be described using FIG. 10 and FIG. 11. The third embodiment is also referred to as the present embodiment below.

The present embodiment mainly relates to the behavior of the procedure of (D) in the procedure illustrated in FIG. 10, based on the registration procedure for registration with the core network illustrated in FIG. 10 (S1020; hereinafter also referred to simply as the "registration procedure") and the completion of the registration procedure. Furthermore, the present embodiment relates to the determination of the contents of the 11th and/or 12th identification information included in the registration accept message (S1108) transmitted from the core network in the registration procedure for registration with the core network, to the UE_A (S1020).

The following behaviors may be performed in determining the contents of the 11th and/or 12th identification information included in the registration accept message transmitted from the core network and transmitting the registration accept message to the UE_A.

For example, in a case that the core network indicates the 12th identification information in the registration accept message in the registration procedure, the 12th identification information may be indicated in consideration of not only the availability of support of the emergency call service but also the availability of support of the voice call service and/or the second identification information indicating whether the UE_A has the function to perform the dedicated service request (SERVICE REQUEST) for invoking the handover and/or redirection procedure performed by the network.

More specifically, the core network_B 190 may perform a first procedure example described below.

In a case that the core network_B 190 notifies the UE_A 10 of the 12th identification information and that the 11th identification information indicates that the emergency call service via the core network_B 190 is unsupported regardless of the access network, the core network_B 190 may notify support by using the 12th identification information as long as the voice service and/or the emergency call service is supported via the core network A, corresponding to another core network in the same PLMN as that which includes the core network_B 190.

Note that the core network_B 190 may perform a second procedure example described below, which is different from the first procedure example.

In a case that the core network_B 190 notifies the UE_A 10 of the 12th identification information and that the 11th identification information indicates that the emergency call service is supported only via the access network A' connected to the core network_B 190, the core network_B 190 may notify support by using the 12th identification information as long as the access network A' connected to the core network_B 190 supports the voice service and/or the emergency call service.

Note that the core network_B 190 may perform a third procedure example and a fourth procedure example illustrated below.

First, the UE_A operates in the Single registration mode and/or a dual registration mode, and is served by the access network_B connected to the core network_B. In this case, the core network_B 190 may include, in the notification of the 12th identification information, the second identification information in addition to the availability of support of the voice call service described in the first and second procedure examples.

In the third procedure example, for example, in a case that the 11th identification information indicates non-support of the emergency call service via the core network B 190 and that fallback of the emergency call service via the access network A' and/or the access network B is enabled, the core network_B 190 may notify non-support by using the 12th identification information indicating the emergency call connection scheme in a case that the second identification information indicates support.

Additionally, in the fourth procedure example, for example, in a case that the 11th identification information indicates support of the emergency call service via the access network A' connected to the core network B 190 and that fallback of the emergency call service via the access network A' and/or the access network B is enabled, the core network_B 190 notifies non-support by using the 12th identification information indicating the emergency call connection scheme in a case that the second identification information indicates support.

Note that the core network_B 190 may perform fifth and sixth procedure examples illustrated below.

First, the UE_A operates in the Single registration mode and/or the dual registration mode, operates in the N1 mode, and is served in the access network_A' connected to the core network_B. That is, the location of the UE is registered with the AMF. In this case, the core network_B 190 may include, in the notification of the 12th identification information, the second identification information in addition to the availability of support of the voice call service described in the first and second procedure examples.

In the fifth procedure example, for example, in a case that the 11th identification information indicates non-support of the emergency call service via the core network B 190 and that fallback of the emergency call service via the access network A' and/or the access network B is enabled, the core network_B 190 notifies non-support by using the 12th identification information indicating the emergency call connection scheme in a case that the second identification information indicates support.

Additionally, in the sixth procedure example, for example, in a case that the 11th identification information indicates non-support of the emergency call service via the core network B 190 and that fallback of the emergency call service via the access network A' and/or the access network B is enabled, the core network_B 190 may notify non-support by using the 12th identification information indicating the emergency call connection scheme in a case that the second identification information indicates support.

Here, the case where the fallback of the emergency call service is enabled may mean whether the access network and/or the core network includes the handover and/or redirection function performed based on the service request (SERVICE REQUEST) including the 30th identification information via the access network A' connected to the core network B 190 and/or the access network B connected to the core network B 190.

In other words, instead of using the scheme in which the 12th identification information is configured based on whether the access network and/or the core network has the capability of invoking the handover and/or redirection procedure for the emergency call service, the third to sixth procedure examples may configure the 12th identification information not only by using the configuration scheme based on the capability of the access network and/or the core network of invoking the handover and/or redirection procedure for the emergency call service but also based on whether the UE_A 10 indicated by the second identification information has the function to perform the dedicated service request (SERVICE REQUEST) for invoking the handover and/or redirection procedure performed by the network.

Furthermore, for the method for determining the function of the UE, the core network may not be limited to the method based on the second identification information.

Figure 14:
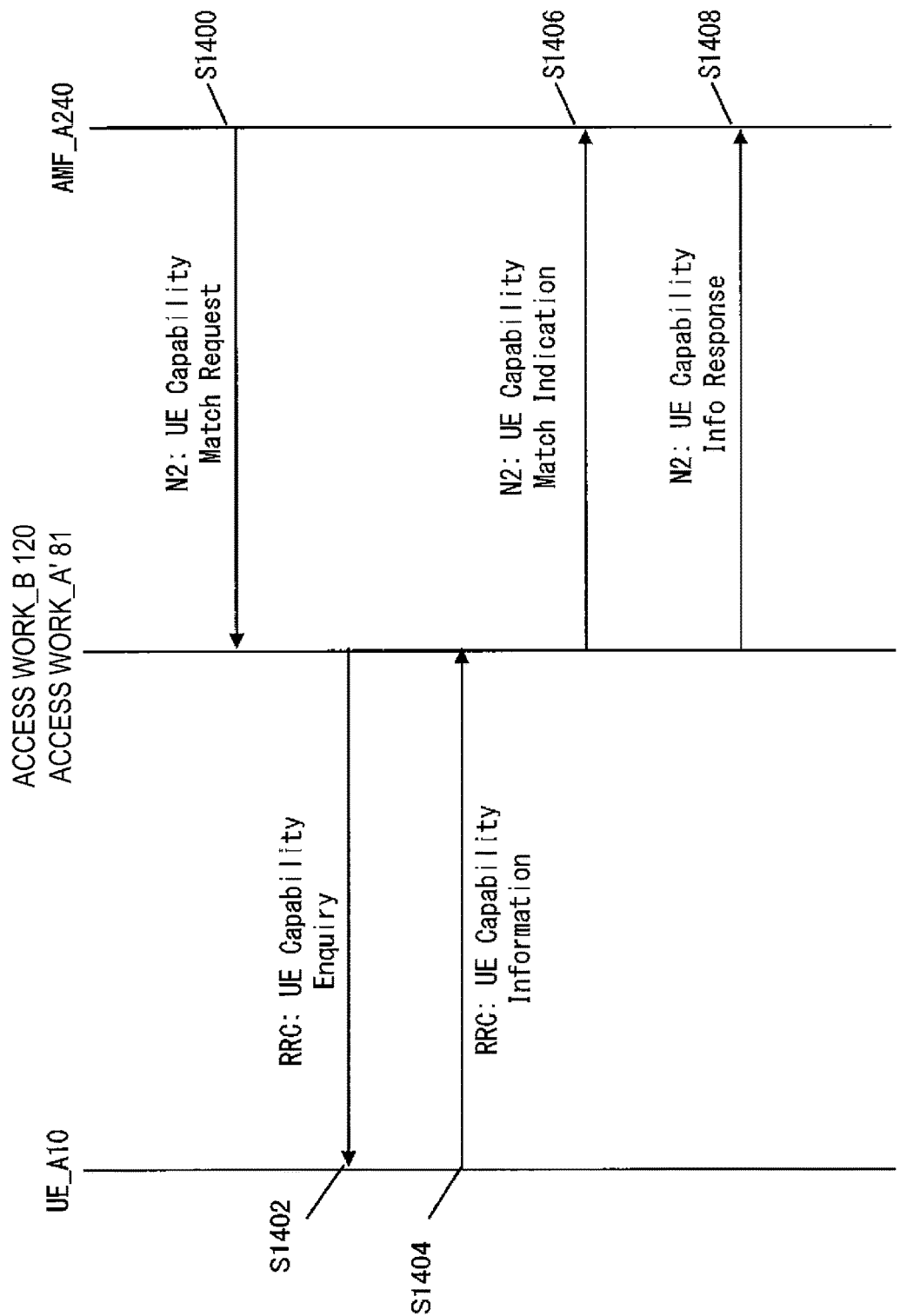
FIG. 14 is a diagram illustrating a request procedure for a UE function.

For example, the core network may acquire the capability of the UE in the UE function request procedure illustrated in FIG. 14.

Furthermore, for the scheme in which the core network configures the 12th identification information, description has been given of the scheme based on the capability of the access network and/or the core network of invoking the handover and/or redirection procedure for the emergency call service and/or the scheme based on the second identification information. However, the 12th identification information may be determined based on the scheme described below in addition to the above-described schemes.

Specifically, the 12th identification information may be configured based on configuration information of an operator operating the access network and/or the core network. The configuration information may or need not necessarily be network policies and/or operator policies and/or service policies and/or local policies and/or network implementation matters.

For example, even though the access network and/or the core network has the capability of invoking the handover and/or redirection procedure for the emergency call service, the 12th identification information may be configured as non-support, based on the configuration information of the operator operating the access network and/or the core network.

Note that the configuration information may be configured for each particular geographic area.

Here, the geographic area may be one or more registration areas and/or tracking areas.

In other words, in a case of AMFs belonging to the same geographic area, common configuration information may be provided even for the AMFs being different from each other, in order to ensure common operation related to emergency call fallback of UEs belonging to the same geographic area.

In addition, in the present embodiment, the 12th identification information notified by the core network may further include information meaning support of the voice call service, as well as support of the emergency call service.

At this time, based on the 12th identification information, the UE_A 10 transmits the service request (SERVICE REQUEST) (S1050) including the 30th identification information to the core network for handover or redirection to the access network and/or the core network supporting the emergency call service.

Based on the contents of the 11th and/or 12th identification information included in the registration accept message, the UE_A and/or the apparatuses may complete the registration procedure for registration with the core network (S1020) and then determine to provide an emergency call connection (S1040). Then, the UE_A and/or the apparatuses may perform the subsequent procedures.

4.4. Fourth Embodiment

A fourth embodiment of the present invention will be described using FIG. 10. The fourth embodiment is also referred to as the present embodiment below.

The present embodiment mainly relates to the behaviors of the registration procedure for registration with the core network (S1020; hereinafter also simply referred to as the registration procedure) illustrated in FIG. 10 described above and/or the service request procedure (S1050) and/or the procedure of (D) in the procedure illustrated in FIG. 10 and the subsequent procedures.

Specifically, the present embodiment relates to handling of the 11th and/or 12th identification information included in the registration accept message received in the registration procedure and the behaviors of the UE_A and the apparatuses performed after the reception of the 40th identification information included in the reject message transmitted from the network in the procedure of (E) (service request procedure; S1050) during the procedure illustrated in FIG. 10 and performed based on the 11th and/or 12th identification information.

In the first to third embodiments, description has been given of the scheme in which the UE_A and/or the core network performs the processing based on the 11th and/or 12th identification information to prevent a failure in emergency call connection, thus implementing an immediate call connection. In the present embodiment, furthermore, in processing related to the emergency call service, after an erroneous emergency call connection is invoked, processing may be performed to remedy the emergency call connection. Procedure examples for the processing will be described below.

Specifically, the terminal and the core network may perform a 21st procedure example, which will be described below.

The UE_A 10 may retain the 11th and/or the 12th identification information after performing the registration procedure in the initial procedure.

Subsequently, the UE_A 10 determines to provide an emergency call connection (S1040) and then performs an emergency call connection procedure by using the service request (SERVICE REQUEST) including the 30th identification information, based on the already retained 11th and/or 12th identification information, and this procedure may be a procedure rejected by the core network_B 190. Note that the reject message may include the 40th identification information.

Here, the 11th identification information retained by the UE_A 10 may be information indicating non-support of the emergency call service via the core network_B 190 regardless of the access network.

In this case, in emergency call reconnection, the UE_A 10 may select the CS domain as an access domain and/or domain selection process based on the 11th and/or the 12th identification information and/or the reception of the service reject (SERVICE REJECT) message from the core network_B 190.

Additionally, the terminal and the core network may perform a 22nd procedure example illustrated below, which is different from the 21st procedure example.

The UE_A 10 may retain the 11th and/or the 12th identification information after performing the registration procedure in the initial procedure.

Subsequently, the UE_A 10 determines to provide an emergency call connection (S1040) and then performs the emergency call connection procedure by using the service request (SERVICE REQUEST) including the 30th identification information, based on the already retained 11th and/or 12th identification information, and this procedure may be a procedure rejected by the core network_B 190. Note that the reject message may include the 40th identification information.

Here, the 11th identification information retained by the UE_A 10 may be information indicating support of the emergency call service via the access network A' connected to the core network_B 190.

In this case, in emergency call reconnection, the UE_A 10 may select the core network A as an access domain and/or domain selection process in a case that the UE_A 10 supports the S1 mode, based on the 11th and/or the 12th identification information, and/or the reception of the service reject (SERVICE REJECT) message from the core network_B 190. In a case that the UE_A 10 does not support the S1 mode, the UE_A 10 may select the CS domain as an access domain and/or domain selection process.

Furthermore, the terminal and the core network may perform a 23rd procedure example illustrated below, which is different from the 21st and 22nd procedure examples.

The UE_A 10 may retain the 11th and/or the 12th identification information after performing the registration procedure in the initial procedure.

Subsequently, the UE_A 10 determines to provide an emergency call connection (S1040) and then performs the emergency call connection procedure by using the service request (SERVICE REQUEST) including the 30th identification information, based on the already retained 11th and/or 12th identification information, and this procedure may be a procedure rejected by the core network_B 190. Note that the reject message may include the 40th identification information.

Here, the 11th identification information retained by the UE_A 10 may be information indicating support of the emergency call service via the access network B and the access network A' connected to the core network_B 190.

In this case, in emergency call reconnection, the UE_A 10 may select the core network A or the access network A' connected to the core network_B 190 as an access domain and/or domain selection process in a case that the UE_A 10 supports the S1 mode, based on the 11 and/or the 12 identification information and/or the reception of the service reject (SERVICE REJECT) reject message from the core network_B 190. In a case that the UE_A 10 does not support the S1 mode, the CS domain or the access network A' connected to the core network_B 190 may be selected as an access domain and/or domain selection process.

Furthermore, the terminal and the core network may perform an example of a 24th procedure illustrated below, which is different from the 21st to 23rd procedure examples.

In the initial procedure, the UE_A 10 may perform the registration procedure and then retain the 11th and/or the 12th identification information.

Thereafter, the UE_A 10 determines to provide an emergency call connection (S1040) and then performs the emergency call connection procedure by using the service request (SERVICE REQUEST) including the 30th identification information, based on the already retained 11th and/or the 12th identification information, and this procedure may be a procedure rejected by the core network_B 190. Note that the reject message may include the 40th identification information.

Here, the 40th identification information may include information indicating the CS domain.

In this case, in emergency call reconnection, the UE_A 10 may select the CS domain as an access domain and/or domain selection process, based on the reception of the 40th identification information included in the service reject (SERVICE REJECT) message from the core network_B 190.

Furthermore, the terminal and the core network may perform a 25th procedure example illustrated below, which is different from the 21st to 24th procedure examples.

In the initial procedure, the UE_A 10 may perform the registration procedure and then retain the 11th and/or the 12th identification information.

Thereafter, the UE_A 10 determines to provide an emergency call connection (S1040) and then performs the emergency call connection procedure by using the service request (SERVICE REQUEST) including the 30th identification information, based on the already retained 11th and/or the 12th identification information, and this procedure may be a procedure rejected by the core network_B 190. Note that the reject message may include the 40th identification information.

Here, the 40th identification information may include information indicating the core network A and/or the access network A, included in the same PLMN as that which includes the core network_B 190.

In this case, in emergency call reconnection, the UE_A 10 may select the access network A connected to the core network A as an access domain and/or domain selection process, based on the reception of the 40th identification information included in the service reject (SERVICE REJECT) message from the core network_B 190.

Furthermore, the terminal and the core network may perform a 26th procedure example illustrated below, which is different from the 21st to 25th procedure examples.

In the initial procedure, the UE_A 10 may perform the registration procedure and then retain the 11th and/or the 12th identification information.

Thereafter, the UE_A 10 determines to provide an emergency call connection (S1040) and then performs the emergency call connection procedure by using the service request (SERVICE REQUEST) including the 30th identification information, based on the already retained 11th and/or the 12th identification information, and this procedure may be a procedure rejected by the core network_B 190. Note that the reject message may include the 40th identification information.

Here, the 40th identification information may include information indicating the core network_B 190 and/or the access network A'.

In this case, in emergency call reconnection, the UE_A 10 may select the access network A' connected to the core network_B 190 as an access domain and/or domain selection process, based on the reception of the 40th identification information included in the service reject (SERVICE REJECT) message from the core network_B 190.

4.5. Fifth Embodiment

A fifth embodiment of the present invention will be described. The fifth embodiment is also referred to as the present embodiment.

In the fourth embodiment, processing has been described that is performed in a case that the service reject (SERVICE REJECT) is received as a response to the service request (SERVICE REQUEST) for the emergency call connection process.

Specifically, the UE_A 10 performs the access domain and/or domain selection process for selection of an appropriate access domain for an emergency call connection, based on the retained 11th and/or 12th identification information and/or the reception of the service reject (SERVICE REJECT) message.

Furthermore, in the present embodiment, the UE_A 10 performs similar processing even in a case that the second procedure (S1070) related to an emergency call connection is rejected.

Specifically, in a case that the procedure for establishing a PDU session for the emergency call service, the procedure being performed by the UE_A 10, is rejected by the network, the UE_A 10 performs the access domain and/or domain selection process for an appropriate access domain selection for an emergency call connection, based on the retained 11th and/or the 12th identification information, and/or the reception of the PDU session reject (PDU SESSION REJECT) message.

4.6. Sixth Embodiment

A sixth embodiment of the present invention will be described with reference to FIG. 10 and FIG. 11. The sixth embodiment is also referred to as the present embodiment below.

The present embodiment mainly relates to the behavior of the procedure for registration with the core network illustrated in FIG. 10 (S1020; hereinafter also referred to simply as the "registration procedure") and the procedure of (D) in the procedure illustrated in FIG. 10, based on the completion of the registration procedure. Furthermore, the present embodiment relates to a case where, in the registration procedure for registration with the core network (S1020), the registration accept message (S1108) received by the UE_A from the core network_B includes the 11th and/or 12th identification information.

First, the UE_A operates in the dual registration mode and is served by the access network_B connected to the core network_B.

In this case, according to the contents of the 11th and/or 12th identification information included in the registration accept message received by the UE_A, the UE_A and/or the apparatuses complete the registration procedure for registration with the core network (S1020) and then determine to provide an emergency call connection (S1040). Then, the UE_A and/or the apparatuses may perform an emergency call connection process described below.

More specifically, the UE_A and/or the apparatuses may perform a 61st procedure example described below.

The registration procedure for registration with the core network illustrated in FIG. 10 (S1020; hereinafter also referred to simply as the "registration procedure") may be a procedure for which the 11th identification information included in the registration accept message (S1108) received by the UE_A from the core network_B indicates support of an emergency call service via the access network A' connected to the core network B 190.

Furthermore, the emergency call service via the core network A 90 may be supported.

Figure 15:
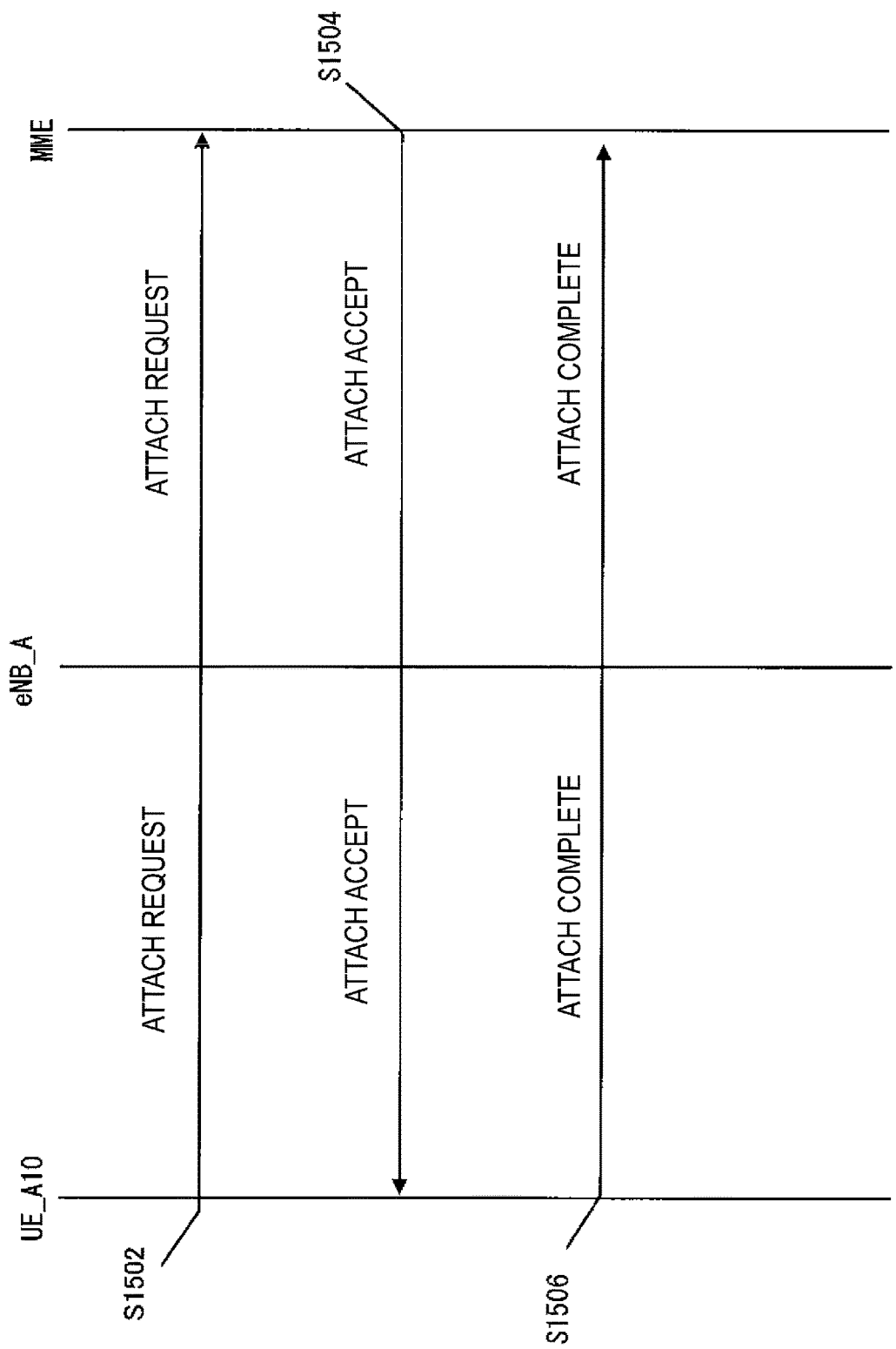
FIG. 15 is a diagram illustrating an attach procedure in an EPS.

Note that the UE_A 10 may determine support of the emergency call service via the core network A 90 based on the availability of the information related to support of the emergency call service via the core network A 90, the information being received in the attach procedure for attachment to the core network_A 90 illustrated in FIG. 15 or/and the tracking area update procedure.

At this time, the UE_A may select the access network A' and provide an emergency call connection via the access network A' connected to the core network B 190, or may select the access network A and provide an emergency call connection via the core network A 90.

Furthermore, in a case that the 12th identification information indicating the emergency call connection scheme included in the registration accept message received by the U E_A indicates support, then in execution of the emergency call connection process, the UE_A 10 may select the service request (SERVICE REQUEST) (S1050) including the 30th identification information as an emergency call connection scheme, and initiate the processing for invoking the processing in which the network performs redirection and/or handover to the core network A 90 or the access network A' connected to core network B_190 (S1050).

Furthermore, in a case that the 12th identification information indicating the emergency call connection scheme included in the registration accept message received by the UE_A indicates support of fallback of the emergency call service via the access network A', the UE_A 10 may select the access network A' and initiate the processing for invoking the processing in which the network performs redirection and/or handover to the core network A 90 (S1050).

Note that the UE_A and/or the apparatuses may perform a 62nd procedure example described below, which is different from the 61st procedure example.

The registration procedure for registration with the core network illustrated in FIG. 10 (S1020; hereinafter also referred to simply as the "registration procedure") may be a procedure for which the 11th identification information included in the registration accept message (S1108) received by the UE_A from the core network_B indicates support of an emergency call service via the access network A' connected to the core network B 190.

Furthermore, the emergency call service via the core network A 90 may be unsupported.

Note that the UE_A 10 may determine support of the emergency call service via the core network A 90 based on the availability of the information related to support of the emergency call service via the core network A 90, the information being received in the attach procedure for attachment to the core network_A 90 illustrated in FIG. 15 or/and the tracking area update procedure.

At this time, the UE_A may select the access network A' and provide an emergency call connection via the access network A' connected to the core network B 190.

Furthermore, in a case that the 12th identification information indicating the emergency call connection scheme included in the registration accept message received by the U E_A indicates support, then in execution of the emergency call connection process, the UE_A 10 may select the service request (SERVICE REQUEST) (S1050) including the 30th identification information as an emergency call connection scheme, and initiate the processing for invoking the processing in which the network performs redirection and/or handover to the access network A' connected to the core network B_190 (S1050).

Note that the UE_A and/or the apparatuses may perform a 63rd procedure example described below, which is different from the 61st and 62nd procedure examples.

The registration procedure for registration with the core network illustrated in FIG. 10 (S1020; hereinafter also simply referred to as the "registration procedure") may be a procedure in which the 11th identification information included in the registration accept message (S1108) received by the UE_A from the core network_B indicates non-support of the emergency call service via the core network B 190.

Furthermore, the emergency call service via the core network A 90 may be unsupported.

Note that the UE_A 10 may determine support of the emergency call service via the core network A 90, based on the availability of the information related to the support of the emergency call service via the core network A 90, the information being received in the attach procedure for attachment to the core network_A 90 or/and the tracking area update procedure. At this time, the UE_A selects the CS domain for an emergency call connection. Furthermore, even in a case that the 12th identification information indicating the emergency call connection scheme included in the registration accept message received by the U E_A indicates support of the fallback of the emergency call service via the access network A', the UE_A 10 selects the CS domain for the emergency call connection.

Note that the UE_A and/or the apparatuses may perform a 64th procedure example described below, which is different from the 61st to 63rd procedure examples.

The registration procedure (S1020; hereinafter also simply referred to as the "registration procedure") in the core network illustrated in FIG. 10 may be a procedure in which the 11th identification information included in the registration accept message (S1108) received by the UE_A from the core network_B indicates non-support of the emergency call service via the core network B 190.

Furthermore, the emergency call service via the core network A 90 may be supported.

Note that the UE_A 10 may determine support of the emergency call service via the core network A 90, based on the availability of the information related to the support of the emergency call service via the core network A 90, the information being received in the attach procedure for attachment to the core network_A 90 or/and the tracking area update procedure.

At this time, the UE_A may select the access network A and provide an emergency call connection via the core network A 90.

Furthermore, in a case that the 12th identification information indicating the emergency call connection scheme included in the registration accept message received by the UE_A indicates support, then in execution of the emergency call connection process, the UE_A 10 may select the service request (SERVICE REQUEST) (S1050) including the 30th identification information as an emergency call connection scheme, and initiate the processing for invoking the processing in which the network performs redirection and/or handover to the core network A 90 (S1050).

Furthermore, in a case that the 12th identification information indicating the emergency call connection scheme included in the registration accept message received by the UE_A indicates support of fallback of the emergency call service via the access network A', the UE_A 10 may select the access network A' and initiate the processing for invoking the processing in which the network performs redirection and/or handover to the core network A 90 (S1050).

Note that the UE_A and/or the apparatuses may perform a 65th procedure example described below, which is different from the 61st to 64th procedure examples.

The registration procedure for registration with the core network illustrated in FIG. 10 (S1020; hereinafter also referred to simply as the "registration procedure") may be a procedure for which the 11th identification information included in the registration accept message (S1108) received by the UE_A from the core network_B indicates support of an emergency call service via the access network B connected to the core network B 190 or via the access network A' and the access network B connected to the core network B 190.

Furthermore, in a case that the emergency call service via the core network A 90 is unsupported, an emergency call connection is provided via the access network B connected to the core network B 190 regardless of whether or not the UE_A has the function to perform the dedicated service request (SERVICE REQUEST) for invoking the handover and/or redirection procedure performed by the network and regardless of the 12th identification information indicating the emergency call connection scheme and included in the registration accept message received by the UE_A.

Furthermore, in a case that the emergency call service via the core network A 90 is supported, then regardless of whether or not the UE_A has the function to perform the dedicated service request (SERVICE REQUEST) for invoking the handover and/or redirection procedure performed by the network and regardless of the 12th identification information indicating the emergency call connection scheme and included in the registration accept message received by the UE_A, an emergency call connection may be provided via the access network B connected to the core network B 190, or the access network A may be selected, and an emergency call connection may be provided via the access network A and the core network A 90.

Note that in the present embodiment, in a case that the network is prevented from performing the handover and/or redirection procedure, the UE_A need not have the function to perform the dedicated service request (SERVICE REQUEST) for invoking the handover and/or redirection procedure performed by the network.

In the above, the UE_A 10 determines which of the core network_A 90 and the core network B_190 an emergency call connection to be provided is routed through based on the status of the support of the emergency call service by the core network_A 90 or the core network B_190 included in the registration accept message from the core network. However, the determination need not be limited to this.

Specifically, determination may be made based on preconfigured information, in addition to the aforementioned emergency call service support status of the network.

At this time, in a case that the terminal is configured to prioritize an emergency call connection via the core network_A 90, the emergency call connection via the core network_A 90 may be provided. In a case that the terminal is configured to prioritize an emergency call connection via the core network_B 190, the emergency call connection via the core network_B 190 may be provided.

Note that the configuration information may be included in the registration accept message and/or the PDU session establishment accept message from the core network, or may be included in a Management Object (MO) received from the application server included in the core network_B 190 or DN_A.

4.7. Seventh Embodiment

A seventh embodiment of the present invention will be described using FIG. 10 and FIG. 11. The seventh embodiment is also referred to as the present embodiment below.

The present embodiment mainly relates to the behavior of the registration procedure for registration with the core network illustrated in FIG. 10 (S1020; hereinafter also referred to simply as the "registration procedure") and the procedure of (D) in the procedure illustrated in FIG. 10, based on the completion of the registration procedure. Furthermore, the present embodiment relates to a case where, in the registration procedure for registration with the core network (S1020), the registration accept message (S1108) received by the UE_A from the core network_B includes the 11th and/or 12th identification information.

First, the UE_A operates in the dual registration mode and is served by the access network_A' connected to the core network_B.

In this case, according to the contents of the 11th and/or 12th identification information included in the registration accept message received by the UE_A, the UE_A and/or the apparatuses complete the registration procedure for registration with the core network (S1020) and then determine to provide an emergency call connection (S1040). Then, the UE_A and/or the apparatuses may perform an emergency call connection process described below.

More specifically, the UE_A and/or the apparatuses may perform a 66th procedure example described below, which is different from the 61st to 64th procedure examples.

The registration procedure for registration with the core network illustrated in FIG. 10 (S1020; hereinafter also referred to simply as the "registration procedure") may be a procedure for which the 11th identification information included in the registration accept message (S1108) received by the UE_A from the core network_B indicates support of an emergency call service via the access network B connected to the core network B 190 or via the access network A' and the access network B connected to the core network B 190.

Furthermore, the emergency call service via the core network A 90 may be supported.

Note that the UE_A 10 may determine support of the emergency call service via the core network A 90 based on the availability of the information related to support of the emergency call service via the core network A 90, the information being received in the attach procedure for attachment to the core network_A 90 illustrated in FIG. 15 or/and the tracking area update procedure.

At this time, the UE_A may provide an emergency call connection via the access network A' connected to the core network B 190, or may select the access network A and provide an emergency call connection via the core network A 90.

Note that the UE_A and/or the apparatuses may perform a 67th procedure example described below, which is different from the 61st to 66th procedure examples.

The registration procedure for registration with the core network illustrated in FIG. 10 (S1020; hereinafter also referred to simply as the "registration procedure") may be a procedure for which the 11th identification information included in the registration accept message (S1108) received by the UE_A from the core network_B indicates support of an emergency call service via the access network A' connected to the core network B 190.

Furthermore, the emergency call service via the core network A 90 may be unsupported. At this time, the UE_A may execute an emergency call connection via the access network A' connected to the core network B 190.

Note that the UE_A and/or the apparatuses may perform a 68th procedure example described below, which is different from the 61st to 67th procedure examples.

The registration procedure for registration with the core network illustrated in FIG. 10 (S1020; hereinafter also simply referred to as the "registration procedure") may be a procedure in which the 11th identification information included in the registration accept message (S1108) received by the UE_A from the core network_B indicates non-support of the emergency call service via the core network B 190.

Furthermore, the emergency call service via the core network A 90 may be unsupported.

Note that the UE_A 10 may determine support of the emergency call service via the core network A 90 based on the availability of the information related to support of the emergency call service via the core network A 90, the information being received in the attach procedure for attachment to the core network_A 90 illustrated in FIG. 15 or/and the tracking area update procedure. At this time, the UE_A selects the CS domain for an emergency call connection. Furthermore, even in a case that the 12th identification information indicating the emergency call connection scheme included in the registration accept message received by the UE_A indicates support of fallback of the emergency call service including routing through the access network A', the UE_A 10 selects the CS domain for an emergency call connection.

Note that the UE_A and/or the apparatuses may perform a 69th procedure example described below, which is different from the 61st to 67th procedure examples.

The registration procedure for registration with the core network illustrated in FIG. 10 (S1020; hereinafter also simply referred to as the "registration procedure") may be a procedure in which the 11th identification information included in the registration accept message (S1108) received by the UE_A from the core network_B indicates non-support of the emergency call service via the core network B 190.

Furthermore, the emergency call service via the core network A 90 may be unsupported.

Note that the UE_A 10 may determine support of the emergency call service via the core network A 90 based on the availability of the information related to support of the emergency call service via the core network A 90, the information being received in the attach procedure for attachment to the core network_A 90 illustrated in FIG. 15 or/and the tracking area update procedure.

At this time, the UE_A may select the access network A and provide an emergency call connection via the core network A 90.

Furthermore, in a case that the 12th identification information indicating the emergency call connection scheme included in the registration accept message received by the UE_A indicates support, then in execution of the emergency call connection process, the UE_A 10 may select the service request (SERVICE REQUEST) (S1050) including the 30th identification information as an emergency call connection scheme, and initiate the processing for invoking the processing in which the network performs redirection and/or handover to the core network A 90 (S1050).

Furthermore, in a case that the 12th identification information indicating the emergency call connection scheme included in the registration accept message received by the UE_A indicates support of fallback of the emergency call service via the access network B, the UE_A 10 may select the access network B and initiate the processing for invoking the processing in which the network performs redirection and/or handover to the core network A 90 (S1050).

Note that the UE_A and/or the apparatuses may perform a 70th procedure example described below, which is different from the 61st to 69th procedure examples.

The registration procedure for registration with the core network illustrated in FIG. 10 (S1020; hereinafter also referred to simply as the "registration procedure") may be a procedure in which the 11th identification information included in the registration accept message (S1108) received by the UE_A from the core network_B indicates support of the emergency call service via the access network B connected to the core network B 190.

Furthermore, the emergency call service via the core network A 90 may be supported.

Note that the UE_A 10 may determine support of the emergency call service via the core network A 90 based on the availability of the information related to support of the emergency call service via the core network A 90, the information being received in the attach procedure for attachment to the core network_A 90 illustrated in FIG. 15 or/and the tracking area update procedure.

At this time, the UE_A may select the access network B and provide an emergency call connection via the access network B connected to the core network B 190, or may select the access network A and provide an emergency call connection via the core network A 90.

Furthermore, in a case that the 12th identification information indicating the emergency call connection scheme included in the registration accept message received by the UE_A indicates support, then in execution of the emergency call connection process, the UE_A 10 may select the service request (SERVICE REQUEST) (S1050) including the 30th identification information as an emergency call connection scheme, and initiate the processing for invoking the processing in which the network performs redirection and/or handover to the core network A 90 (S1050).

Furthermore, in a case that the 12th identification information indicating the emergency call connection scheme included in the registration accept message received by the UE_A indicates support of fallback of the emergency call service via the access network B, the UE_A 10 may select the access network B and initiate the processing for invoking the processing in which the network performs redirection and/or handover to the core network A 90 (S1050).

Note that the UE_A and/or the apparatuses may perform a 71st procedure example described below, which is different from the 61st to 70th procedure examples.

The registration procedure for registration with the core network illustrated in FIG. 10 (S1020; hereinafter also referred to simply as the "registration procedure") may be a procedure in which the 11th identification information included in the registration accept message (S1108) received by the UE_A from the core network_B indicates support of the emergency call service via the access network B connected to the core network B 190.

Furthermore, the emergency call service via the core network A 90 may be unsupported.

Note that the UE_A 10 may determine support of the emergency call service via the core network A 90 based on the availability of the information related to support of the emergency call service via the core network A 90, the information being received in the attach procedure for attachment to the core network_A 90 illustrated in FIG. 15 or/and the tracking area update procedure.

At this time, the UE_A may select the access network B and provide an emergency call connection via the access network B connected to the core network B 190.

Furthermore, in a case that the 12th identification information indicating the emergency call connection scheme included in the registration accept message received by the UE_A indicates support, then in execution of the emergency call connection process, the UE_A 10 may select the service request (SERVICE REQUEST) (S1050) including the 30th identification information as an emergency call connection scheme, and initiate the processing for invoking the processing in which the network performs redirection and/or handover to the access network B connected to the core network B 190 (S1050).

4.8. Eighth Embodiment

An eighth embodiment of the present invention will be described using FIG. 10 and FIG. 11. The eighth embodiment is also referred to as the present embodiment below.

For the scheme in which the core network via which an emergency call connection is made is selected, description has been given of the scheme in which the UE_A 10 performs selection based on the attach accept message and/or the tracking area update accept from the core network_A 90 and/or the support information related to the emergency call services included in the registration accept message from the core network_B 190. However, no such limitation is intended.

For example, in a case that the emergency call connection service is enabled both via the core network_A 90 and via the core network_B 190, the core network via for an emergency call connection may be selected based on information configured in the UE in advance, in addition to the emergency call service support information of the network described above.

At this time, in a case that the UE is configured to prioritize an emergency call connection via the core network_A 90, the emergency call connection via the core network_A 90 may be provided. In a case that the UE is configured to prioritize an emergency call connection via the core network_B 190, the emergency call connection via the core network_B 190 may be provided.

Note that the configuration information may be included in the registration accept message and/or the PDU session establishment accept message from the core network, or may be included in a Management Object (MO) received from an application server included in the core network_B 190 or DN_A.

In addition, in a case that the emergency call connection service is enabled both via the core network_A 90 and via the core network_B 190, the core network via for an emergency call connection may be selected based on the access network by which the UE_A 10 is served, in addition to the emergency call service support information of the network described above.

For example, in a case that the UE_A 10 is served by the access network B, the emergency call connection process via the access network B may be performed, or in a case that the UE_A 10 is served by the access network A', the emergency call connection process via the access network A' may be performed, or in a case that the UE_A 10 is served by the access network A, the emergency call connection process via the access network A may be performed.

5. OTHER

The embodiments have been described in which the UE_A 10 first attempts to register for an emergency call via the access network_B 120 connected to the core network_B and to connect to the emergency call service. However, the present invention is not limited to this configuration, and after the attempt to make connection to/registration with the system including the access network A' and the core network_B, the subsequent procedures may be performed.

For example, after an initial failure to register for an emergency call via the access network_A' connected to the core network_B and to connect to the emergency call service, the UE_A 10 may perform emergency call reconnection via one of the access network_B connected to the core network_B, the access network_A connected to the core network_A, or the CS network.

The behaviors in this case are similar to the behaviors in the procedures described above, and thus detailed descriptions of the behaviors are omitted.

6. MODIFIED EXAMPLES

A program running on an apparatus according to the present invention may serve as a program that controls a Central Processing Unit (CPU) and the like to cause a computer to operate in such a manner as to realize the functions of the embodiment according to the present invention. Programs or information handled by the programs are temporarily stored in a volatile memory such as a Random Access Memory (RAM), a non-volatile memory such as a flash memory, a Hard Disk Drive (HDD), or another storage device system.

Note that a program for realizing such functions of the embodiment according to the present invention may be recorded on a computer-readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be a semiconductor recording medium, an optical recording medium, a magnetic recording medium, a medium dynamically retaining the program for a short time, or any other computer-readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or may be a processor of a known type, a controller, a micro-controller, or a state machine instead. The above-mentioned electric circuit may include a digital circuit, or may include an analog circuit. Furthermore, in a case that a circuit integration technology that replaces the present integrated circuit appears with advances in semiconductor technology, one or more aspects of the present invention can also use a new integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

REFERENCE SIGNS LIST

1 Mobile communication system
5 DN_A
6 PDN_A
7 IMS_A
10 UE_A
30 PGW_A
35 SGW_A
45 eNB_A
40 MME_A
50 HSS_A
80 ACCESS NETWORK_A
81 ACCESS NETWORK_A'
90 Core network_A
120 ACCESS NETWORK_B
122 gNB_A
145 eNB_B
190 Core network_B
230 SMF_A
235 UPF_A
240 AMF_A
245 UDM_A
290 CS network_A
300 P-CSCF_A
310 P-CSCF_B
320 S-CSCF_A
330 E-CSCF_A

The invention claimed is:

1. A User Equipment (UE) comprising:
control circuitry; and
transmitting and receiving circuitry, wherein:
the control circuitry is able to perform a second emergency call attempt in an Evolved Packet System (EPS) in a case of a failure of a first emergency call attempt in a 5G system (5GS),
the transmitting and receiving circuitry receives a Protocol Data Unit (PDU) SESSION ESTABLISHMENT REJECT message as the failure of the first emergency call attempt,
the control circuitry determines whether the system in which the UE performs the second emergency call attempt is the EPS or the 5GS, based on a cause value indicating a reason that the first emergency call attempt is rejected,
the control circuitry uses a first access network for the first emergency call attempt, and
the control circuitry uses a second access network for the second emergency call attempt.

2. A communication control method performed by a User Equipment (UE), the communication control method comprising:
performing a second emergency call attempt in an Evolved Packet System (EPS) in a case of a failure of a first emergency call attempt in a 5G system (5GS);
receiving a Protocol Data Unit (PDU) SESSION ESTABLISHMENT REJECT message as the failure of the first emergency call attempt;
determining whether the system in which the UE performs the second emergency call attempt is the EPS or the 5GS, based on a cause value indicating a reason that the first emergency call attempt is rejected;
using a first access network for the first emergency call attempt; and
using a second access network for the second emergency call attempt.

* * * * *